United States Patent [19]
Tsunekawa et al.

[11] Patent Number: 5,923,367
[45] Date of Patent: *Jul. 13, 1999

[54] INTEGRAL IMAGE RECORDING AND IMAGE PLAYBACK SYSTEM

[75] Inventors: Tokuichi Tsunekawa; Nobuaki Date; Hiroshi Aizawa, all of Kanagawa-ken; Kazuya Hosoe, Machida; Kazunori Urushibara, Yokohama, all of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/265,706

[22] Filed: Jun. 24, 1994

Related U.S. Application Data

[63] Continuation of application No. 08/156,523, Nov. 19, 1993, abandoned, which is a continuation of application No. 07/918,329, Jul. 22, 1992, abandoned, which is a division of application No. 07/740,865, Jul. 31, 1991, Pat. No. 5,191,435, which is a continuation of application No. 07/503,145, Mar. 30, 1990, which is a division of application No. 07/309,349, Feb. 10, 1989, Pat. No. 4,928,184, which is a continuation of application No. 07/004,148, Jan. 16, 1987, Pat. No. 4,823,200, which is a division of application No. 06/347,966, Feb. 11, 1982, Pat. No. 4,658,304, which is a division of application No. 06/031,168, Apr. 18, 1979, Pat. No. 4,366,501.

[30] Foreign Application Priority Data

Apr. 23, 1978 [JP] Japan ..................................... 53-48010
Apr. 23, 1978 [JP] Japan ..................................... 53-48011

[51] Int. Cl.[6] .............................. H04N 5/225; H04N 5/66
[52] U.S. Cl. ............................................. 348/207; 348/739
[58] Field of Search .................................... 348/207, 344, 348/373, 739; 358/906

[56] References Cited

U.S. PATENT DOCUMENTS

| | | | |
|---|---|---|---|
| 3,833,758 | 9/1974 | Ferrari | 358/906 |
| 4,158,859 | 6/1979 | Kerbel | 358/228 |
| 4,262,301 | 4/1981 | Erlichman | 358/909 |
| 4,263,623 | 4/1981 | Woo et al. | 358/906 |

*Primary Examiner*—Wendy Garber
*Assistant Examiner*—Luong Nguyen
*Attorney, Agent, or Firm*—Anderson, Kill & Olick, P.C.

[57] ABSTRACT

An image pickup device which includes a device for picking up an image of an object and photoelectrically converting the image into an image signal, a photograph indicating device, for indicating a photographing of the object, an exposure amount setting device, for setting an amount of exposure for effecting photoelectric conversion by the image pickup device and an exposure amount control device, for controlling the exposure amount setting device. The device also includes a recording device, for recording the image signal outputted from the image pickup device, a reproducing device, for reproducing the image signal recorded by the recording device, a change-over operating member, for selectively changing over a recording mode effected by the recording device, or a reproducing mode effected by the reproducing device, an image display device, for selectively displaying the image before recording or the reproduced image in a manner visible from outside, and a control device, for effecting control in response to the operation of the change-over operating member to change over the recording mode and the reproducing mode so that in the recording mode the continuous image signal before recording by the recording device, which has been changed by driving of the exposure amount setting device is displayed by the image display device. At least the image pickup device and the image display device are arranged to form a substantially integral construction.

6 Claims, 32 Drawing Sheets

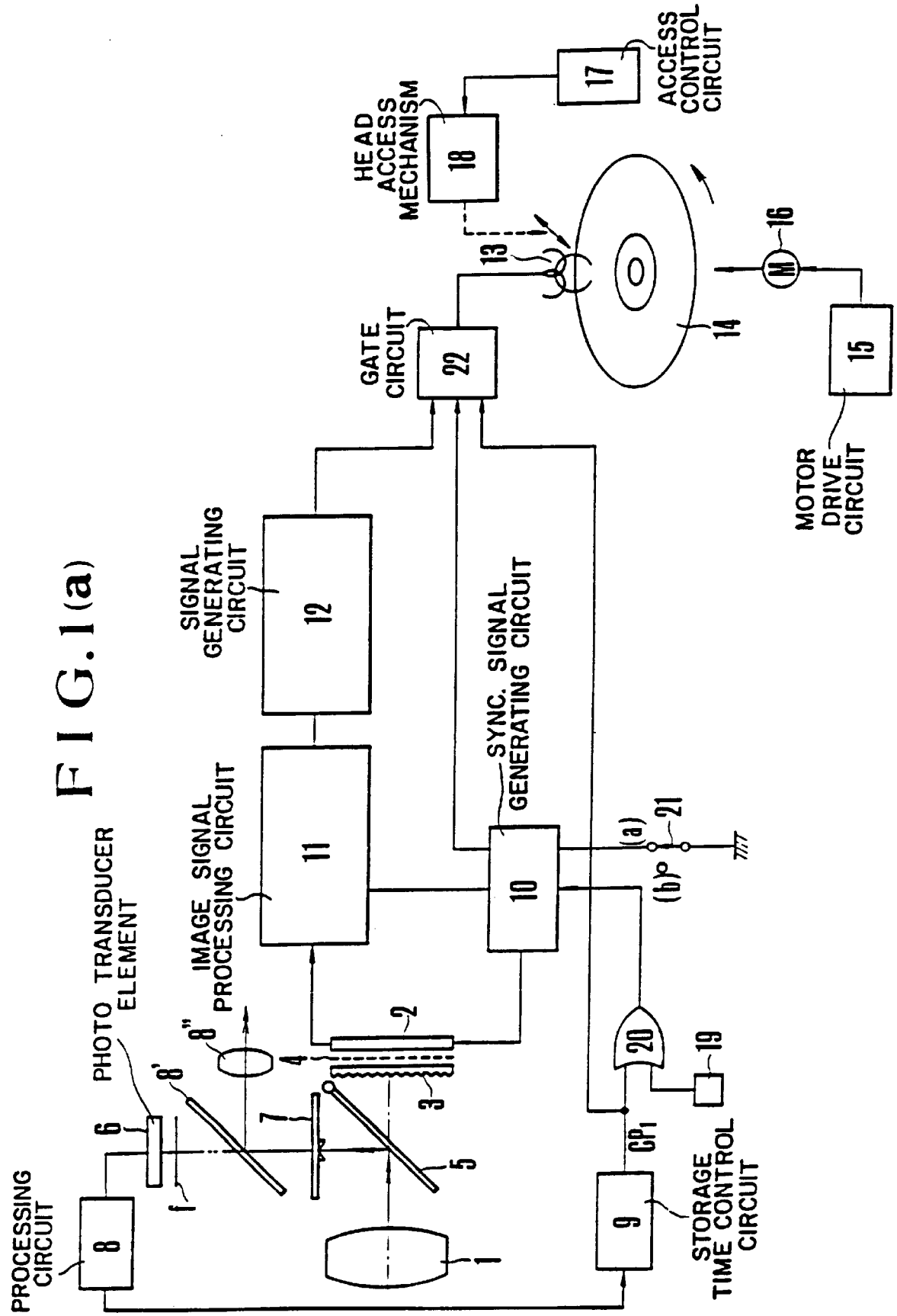

(1) 20 OUT (2) ON₁ OUT (3) VΦₚ

(4) ON₂ OUT (5) ON₃ OUT (6) ON₄ OUT (7) OR₁ OUT (VΦᵥ₁)

(8) ON₅ OUT VΦ_H2

(9) ON₆ OUT

(10) ON₇ OUT VΦₛ

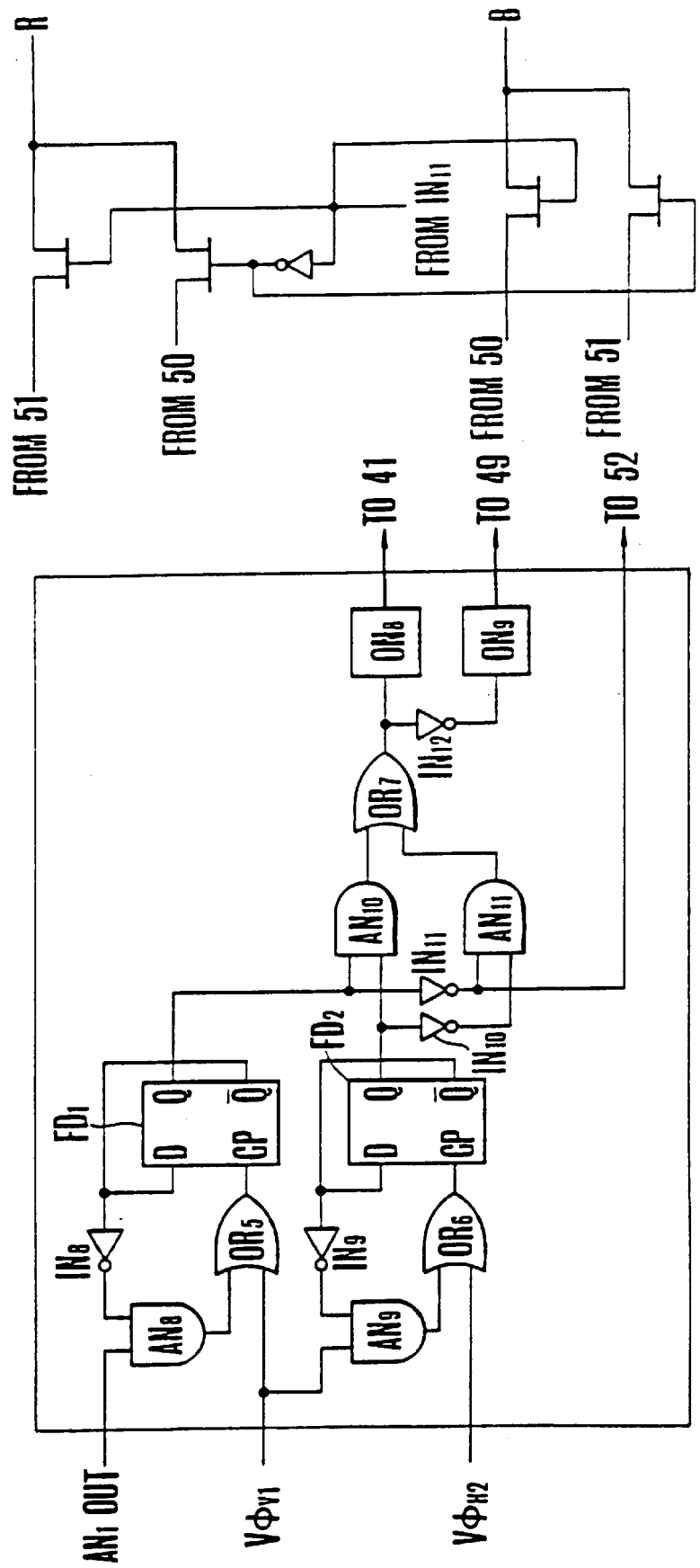

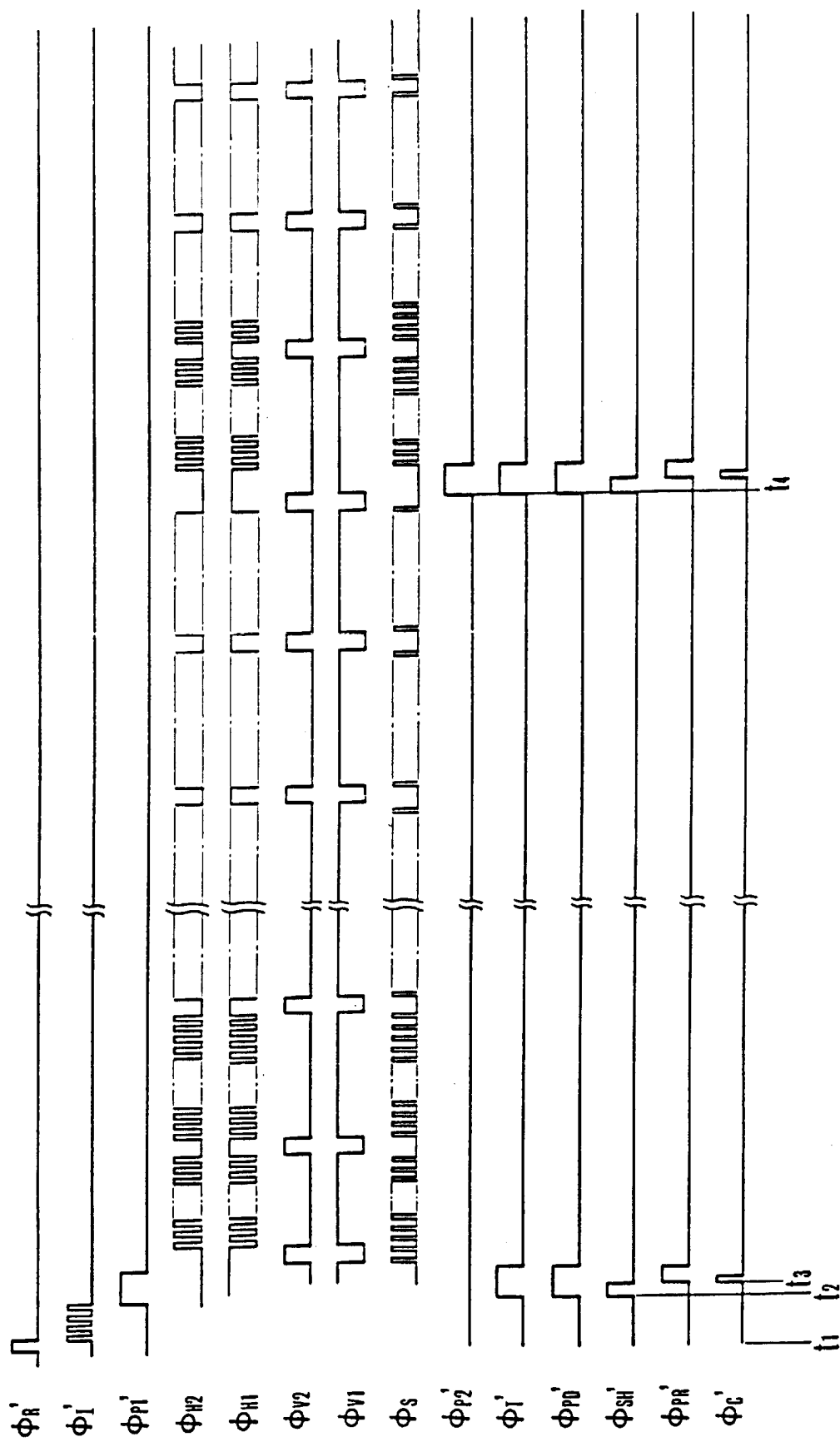

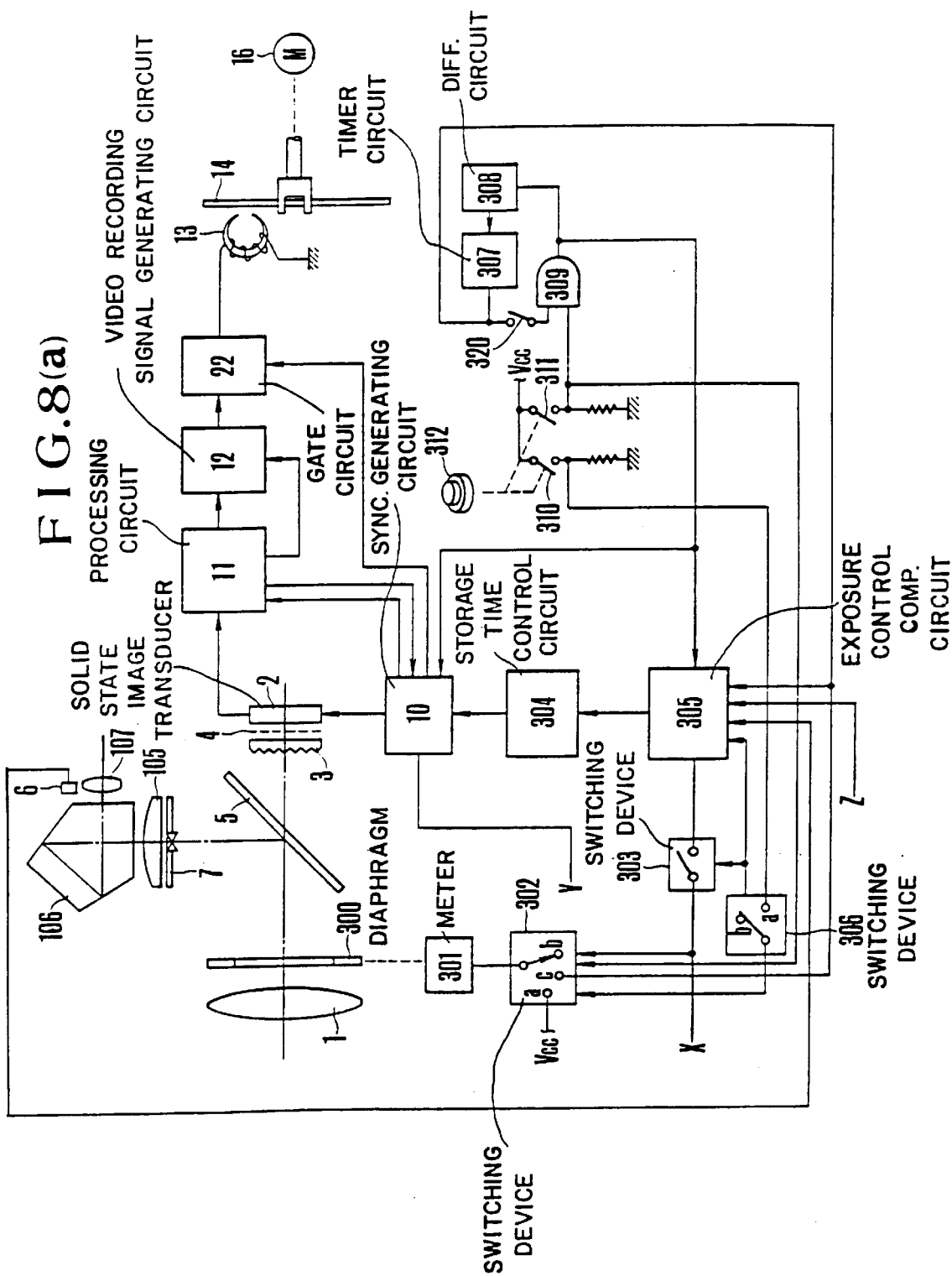

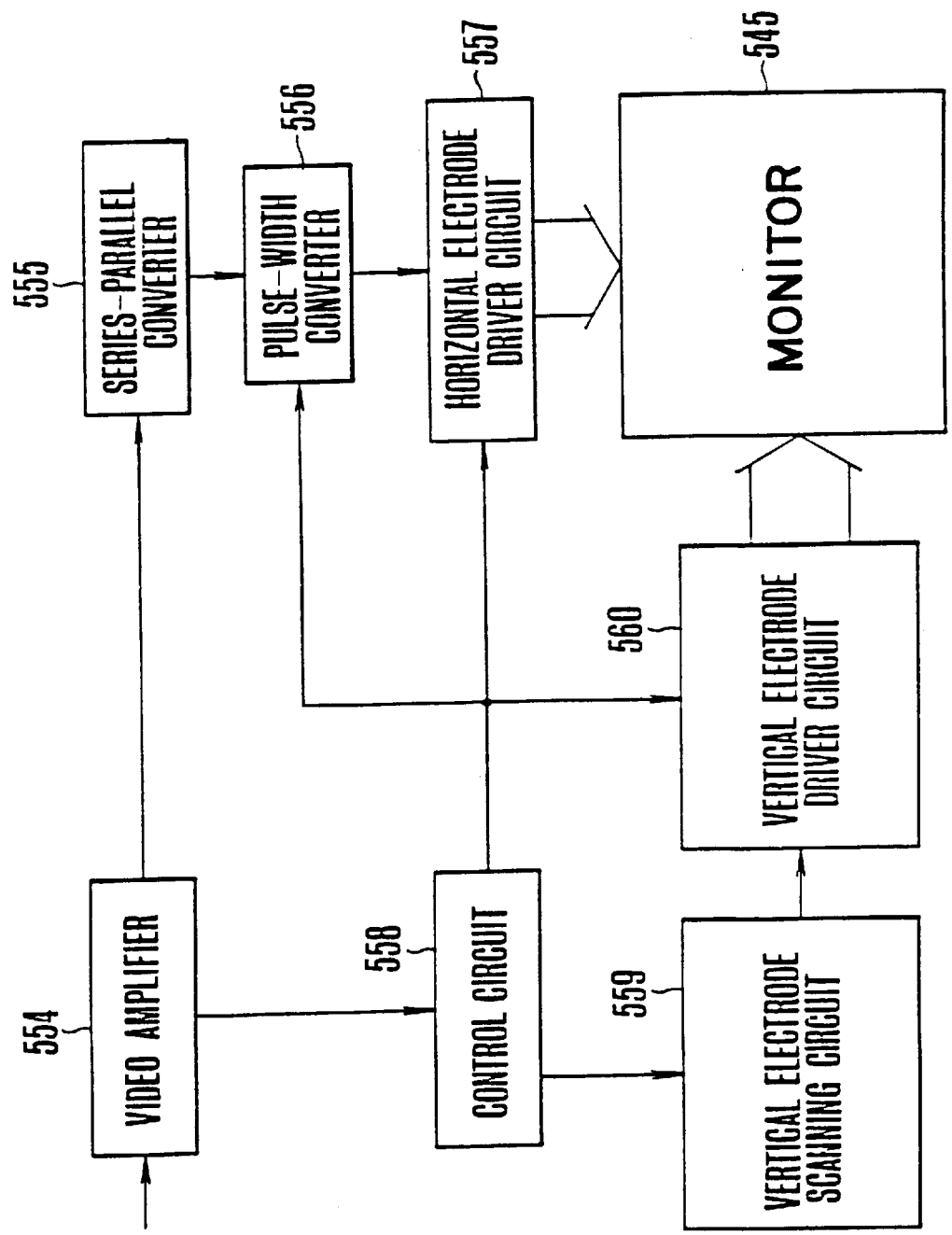
F I G. 14.

1

INTEGRAL IMAGE RECORDING AND IMAGE PLAYBACK SYSTEM

This is a continuation application of application Ser. No. 08/156,523, filed Nov. 19, 1993, abandoned, which in turn is a continuation application of application Ser. No. 07/918, 329, filed Jul. 22, 1992, abandoned, which in turn is a divisional application of application Ser. No. 07/740,865, filed Jul. 31, 1991, now U.S. Pat. No. 5,191,435, which in turn is a continuation application of application Ser. No. 07/503,145, filed Mar. 30, 1990, which in turn is a divisional application of application Ser. No. 07/309,349, filed Feb. 10, 1989, which passed to issue on May 22, 1990 as U.S. Pat. No. 4,928,184, which in turn is a continuation application of application Ser. No. 07/004,148, filed Jan. 16, 1987, which passed to issue on Apr. 18, 1989 as U.S. Pat. No. 4,823,200, which in turn is a divisional application of application Ser. No. 06/347,966, filed Feb. 11, 1982, which passed to issue on Apr. 14, 1987 as U.S. Pat. No. 4,658,304, which in turn is a divisional application of application Ser. No. 06/031, 168, filed Apr. 18, 1979, which passed to issue on Dec. 28, 1982 as U.S. Pat. No. 4,366,501.

BACKGROUND OF THE INVENTION

1. Field of the Invention

This invention relates to an image recording system including a solid state image transducer provided with a great number of photoelectric elements independent of each other, an image forming optics for forming an image of an object on the image transducer, and a recording medium on which the image signals for the object image obtained from said solid state image transducer are reproducibly accumulated.

2. Description of the Prior Art

It is already known in the television especially color television art to employ the so-called charge transfer device such as CCD and BBD as the image sensor, for example, in U.S. Pat. No. 3,982,274. It is further known to provide a method and apparatus for recording and reproducing still pictures by processing the output of said device in such a manner that the image signals, after having once been stored, are read out at a relatively slow velocity and then converted to video signals which are to be recorded on a magnetic recording medium such as a magnetic disc, as, for example, disclosed in U.S. Pat. No. 4,057,830.

These prior art systems, however, places a limit of the discussion for their features on the mere function of recording the image signals on the magnetic recording medium, and disclose nothing about the exposure level control in producing the image signals. For this reason, the prior art system tends to record some of the image signals in an over-exposed state, and some in an under-exposed state, so that the reproduced image of optimum tone-reproduction quality cannot be obtained.

As the solid state image transducer, it is desirable to use a charge transfer type device such as CCD and BBD, or X-Y address type device, or charge injection type device (CID). But, because these devices are fabricated in the form of integrated circuits on a silicon semi-conductor substrate of thin thickness, when the image-receiving surface of the solid state device is accidentally exposed to a very intense radiant energy particularly from the sun through the image forming optical system, there is a high possibility of occurrence of suddenly heating the exposed surface of the device in a portion thereof to so high a temperature that the solid state device is burned to damage. Another disadvantage of the prior art system is that the recorded image is monitored by making use of an optical finder similar to that in the conventional photographic camera.

The prominent characteristic feature of such electronic image recording system over the photographic camera using the conventional photosensitive material of the silver halide type is, however, the enjoyment of the possibility of instant reproduction of the recorded image signals by means, for example, of the television set.

SUMMARY OF THE INVENTION

An object of the present invention is to provide various kinds of schemes for the exposure control with regulation of the image signal level to a proper one in image recording systems of the type described above, and to always obtain an optimum tone-reproduction quality upon later reproduction of the image signals.

Another object of the present invention is, in case where the optics uses no diaphragm, to provide two schemes, one of which is to control the period of image-dependent charge storing operation of the solid state image transducer in accordance with the object brightness level detected by a separate photoelectric element from those of the image transducer, and another scheme which is to control the storage time as determined by feeding back the signals read out from the solid state image transducer.

Still another object of the present invention is, in case where the optics has a variable aperture, not only to adjust the storage time to a proper value, while the diaphragm aperture is fixed in size, as can be seen in the so-called diaphragm preselection automatic exposure range for the ordinary camera, or adjust the aperture to a proper value, while a fixed storage time is used, as in the so-called shutter preselection automatic exposure range, but also to provide a number of additional control systems analogous to the programmed exposure control system where the two exposure ranges are hybridized with each other, and to the magic exposure control systems where the preselected value of a primary exposure factor is altered when the computed value of a secondary one exceeds either one of the limits of the dynamic range of exposure control.

In case where an auxiliary artificial light source such as strobe is used, means is provided for synchronizing the operation of the solid state image transducer with the light source in such a manner that the aforesaid auxiliary lighting occurs at the time of initiation of image-dependent charge accumulation, or at the termination of duration of a predetermined delay time.

A further object of the present invention is to provide a playback device which enables the operator to monitor the image during the recording operation, or to reproduce the once recorded image.

A furthermore object of the present invention is to prevent the solid state image transducer from being burned to damage by use of a light-shielding means as positioned at the front thereof so that when in no use the light-receiving surface of the transducer is protected from the incident light.

These and other objects of the invention will become apparent from the following detailed description of preferred embodiments thereof taken in conjunction with the accompanying drawings.

BRIEF DESCRIPTION OF THE DRAWINGS

FIG. 1(a) is a schematic view, partly in block form, of one embodiment of an image recording system according to the present invention.

FIG. 1(e) is a circuit diagram showing a practical example of construction and arrangement of circuit elements in block 10b of FIG. 1(b).

FIG. 1(g) is a circuit diagram showing the details of a synchronizer in block 11 of FIG. 1(a), the synchronizer being indicated at 52 in FIG. 4.

FIG. 7 shows another embodiment of the present invention with

FIG. 7(b) showing the details of some of the blocks of FIG. 7(a), and

FIG. 7(c) being a pulse timing chart showing a manner in which the operation of the blocks of FIG. 7(b) is controlled.

FIG. 8(a) is a block diagram showing still another embodiment of the present invention.

FIG. 14 is a block diagram showing a practical example of a monitor signal forming circuit.

DESCRIPTION OF THE PREFERRED EMBODIMENTS

Figures 1B, 1D:
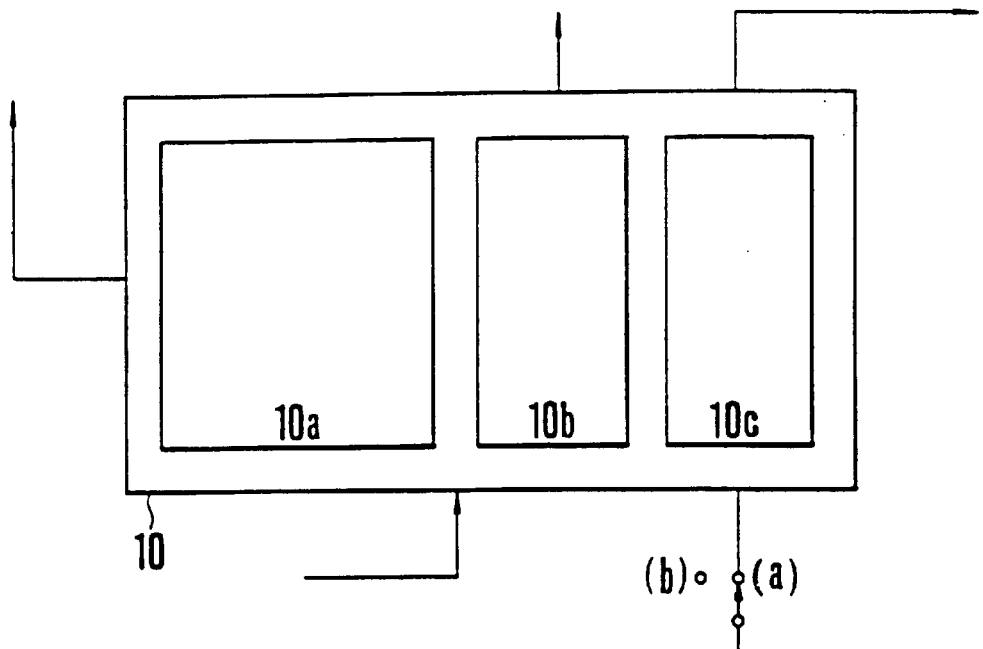
FIG. 1(b) is a block diagram showing the details of the circuit 10 of FIG. 1(a).
FIG. 1(d) is a pulse timing chart showing a manner in which the circuit of FIG. 1(c) operates.

Referring to FIGS. 1 to 6, there is shown an embodiment of an image recording system according to the present invention. In FIG. 1(a), 1 is an optics for forming an image of an object (not shown) on a focal plane near an image-receiving surface of a solid state image transducer 2 such as CCD available, for example, from Fairchild Camera & Inst. under the tradename of CCD202. Positioned on the device 2 are a lenticular screen 3 and a color filter 4 arranged in this order from the front to detect color information of the object. A portion of the light emerging from the optics 1 is reflected by a half-mirror 5 to a focusing screen where an image of the object is formed. Light from the image on the screen 7 is radiated upward to a light measuring or photoelectric element 6 such as silicon photo-cell through a beam splitter 8' and a luminosity factor correction filter, f, the one of the light from the image which is splitted entering an eye-piece 8".

Figure 2A:
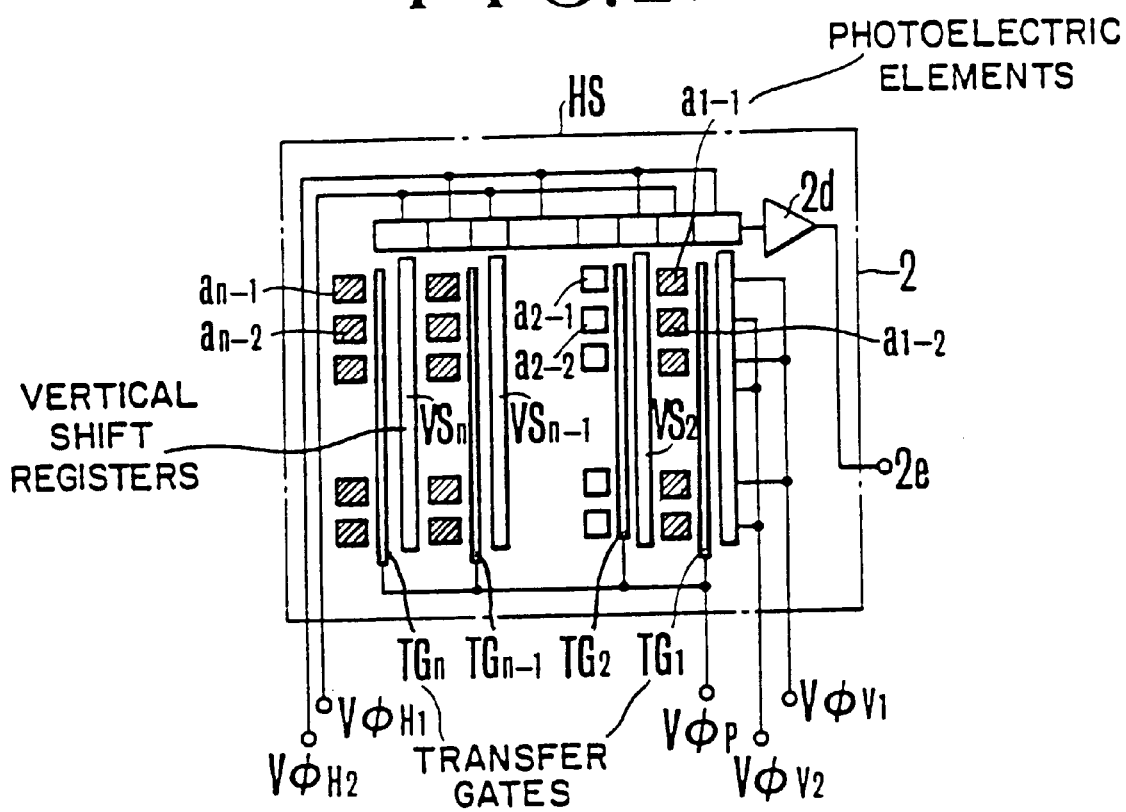
FIG. 2(a) is a schematic view showing the structure of a solid state image sensing device in FIG. 1(a).
Figure 2B:
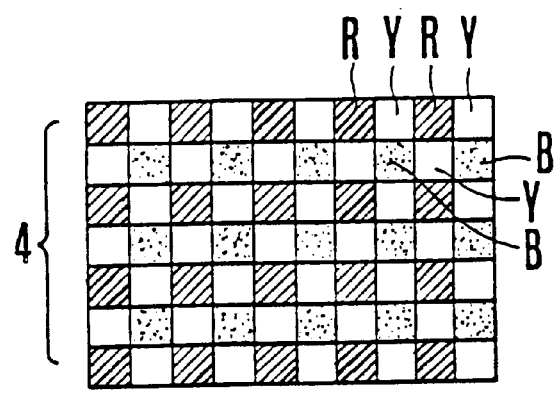
FIG. 2(b) is a plan view showing the structure of a color filter in FIG. 1(a).

As shown in FIGS. 2(a) and 2(b), the image transducer 2 is constructed as comprising a great number of photoelectric elements, $a_{1 \cdot 1}, a_{2 \cdot 1}, \ldots, a_{mn}$, in the minute segment form, transfer gates TG1, TG2, . . . , TGn responsive to a control pulse $V_{\phi P}$ for transferring the charges stored on the individual photoelectric elements as an image signal to vertical shift registers VS1, VS2, . . . , VSn, and a horizontal shift register HS for transferring the image signal from the vertical shift registers VSs, through a buffer amplifier 2d to an outlet 2e. After the one-frame image signal is stored, the image signal is transferred to vertical shift register by the pulse $V_{\phi P}$ and the contents of the vertical shift registers VSs are transferred upward line by line in response to a series of control pulses $V_{\phi V1}, V_{\phi V2}$. During the time interval between the successive two vertical transfer control pulses, the horizontal shift register HS responsive to a series of control pulses $V_{\phi H1}, V_{\phi H2}$ transfers the contents of the horizontal shift registers HSs in each line row by row to the right as viewed in the figure. As a result, the one-frame image signal is formed by reading out the outputs of the individual photoelectric elements in such order. As the operative aspect of the aforesaid CCD is well know to those skilled in the art, no more explanation is given.

The color filter 4 is sectioned to the corresponding number of areas equal to each other and to that of each of the photoelectric elements, a's. Those of the sections which are designated by a character Y are minute color filters having a transmission characteristic selected so as to obtain the spectral component Y for the brightness and color signal in the typical television standard, and the other sections designated by characters R and B are minute color filters having transmission characteristics selected so as to obtain the spectral components R (red) and B (blue) in the same television standard. Of these, the sections Y and R are arranged one after another, namely, Y-R-Y-R- . . . in each odd-numbered line. In the even-numbered line, the arrangement is B-Y-B-Y- . . . . Therefore, for example, the first line of photosensitive elements $a_{1\cdot 1}$, $a_{2\cdot 1}$, . . . produces a Y-R-Y-R- . . . series of signals, and the second line of light-receiving elements $a_{1\cdot 2}$, $a_{2\cdot 2}$, $a_{3\cdot 2}$, . . . produces a B-Y-B-Y- . . . series of signals.

Figure 3:
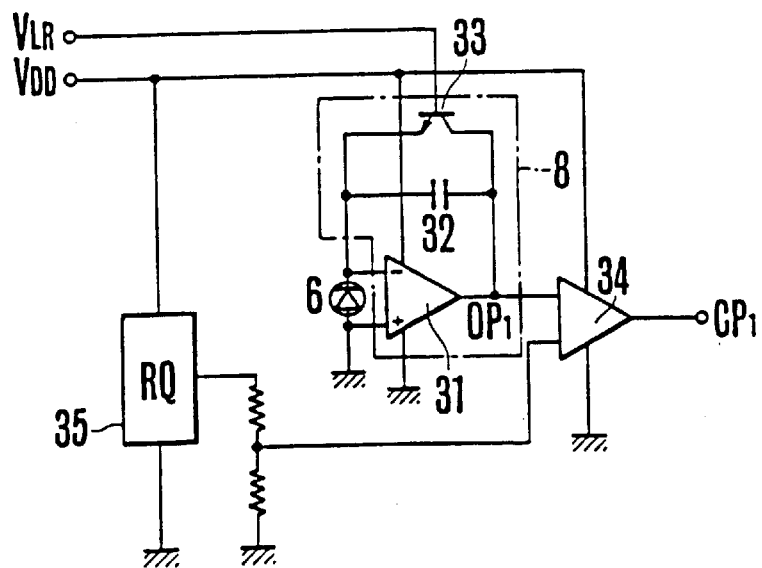
FIG. 3 is a circuit diagram showing a practical example of a light value signal processing and storage time control circuit usable in the circuit of FIG. 1(a).

Turning to FIG. 1(a) again, the output of the photoelectric transducer element 6 is applied to a light value signal processing circuit 8 which then produces an output signal for setting a storage time for the solid state image sensing device 2 through a storage time control circuit 9. This storage time control circuit 9 produces a timing pulse CP1 adjusting the period of light accumulation of the solid state image sensing device 2 to a proper value dependent upon the light value. The timing pulse CP1 is applied to a synchronizing signal generating circuit 10. The aforesaid light value signal processing circuit 3 and storage time control circuit 9 are constructed, for example, as shown in FIG. 3, from an operational amplifier 31 having two inputs between which the aforesaid photoelectric element 6 is connected, and a condenser 32 connected between one of the inputs and an output of the operational amplifier 31 to integrate incident light on the photoelectric element 6. The output voltage OP1 of the operational amplifier 31 proportional to the amount of integrated light is compared with a reference voltage from a constant voltage source 35 by a comparator circuit 34 upon coincidence therebetween to produce the aforesaid timing pulse CP1. Connected across the condenser 32 is the collector-emitter path of a transistor 33 to establish a discharge path for the condenser 32 when a control pulse $V_{LR}$ is given to the base of the transistor 33. Responsive to the timing pulse CP1, the above described synchronizing signal generating circuit 10 produces a pulse $V_{\phi P}$ for the above described transfer gates, the above described horizontal and vertical transfer pulses $V_{\phi V1}$, $V_{\phi V2}$, $V_{\phi H1}$ and $V_{\phi H2}$, a reset pulse $V_{\phi RS}$ for resetting the image signals successively readout each time the image signal corresponding to each of the photoelectric elements is read out to thereby prevent the image signals corresponding to the individual photoelectric elements from influencing each other, and the above described pulse $V_{LR}$ for controlling the opening of the above described transistor 33 to discharge the charge on the condenser 32. In addition thereto, the synchronizing signal generating circuit 10 governs the timing control of the whole of this system.

Figure 4:
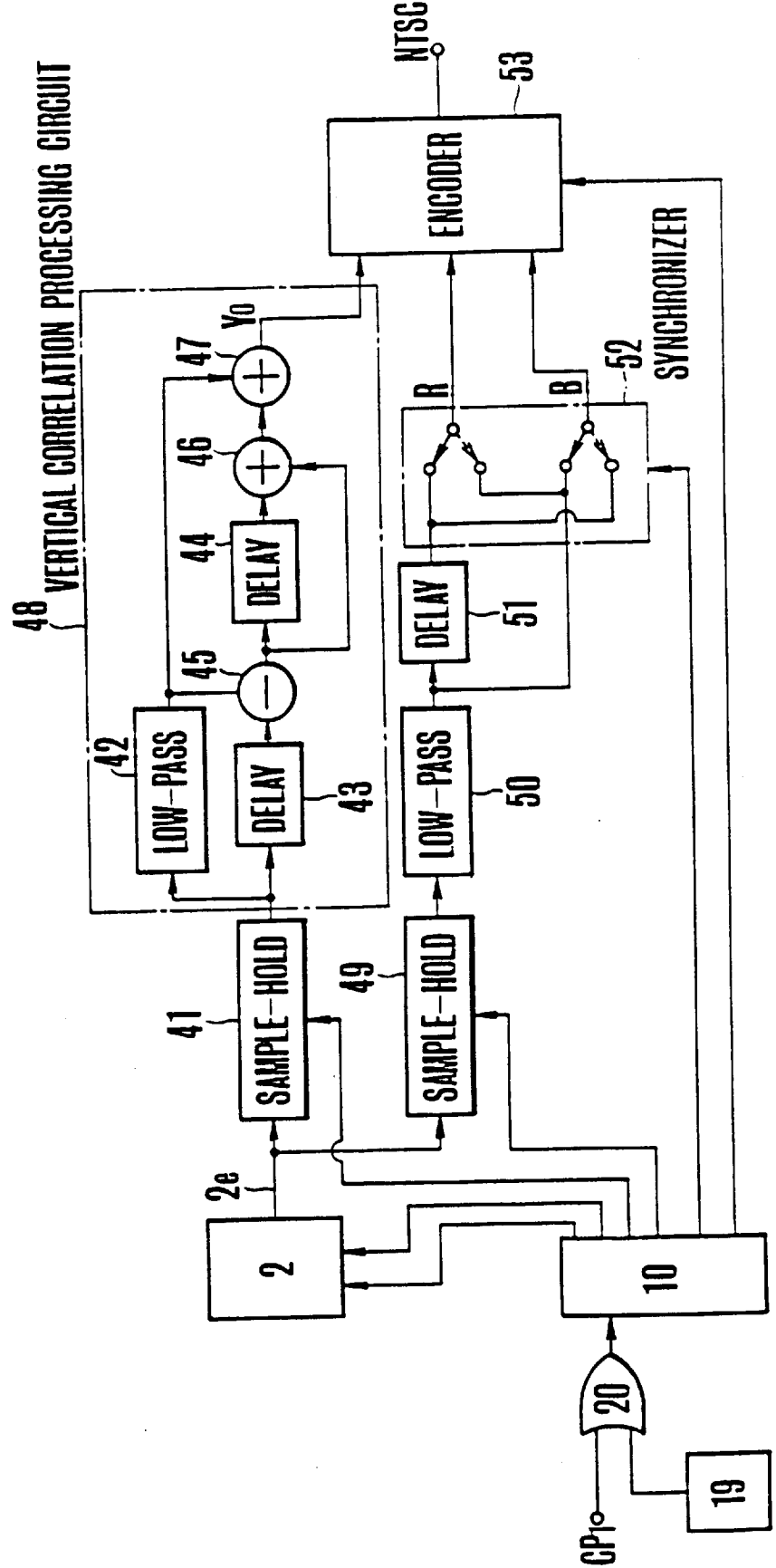
FIG. 4 is a block diagram showing the details of the picture signal processing circuit 11 of FIG. 1(a).
Figure 5:
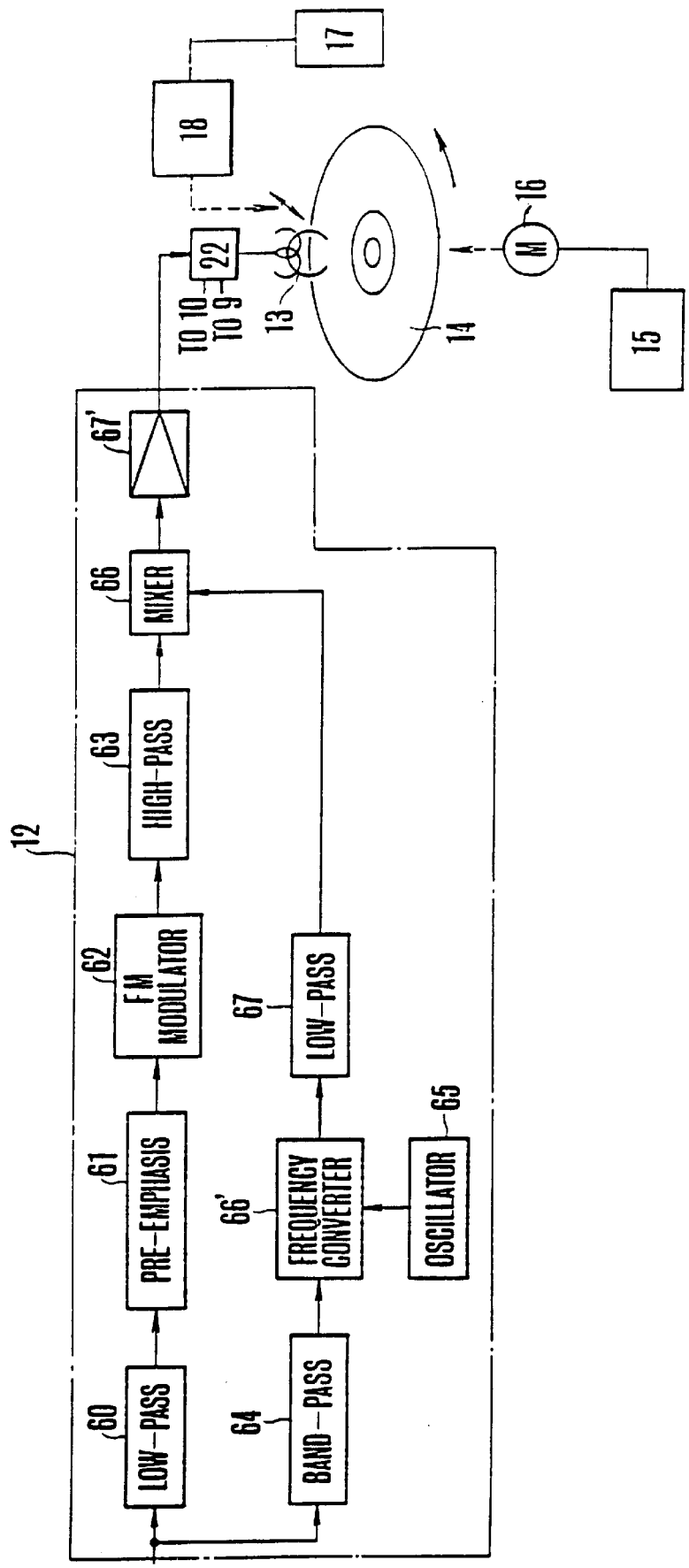
FIG. 5 shows the details of the video signal forming circuit 12 of FIG. 1(a).
Figure 10:
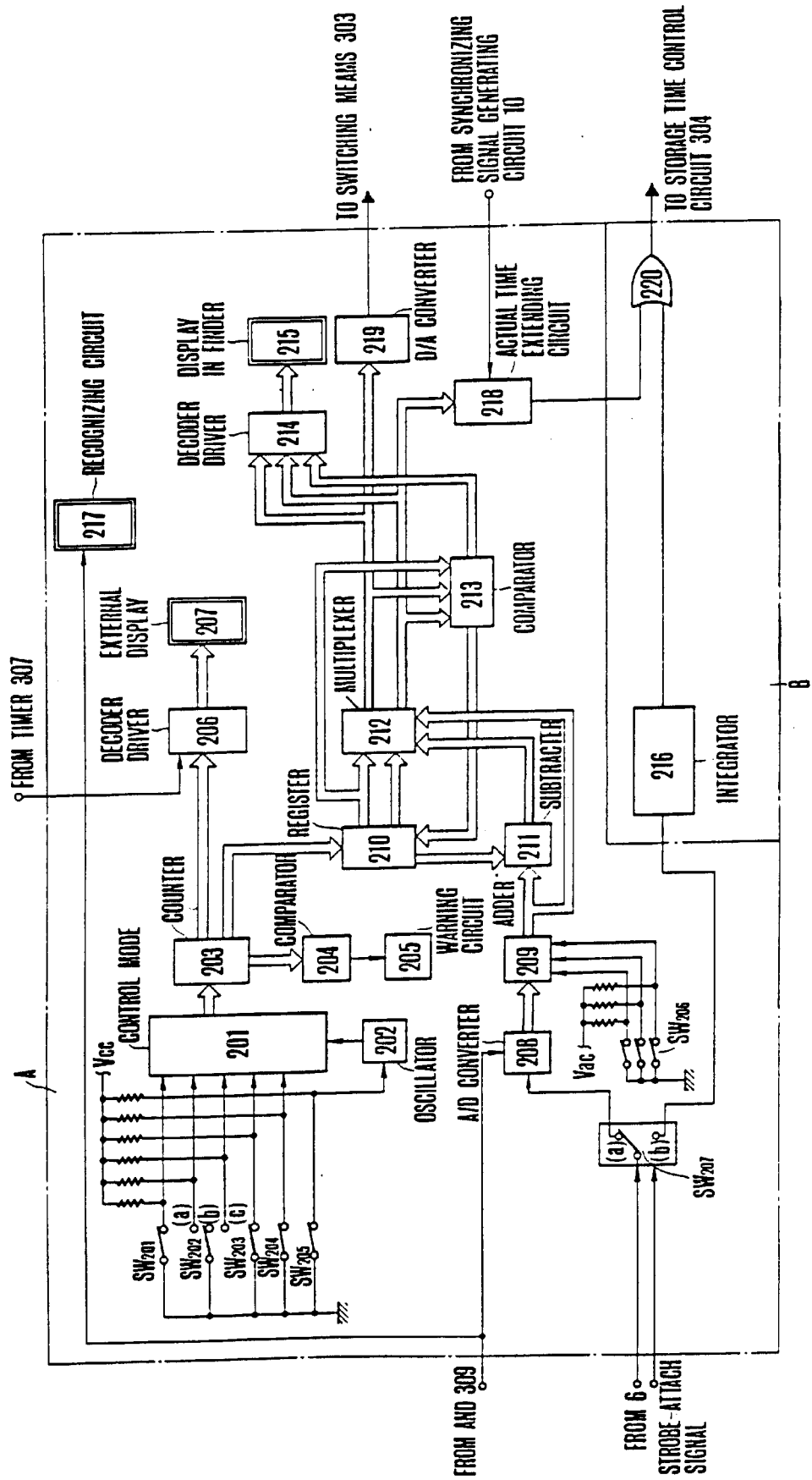
FIG. 10 is a block diagram showing another example of the exposure value computation control circuit 305 of FIG. 8(a).

11 is an image signal processing circuit receptive of the image signals readout from the solid state image transducer 2 for conversion to NTSC signals. An example of construction of that circuit is shown in FIG. 4. In FIG. 4, 2 and 10 are respectively the above described solid state image transducer and synchronizing signal generating circuit. Application of a storage time control signal to the synchronizing signal generating circuit 10 is indicated by an arrow CP1. The signals readout from the solid state image transducer 2 are produced through an output terminal 2e. Of these, the brightness signals Y are subjected to a vertical correlation processing. For this purpose, the signals corresponding to the sections Y in the color filter 4 are read out through a sample holding circuit 41 and then applied to a vertical correlation processing circuit 48 of known construction in the art which comprises a low pass filter 42, a delay circuit 43, another delay circuit 44 for performing a delay equal to one horizontal scanning line (1H), a subtractor 45, and adders 46 and 47. The vertical correlation processing circuit 48 produces output signals of brightness Yo. On the other hand, the red color component R and the blue color component B are obtained for each 1H. Therefore, in order to continuously obtain color image signals, there is provided another sample holding circuit 49 receptive of signals corresponding to the sections R and B in the color filter 4 for producing outputs representative of the R component and B component which is applied to a synchronizing circuit 52 of known construction in the art through a low pass filter for removal of unnecessary high frequency components and through a delay circuit 51. The synchronizing circuit 52 has two output terminals, at one of which the R signal always appears, and at the other of which the B signal always appears. The thus-separated brightness component Yo, red color component R and blue color component B are all applied to an encoder 53 having an output which is so-called an NTSC signal as the output of the image signal processing circuit 11.

Turning to FIG. 1(a), this NTSC signal is applied to a video recording signal generating circuit 12 where it is converted to a video signal to be recorded on an image recording medium 14 such as a video disc by means of a magnetic head 13. In this embodiment, the image recording medium 14 is shown as taking the form of a video disc driven for rotation by an electric motor M at a speed controlled by a motor drive circuit 15 through a drive shaft (not shown), thereby a single frame image signal is recorded in an especial track on the magnetic disc, as about forty tracks are provided thereon in concentrically spaced relation. To record another single frame image signal, therefore, the magnetic head 13 must be displaced in the radial direction. For this purpose, there is provided a heat access mechanism 18 whose operation is controlled by a circuit 17. The above described video recording signal generating circuit 12 is a known circuit that converts the NTSC signal to a video signal as has been mentioned above, and an example of it is shown in FIG. 5, where the same reference numerals have been employed to denote the similar parts to those shown in FIG. 1 and therefore explanation is omitted. In the figure, 60, 61, 62 and 63 are respectively a low pass filter, pre-emphasis circuit, FM modulation circuit, and a high pass filter. By these, the brightness signal is processed. 64 is a band pass filter through which the chrominance information is recovered from a color subcarrier signal of 3.58 MHz. The output of the band pass filter 64 is demodulated by the frequency produced from an oscillator 65 and balanced by a frequency converter 66' and is then processed as a color signal through a low pass filter 67. The thus obtained brightness signal and color signal are mixed by a mixer 66 to produce an output signal which after having been amplified by a record amplifier 67' is fed to the magnetic head 13 for performing image recording.

Turning to FIG. 1(a), 19 is a one-shot circuit responsive to the depression of a release button (not shown) for producing a release pulse CPo, and the output of said one-shot circuit is connected through an OR gate 20 to the above described synchronizing signal generating circuit 10, thereby the circuit 10 is rendered operative in response to the above described release pulse CPo. 22 is a gate circuit with its input connected to the output of the above described video recording signal generating circuit to transmit the video signal to the head 13, and with its gating control inputs connected to the respective outputs of the above described storage time control circuit 9 and synchronizing signal generating circuit 10, so that the above described video signal is applied to the head 13 in response to the pulse CP1 produced from the control circuit 9. And, 21 is a mode switch for selectively changing over continuous exposure and one-frame exposure modes. Upon connection to a contact (a), the continuous exposure mode is selected, and upon connection to a contact (b), the one-frame exposure mode is selected.

Figure 1C:
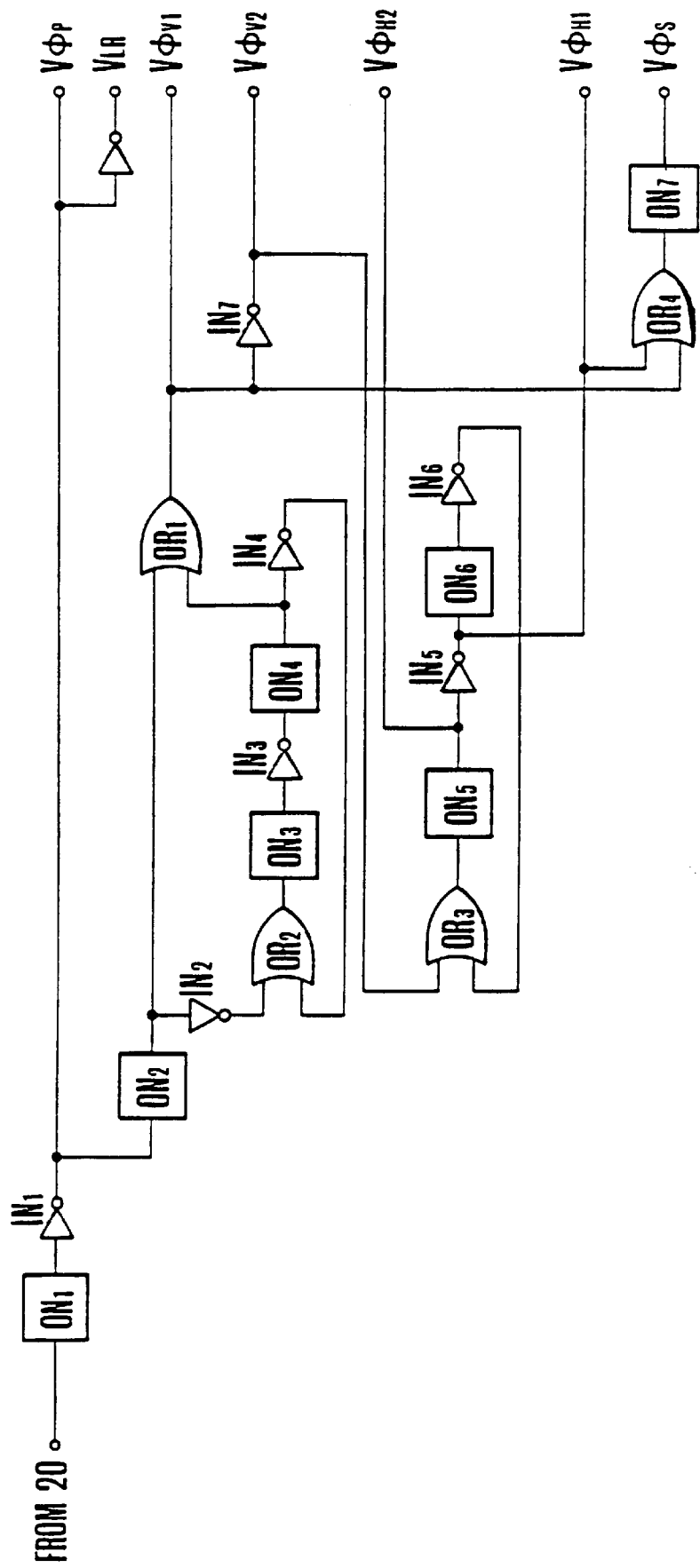
FIG. 1(c) is an electrical circuit diagram showing a practical example of construction and arrangement of circuit elements in block 10a of FIG. 1(b).

FIG. 1(b) shows a practical example of the synchronizing signal generating circuit 10 shown in FIG. 1(a), including a drive circuit for the solid state image transducer 2 which is indicated at 10a. Said drive circuit 10a may be a known one that is sold from Fairchild Camera & Inst., for example, which is adapted for use with the above described CCD202. In this case, for example, as shown in FIG. 1(c), the drive circuit 10a is constructed from one-shot circuits ON1 to ON7, inverters IN1 to IN7, and OR gates OR1 to OR4. Upon advent of the pulse from the OR gate 20 of FIG. 1(a) on the input of the one-shot circuit ON1, the various circuit elements operate in a manner shown in FIG. 1(d) to produce pulses $V_{\phi P}$, $V_{\phi V1}$, $V_{\phi V2}$, $V_{\phi H1}$, $V_{\phi H2}$ and $V_{\phi RS}$. It is noted here that each one-shot circuit is actuated in synchronization with the leading edge of the pulse.

Figure 1F:
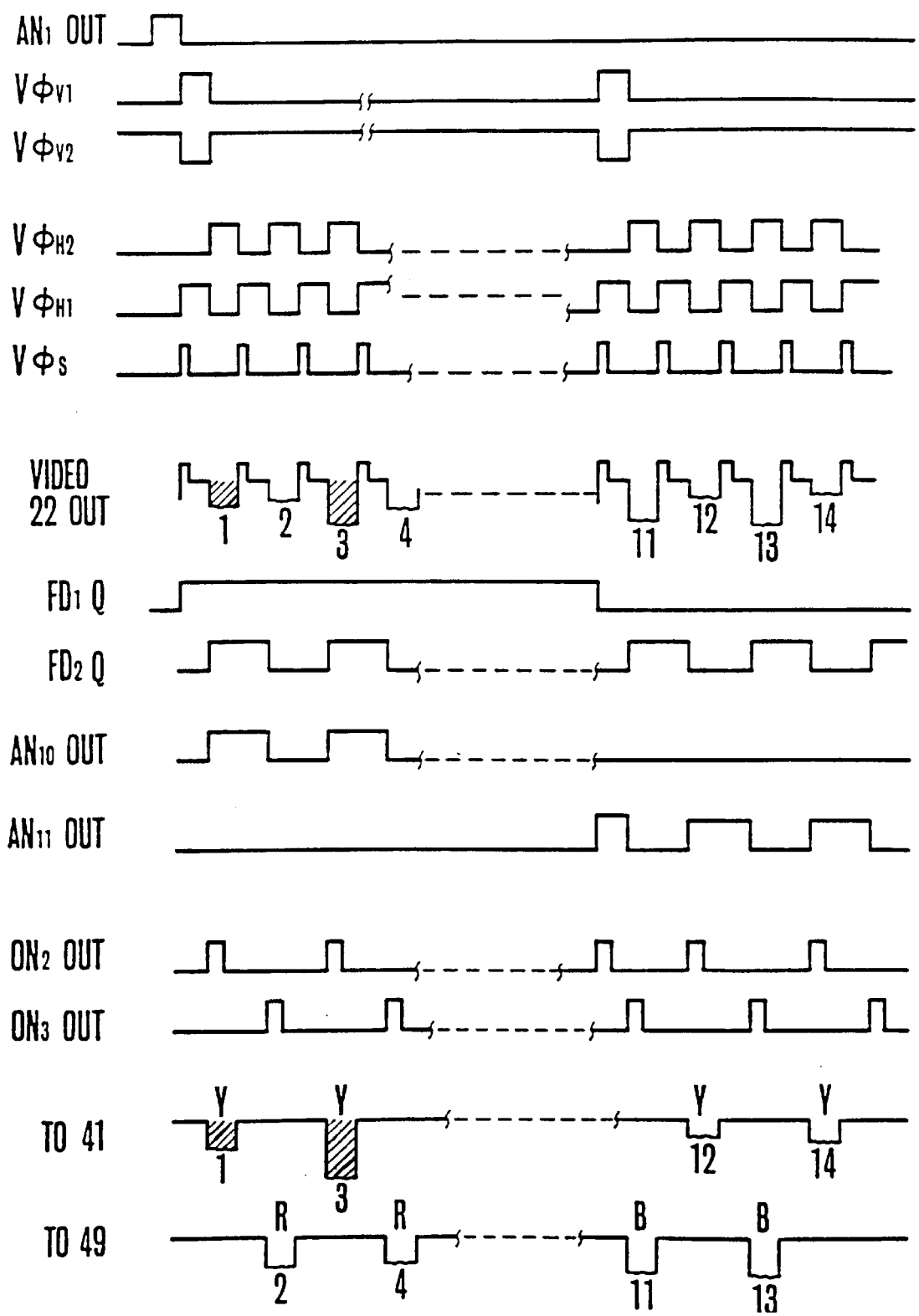
FIG. 1(f) is a pulse timing chart showing a manner in which the circuit of FIG. 1(e) operates.

Turning to FIG. 1(b), 10b is a signal transmitting circuit of construction shown in FIG. 1(e). Said circuit comprises D-type flip-flops FD1 and FD2, AND gates AN8 to AN11, inverters IN3–IN12, OR gates OR5 to OR7 and one-shot circuits ON8 and ON9. In said circuit, one of two inputs of the AND gate AN8 is connected to the output of an AND gate AN1 to be described later in FIG. 1(h), and the above described pulse $V_{\phi V1}$ is applied to one input of the OR gate OR5 and AND gate AN9. And, the pulse $V_{\phi H2}$ is applied to one input of the OR gate OR6. The flip-flops and one-shot circuits in said circuit also synchronize with the leading edge of the pulse. Said FIG. 1(e) circuit operates in such a manner as shown in the waveforms of FIG. 1(f). The one-shot circuits ON8 and ON9 produce alternately pulses in synchronization with the pulse $V_{\phi H2}$, and the pulses are transmitted to the sample holding circuits 41 and 49 of FIG. 4. Therefore, the sample holding circuit 41 of FIG. 4 receives the signals from the only those of the photoelectric elements of the solid state image transducer 2 which correspond to the Y sections of the color filter 4, while the other sample holding circuit 49 receives the signals from those of the photoelectric elements which correspond to the R sections of the color filter 4 when the flip-flop FD1 produces a high level signal, and which corresponds to the B sections when the flip-flop FD1 produces a low level signal. And, the output of the inverter IN11 is connected to the synchronizing circuit 52 of FIG. 4, so that when the output of IN11 is of high level, or when the output of the flip-flop FD1 is of low level, the synchronizing circuit 52 is switched to a solid line position illustrated in FIG. 4. Conversely when the output of the inverter IN11 is of high level, the above described switching is changed over to a dashed line position. By this function, it is resulted that from the output terminal R of the synchronizing circuit 52 there is always produced the R component signal, and from the output terminal B there is always produced the B component signal. A practical example of such synchronizing circuit 52 is shown in FIG. 1(g) comprising analogue switches and inverters.

Figure 1H:
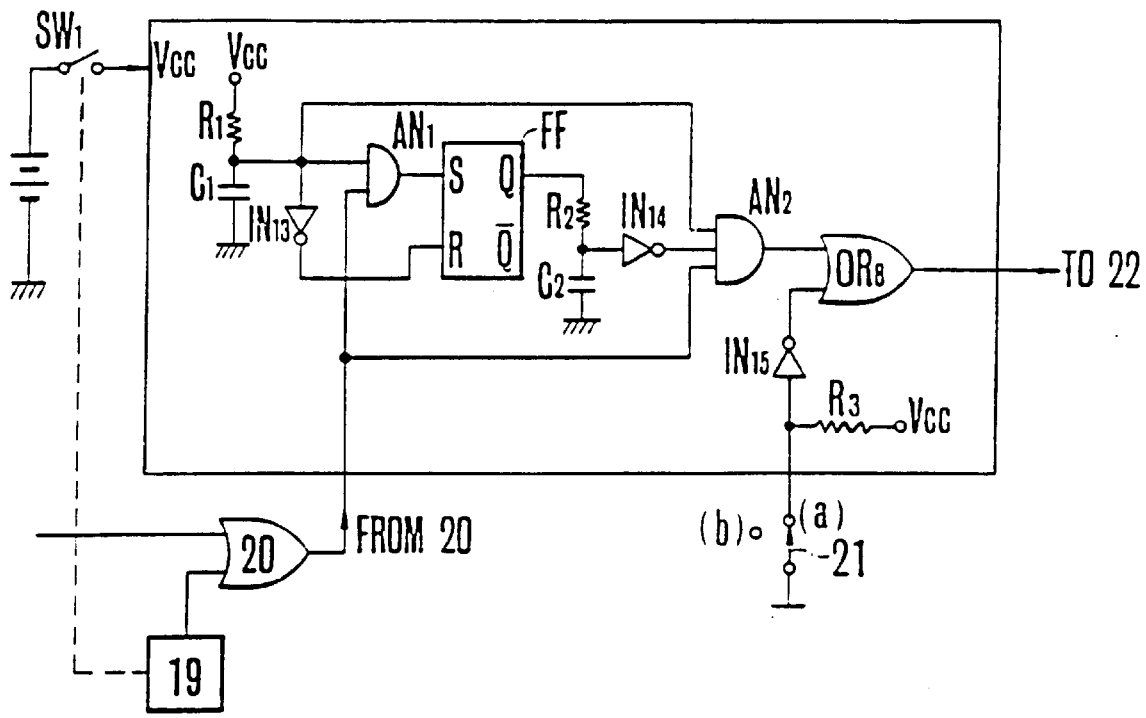
FIG. 1(h) is a circuit diagram showing the detail of block 10c of FIG. 1(b).
Figure 1I:
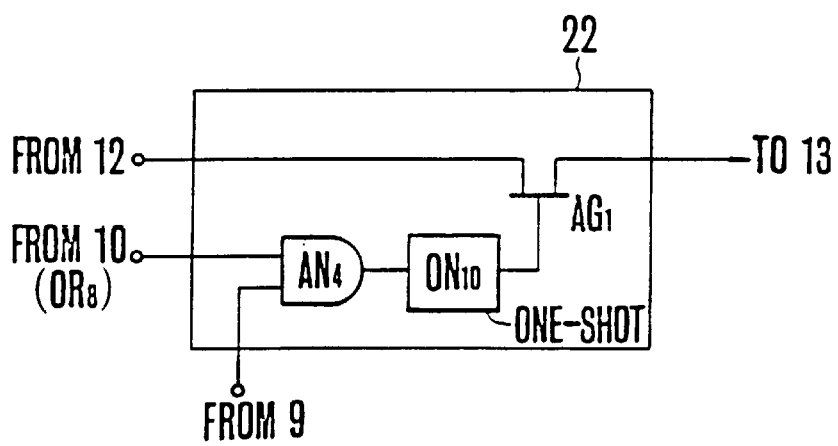
FIG. 1(i) is a circuit diagram showing the detail of the circuit 22 of FIG. 1(a).

Turning to FIG. 1(b), 10c is a signal transmitting circuit for transmitting a signal to the gate circuit of FIG. 1(a), said circuit being constructed as shown in FIG. 1(h). Said circuit comprises a switch SW1 arranged to be closed when the release button is depressed, a timing circuit of a resistor R1 and condenser C1 across which a voltage Vcc is applied when the switch SW1 is closed, inverters IN13, IN14 and IN15, AND gates AN1 and AN2, an OR gate OR8, a flip-flop FF, and a time constant circuit of a resistor R2 and condenser C2 connected to the output Q of the flip-flop FF. When in the continuous exposure mode, since the switch 21 is connected with the contact (a), the inverter IN15 produces an output of high level which is then transmitted through the OR gate OR8 to the gate circuit 22. On the other hand, when in the single frame exposure mode, the connection of the switch 21 to the contact (b) causes the inverter IN15 to produce an output of low level, so that the high level signal from the inverter IN15 is inhibited from being transmitted, but instead only one pulse CF1 from the storage time control circuit 9 is allowed to be transmitted through the OR gate OR8 to the gate circuit 22. And, the gate circuit 22 of FIG. 1(a) is constructed, for example, as shown in FIG. 1(i). In FIG. 1(i), AN4 is an AND gate having one input connected to the OR gate OR8 of FIG. 1(h), and another input connected to the storage time control circuit 9; ON10 is a one-shot circuit; AG1 is an analogue gate having an input connected to the video recording signal generating circuit 12 of FIG. 1(a), and an output connected to the head 13.

The operation of the first embodiment of the invention shown in FIGS. 1 to 5 will be described with reference to the waveforms of FIG. 6. Discussion is first given to the continuous exposure mode with the switch 21 connected to the contact (a). Let us now assume that an electrical power switch (not shown) is ON, and the various circuit portions are supplied with electrical power, then the motor drive circuit 15 is under operation, causing the motor 16 to rotate at a predetermined constant speed. On the other hand, at this time, the signal CP1 is not produced yet as will be described later, and therefore the gate circuit 22 remains closed to unenergize the head 13. Thus, the recording medium 14 is not subjected to record any image signal.

Figure 6:
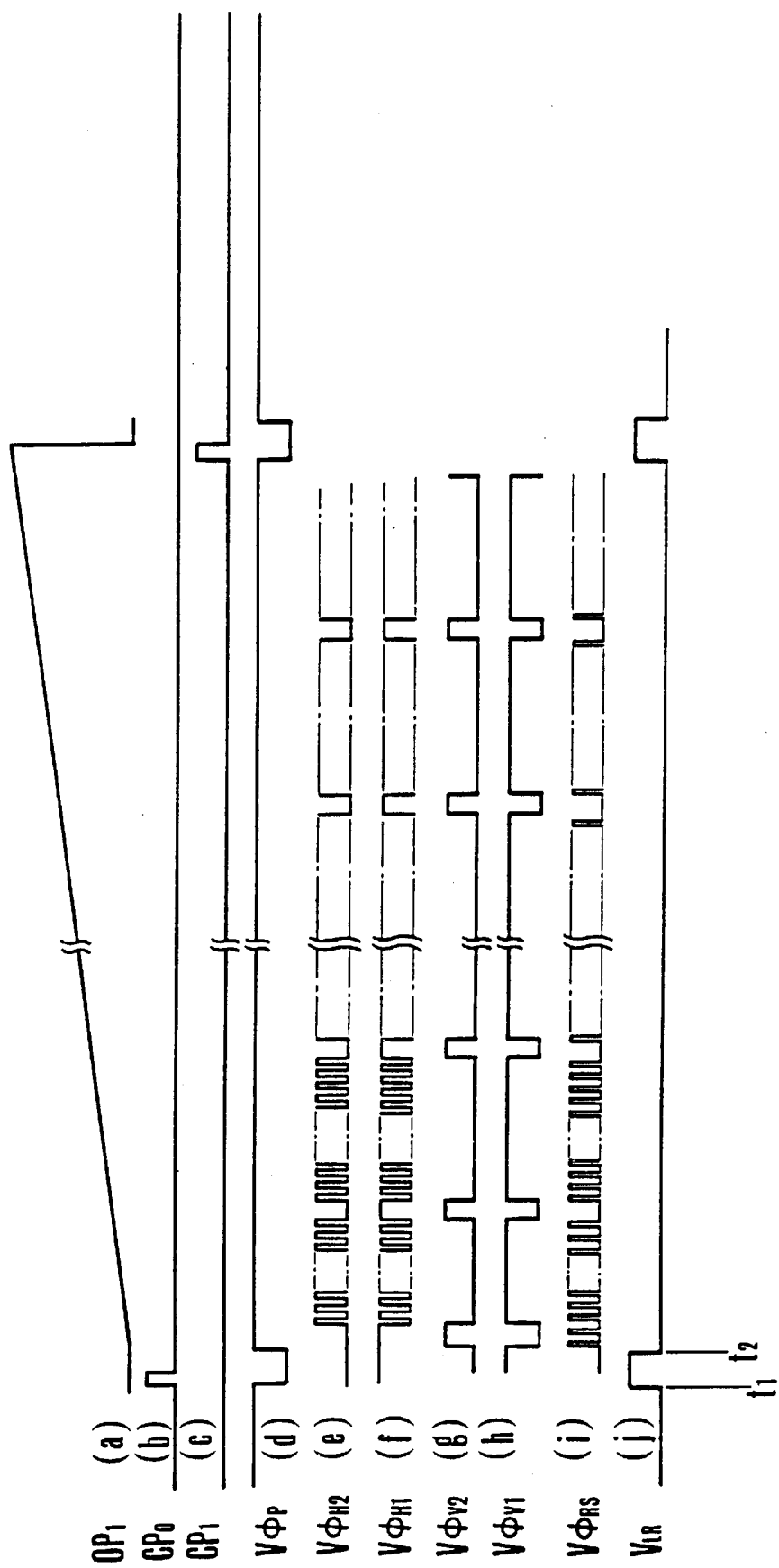
FIG. 6 shows the waveforms present from the circuits of FIG. 1 to FIG. 5 to control the operation of the image sensing device of FIG. 1(a).

When the release button (not shown) is depressed, the one-shot circuit 19 is actuated for operation by a switch cooperative with the release button to produce an output pulse CPo of very short width as shown in FIG. 6(b) at a point in time $t_1$ which is directed through the OR gate 20 to the synchronizing signal generating circuit 10. Responsive to this pulse, said synchronizing signal generating circuit 10 starts to perate with production of a number of signals, one of which controls the reading out operation of the charge, that is, image signal stored on the solid state image transducer 2 as has been mentioned above, and others of which control the operation of the image signal processing circuit 11 and video recording signal generating circuit 12. In other words, when the pulse CPo is applied through the OR gate 20 to the synchronizing signal generating circuit 10, the one-shot circuit ON1 of FIG. 1(c) produces a pulse in synchronism with the leading edge of the pulse of the OR gate 20 as shown in FIG. 1(d) at (2). Said pulse after having passed through the inverter IN1 serves as the pulse $V_{\phi P}$ shown in FIG. 1(d) at (3). Also in synchronism with the pulse $V_{\phi P}$, the one-shot circuit ON2 is actuated to produce a pulse as shown at (4) in FIG. 1(d). Said pulse is inverted by the inverter IN2, and applied through the OR gate OR2 to the one-shot circuit ON3, thereby the one-shot circuit ON3 is triggered by a pulse applied thereto through the OR gate OR2, as shown at (5) in FIG. 1(d), to produce an output pulse. The pulse from said one-shot circuit ON3 is applied through the inverter IN3 to the one-shot circuit ON4, thereby the one-shot circuit ON4 is triggered as shown at (6) in FIG. 1(d) to produce a timing pulse shown at (4) in FIG. 1(d) which is then applied through the inverter IN4 and OR gate OR2 to the above-mentioned one-shot circuit ON3. Such procedure repeats itself with the result that the one-shot circuit ON4 produces a train of pulses as shown at (6) in FIG. 1(d). Again said one-shot circuit ON4 gives its output also to the OR gate OR1, the OR gate OR4 produces a train of pulses $V_{\emptyset V1}$ at a frequency. This pulse train $V_{\emptyset V1}$ after having passed through the inverter IN7 serves as a pulse train $V_{\emptyset V2}$. This pulse train $V_{\emptyset V2}$ is applied through the OR gate OR3 to the one-shot circuit ON5 which produces a pulse $V_{\emptyset H2}$ in synchronism with said pulse $V_{\emptyset V2}$. Said pulse $V_{\emptyset H2}$ is applied through the inverter IN5 to the one-shot circuit ON6, and the output of said one-shot circuit ON6 is applied through the inverter IN6 and OR gate OR3 to the one-shot circuit ON5. Thus, said pulse $V_{\emptyset H2}$ is produced repeatedly as shown at (8) in FIG. 1(d). And, the pulse $V_{\emptyset H1}$ which is produced through the inverter IN5 is also repeatedly produced. Since the input of the OR gate OR4 is connected to the inverter IN5 and OR gate OR1, the one-shot circuit ON7 is triggered in synchronism with the pulses $V_{\emptyset V1}$ and $V_{\emptyset H1}$, the pulse $V_{\emptyset RS}$ is repeatedly produced as shown at (10) in FIG. 1(d). Therefore, as shown in FIG. 6 at (d) to (i), the individual pulses $V_{\emptyset P}$, $V_{\emptyset V1}$, $V_{527\ V2}$, $V_{\emptyset H1}$, $V_{\emptyset H2}$ and $V_{\emptyset RS}$ are produced, and the solid state image transducer 2 is driven by said pulses to perform reading operation of the image signals. In other words, when the individual pulses are produced in such manner, as the pulse $V_{LR}$ produced by inverting the pulse $V_{\emptyset P}$ in synchronism with the transfer pulse $V_{\emptyset P}$ is fed to the transistor 33 of FIG. 3, thereby the transistor 33 is rendered conducting for a very short time in response to the pulse signal $V_{LR}$ to discharge the charge stored on the condenser 32. Thus, the condenser 32 is set to an initial state. Along therewith, the transfer pulse $V_{\emptyset P}$ is fed to the transfer gates TG1–TGn of FIG. 2(a), and the charges on the individual photosensitive elements are transferred to the vertical shift registers at a point in time $t_2$ (FIG. 6). Thus, the image signal recorded on the solid state image transducer 2 before the release is memorized. For this reason, the solid state image transducer is reset to the initial state at the time point $t_2$ and starts a new image signal storing operation at the time $t_2$. On the other hand, as has been mentioned above, when the charges stored on the photosensitive elements before the release are transferred to the vertical shift registers, the above described signals $V_{\emptyset H1}$, $V_{\emptyset H2}$, $V_{\emptyset V1}$, $V_{\emptyset V2}$ and $V_{\emptyset LR}$ from the synchronizing signal generating circuit 10 cause a time sequential of image signals to be produced from the output terminal 2e as mentioned above, and the image signals are then fed to the image signal processing circuit 11 and video recording signal generating circuit 12 where they are converted to video signals. The video signals are fed to the head 13. Thus, on the image recording medium 14 are recorded the video signals corresponding to the image signals. As has been mentioned above, however, the storage time control circuit 9 does not produce the signal CP1 yet, and, therefore, the gate circuit 22 remains OFF, inhibiting the transmission of the video signals to the head 13 and the energization of the head 13. Thus, recording of the video signals on the image recording medium 14 is not performed. On the other hand, as has been mentioned above, at the time point $t_2$, the condenser 32 of FIG. 3 is reset to the initial state, and the transistor 33 is simultaneously turned off. Accordingly, from the time point $t_2$ onward, charging of the condenser 32 is initiated. The speed of charging of the condenser 32 depends upon the time constant determined by the impedance of the photoelectric element 6. Since this impedance corresponds to the level of brightness of the object, the output voltage ramp of the operational amplifier 31 has a slop corresponding to the object brightness level as shown in FIG. 6(a). When said voltage reaches the reference voltage from the constant voltage source 35 at a time point $t_3$, the comparator circuit 34 is inverted to produce an output signal CP1 as shown in FIG. 6(c). This output signal CP1 is fed through the OR gate 20 of FIG. 1(a) to the one-shot circuit ON1 of FIG. 1(c). Therefore, as has been mentioned above, $V_{\emptyset P}$ is produced again and is fed to the transfer gates TG1 to TGn of FIG. 2(a). Thus, the charges as the image signal stored on the solid state image transducer 2 during the time interval between the time point $t_2$ just after the release and the time point $t_3$ are transferred to the vertical shift registers, and the charge storing operation of the solid state image transducer for the one-frame picture has been completed. In other words, the storage time of the image signal on the solid state image transducer for a single frame exposure, that is, the exposure time, is controlled in accordance with the object brightness level by the light value signal processing circuit 8 and storage time control circuit 9. In other words, the storage time of the image signal for the object image on the solid state image transducer is varied with the object brightness. The brighter the object, the lower the above described impedance is and the faster the condenser 32 is charged, and the timing of inversion of the comparator circuit is. As a result, a shorter storage time is obtained. Conversely when the object is dark, the above described impedance is high, and the condenser 32 is charged at a slow rate. Therefore, the timing of inversion of the comparator circuit is delayed with the result that a longer storage time is set. Thus, the image signal from the solid state image transducer 2 is maintained at a proper exposure level, and is prevented from being saturated or being too faint to be recorded.

Such operation is followed by the production of the output signal CP1 from the comparator circuit at the time when the correct exposure is reached, and said signal transfers the image signal of the correctly controlled exposure level to the vertical shift registers, that is, to be memorized therein. Also, the output signal CP1 produced at the time point $t_3$ (FIG. 6) at which the memorizing operation of the image signal has been completed is fed to the gate circuit 22 of FIG. 1(a), thereby the gate circuit 22 is turned to an open state at this time point, that is, the time point $t_3$ at which the image signal is memorized in the proper exposure level. In other words, because of the continuous exposure mode, the switch 21 of FIG. 1(h) is connected to the contact (a), and the OR gate OR8 produces the high level signal. Therefore, the AND gate AN4 of FIG. 1(i) responsive to the output signal CP1 from the circuit 9 triggers the one-shot circuit ON10, and the one-shot circuit ON10 produces a high level signal for a predetermined time interval necessary for the image signal of the solid state image transducer to be read out, while the analogue gate AG1 is in the open state for the time during which a one-frame image is read out. For this reason, the head 13 is supplied with current for the first time after said time point $t_3$ (FIG. 6). Therefore, from the time point $t_3$ onward, by the above mentioned various signals from the synchronizing signal generating circuit 10, the image signals produced in time sequence, that is, the image signals of proper exposure level stored in the time interval between the time points $t_2$ and $t_3$ are read out from the solid state image transducer 2, then converted to the NTSC signals and video signals by the image signal processing circuit of FIG. 4 and the video recording signal generating circuit of FIG. 5, then the video signals for one-frame picture are applied to the head 13, and then recording of the one-frame picture controlled to the proper exposure level is performed on the recording medium 14 at one track. Thus, the exposure operation for the one-frame picture has been completed.

Also, on the other hand, the transistor 33 of FIG. 3 is instantaneously turned on by the inverted pulse $V_{LR}$ of the signal $V_{QP}$ produced at the time point $t_3$ as has been mentioned above, and therefore the condenser 32 is reset each time the image signal storing operation of the solid state image transducer 2 is completed. Thus, the control of storage time of an image signal for the next frame picture is renewed after the completion of the preceding image storing operation, and the image signal storing state of the solid state image transducer recovers the initial one each time the transfer to the vertical shift registers occurs. Such procedure repeats itself until the release button is freed from the depression to terminate the duration of a continuous succession of image signals recorded on the recording medium 14, while the level of each of the image signals is controlled in accordance with the concurrent level of object brightness.

In other words, each time the image signal storing operation of the solid state image transducer 2 is completed, the above mentioned CP1 is produced, and by said signal the signal $v_{QP}$ is produced to perform reading operation of the image signal, and at the same time to initiate the next image signal storing operation, so that the above mentioned operation is repeated continuously to effect continuous exposure.

When a single frame exposure is to be made, the switch 21 is connected to the contact (b), so that after the single frame exposure is completed, the gate circuit 22 is no longer responsive to CP1, and is maintained in the closed state. Thus, the following recording operation is prevented from occurring.

Figure 1J:
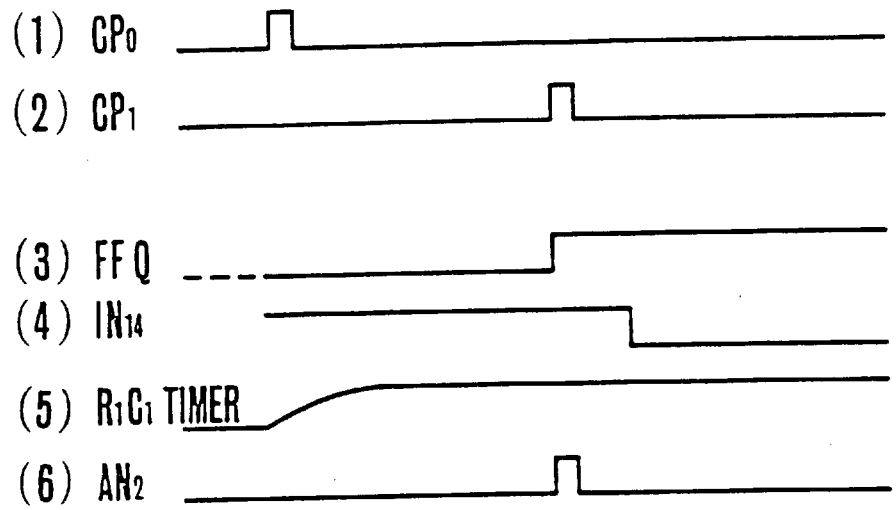
FIG. 1(j) is a pulse timing chart showing a manner in which the circuit of FIG. 1(h) may operate.

In other words, in the case of the single frame exposure mode, as the switch 21 is connected to the contact (b), when the release button is depressed, the one-shot circuit 19 of FIG. 1(h) produces a pulse CPo as shown in FIG. 1(j) at (1). Also, in synchronism with the depression of the release button, the switch SW1 is turned on to supply the circuit of FIG. 1(h) with the voltage Vcc. Therefore, the timer circuit consisting of the resistor R1 and condenser C1 is actuated after the release, and increases its output as shown in FIG. 1(j) at (5), reaching a predetermined level after a predetermined time. During this time, the inverter IN3 produces a high level signal, and the AND gates AN1 and AN2 produce low level signals. Therefore, the flip-flop FF produces a low level signal from the Q output terminal as shown in FIG. 1(j) at (3). After that, when the above described timer circuit reaches the predetermined level, the inverter IN13 changes its output to the low level, and the reset state of the flip-flop FF is released to be settable. After the FF becomes settable in such manner, as has been mentioned above, when the image storing operation on the transducer 2 is completed, the circuit 9 produces the pulse CP1. Therefore, the pulse CP1 is fed to the AND gates AN1 and AN2 through the OR gate OR20. At this time, as the output of the timer consisting of the resistor R1 and condenser C1 reaches the predetermined level, and AND gate AN2 responsive to the pulse CP1 produces a pulse, said pulse is fed through the OR gate OR8 to the AND gate AN4 of FIG. 1(i). The other input of said gate AN4 is connected to the above described circuit 9, so that the AND gate AN4 causes the above described pulse CP1 to be passed therethrough to trigger the one-shot circuit ON10, and, as has been mentioned above, the gate circuit 22 to be opened during the time a one-frame image is read out, and causing the video signal to be recorded. Also, on the other hand, responsive to the above mentioned pulse CP1, the AND gate AN1 too produces a pulse, so that the flip-flop FF is set in synchronism with the CP1 to produce a high level signal from the Q output terminal as shown in FIG. 1(j) at (3). Therefore, the timer consisting of the resistor R1 and condenser C1 is actuated after the FF is set, reaching a predetermined level after a predetermined time. Therefore, the inverter IN14, as shown in FIG. 1(j) at (4), produces a low level signal after the above described CP1 is produced. After that, even when CP1 is produced from the circuit 9, the AND gate AN2 remains in the closed state. Thus, the OR gate OR8 produces only the first one CP1, and the gate circuit 22 is held in the closed state after the first single frame image has been recorded to insure that only one frame exposure is performed.

It is to be noted that the reason why the gate circuit 22 is left closed until the image signal stored on the solid state image transducer 2 just before the actuation of release is read out is that the image signal stored on the solid state image transducer 2 just before the release was not subjected to the above mentioned storage time control, and therefore has no proper exposure level, thus being improper as the recording signal for the image.

Figure 7A:
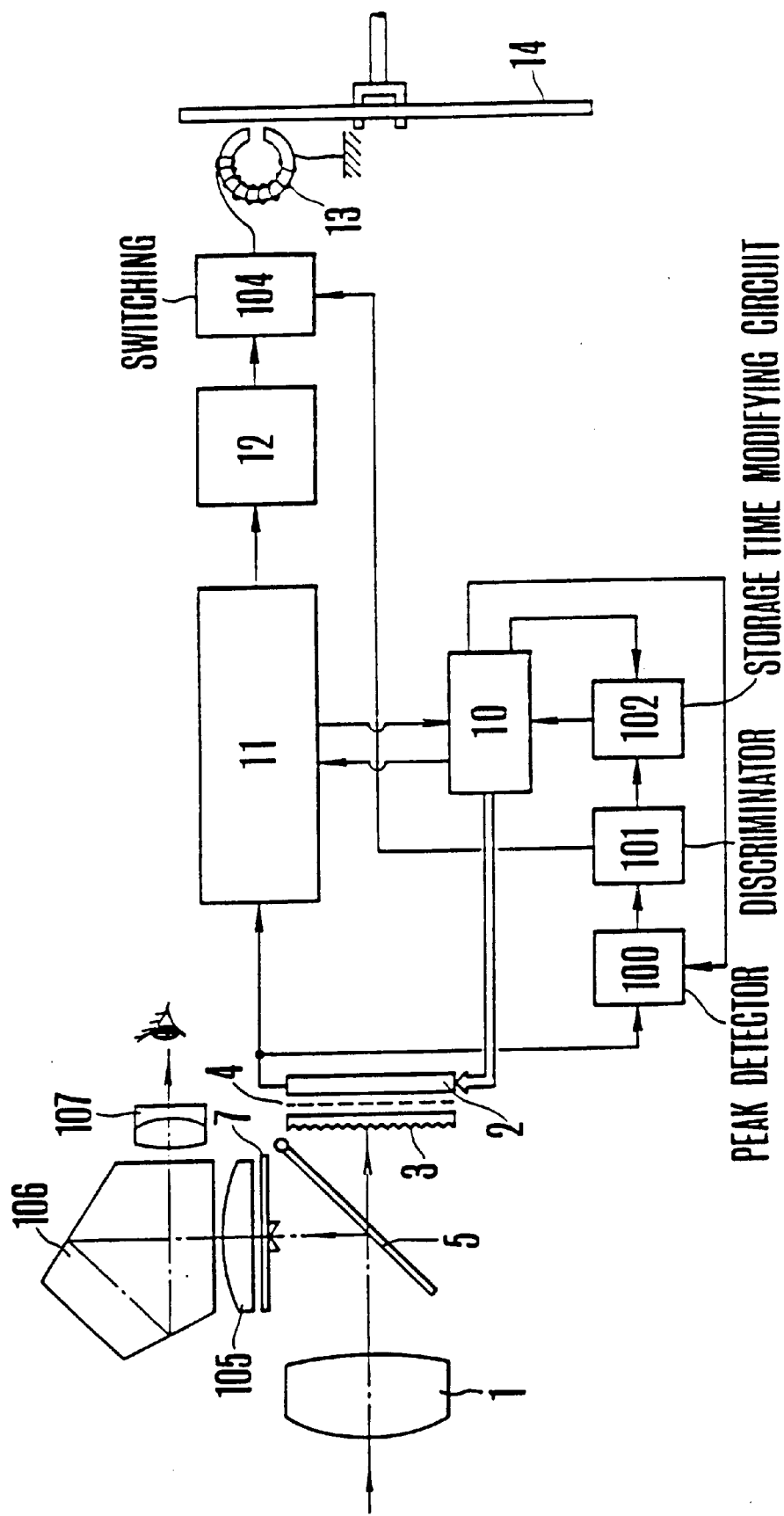
FIG. 7(a) generally showing the paths of the various signals.
Figure 7:
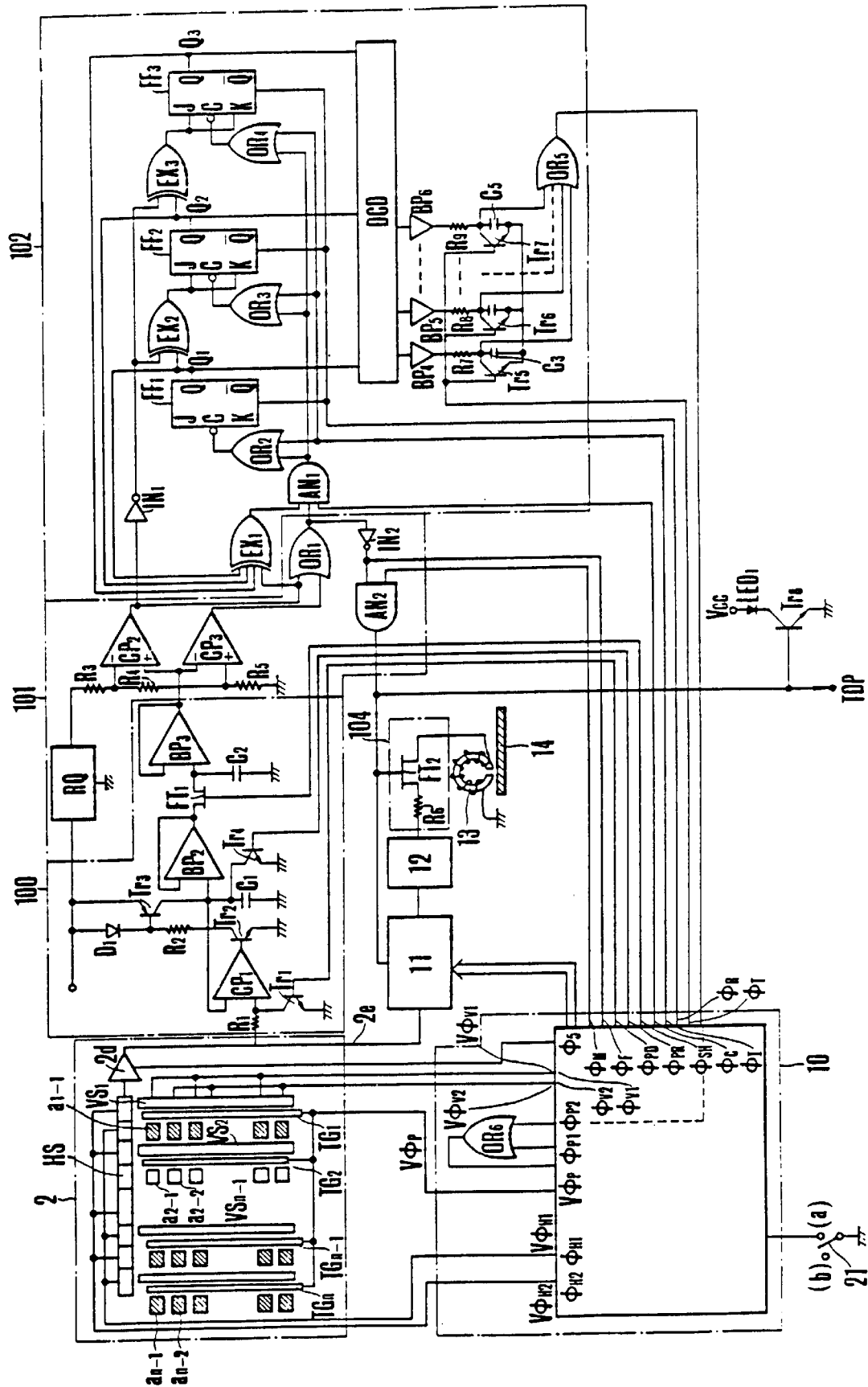

FIGS. 7(a)(b)(c) are diagrams of the circuitry of another embodiment of the present invention, and the waveforms which explain the operation thereof. In said embodiment, there is provided a system where, as a number of image signals are produced in time sequence from the solid state image transducer to constitute single frame picture information, the maximum value of image signal is detected and held, and the storage time is varied so as to effect the entrance of said maximum value within a predetermined region of output voltages, and then the information for the object is put into recording on the magnetic recording medium after the optimum storage time is established. This system enables the solid state image transducer for image signal storage to serve as an photoelectric element for object brightness measurement. Thus, the exposure time control is effected by the single solid state device.

In FIGS. 7(a)(b), the same reference characters have been employed to denote the similar parts to those shown in FIGS. 1 to 6 for the first embodiment. In FIG. 7(a), 100 is a peak detecting circuit for detecting a peak value of image signals produced in time sequence from the solid state image transducer 2; 101 is a discriminating circuit for discriminating whether or not the output of said peak detecting circuit 100 is the predetermined voltage region; 102 is a storage time modifying circuit for shortening the storage time when the peak value based on the output of the discriminating circuit 101 is larger than the predetermined voltage region, and for lengthening the storage time when the peak value is shorter than the predetermined voltage region; 104 is a switching circuit arranged upon occurrence of the peak value of image signal outside the predetermined voltage region as detected based on the output of the discriminating circuit 101 to cut off the transmission of the video signal corresponding to the image signal to the recording head 13, and upon occurrence of the peak value of image signal within the predetermined voltage region only to permit transmission of the video signals to the recording head 13, thereby reliable image recording is performed. 105 is a condenser lens provided on the focusing screen 7; 106 is a penta prism; 107 is an eye-piece lens, these parts constituting a finder optical system.

The details of the main parts of said FIG. 7(a) are shown in FIG. 7(b). In said FIG. 7(b), R1–R9 are resistors; Tr1–Tr7 are transistors; C1–C5 are condensers; CP1–CP3 are comparator circuits; BP2–BP6 are buffer amplifiers; D1 is a diode; FT1, FT2 are analogue gates; RQ is a constant voltage source; IN1, IN2 are inverters; OR1–OR6 are OR gates; EX1–EX3 are exclusive OR gates; AN1, AN2 are AND gates; FF1–FF3 are J-K flip-flops; and DCD is a decoder.

Figure 7D:
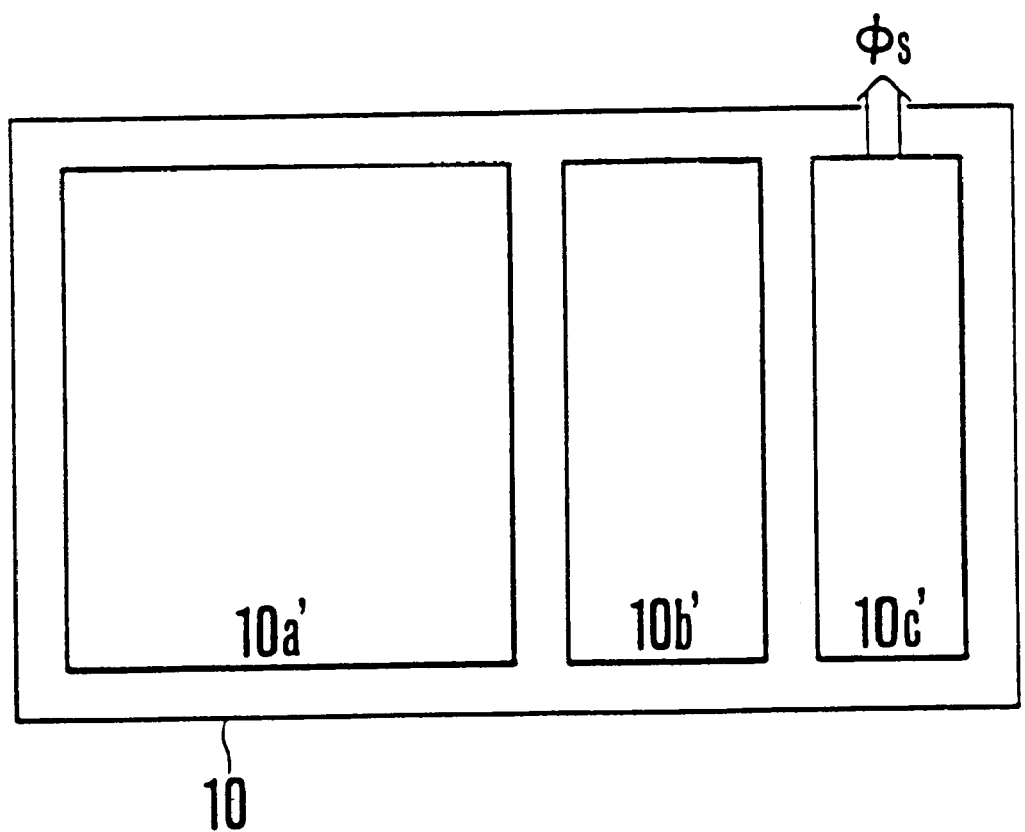
FIG. 7(d) shows the details of the circuit 10' of FIG. 7(a).
Figure 7E:
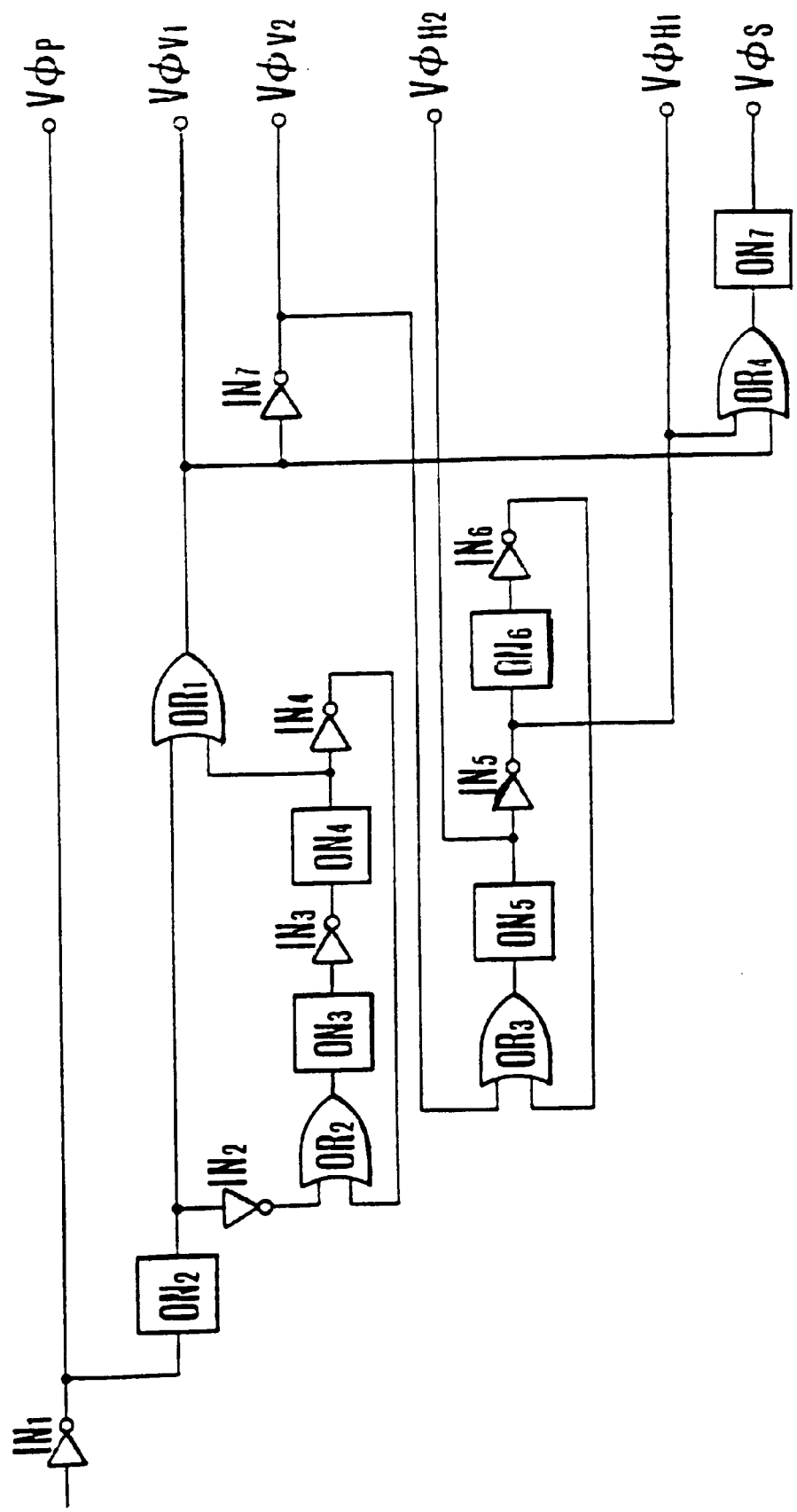
FIG. 7(e) is an electrical circuit diagram showing the details of the circuit 10a' of FIG. 7(d).
Figure 7F:
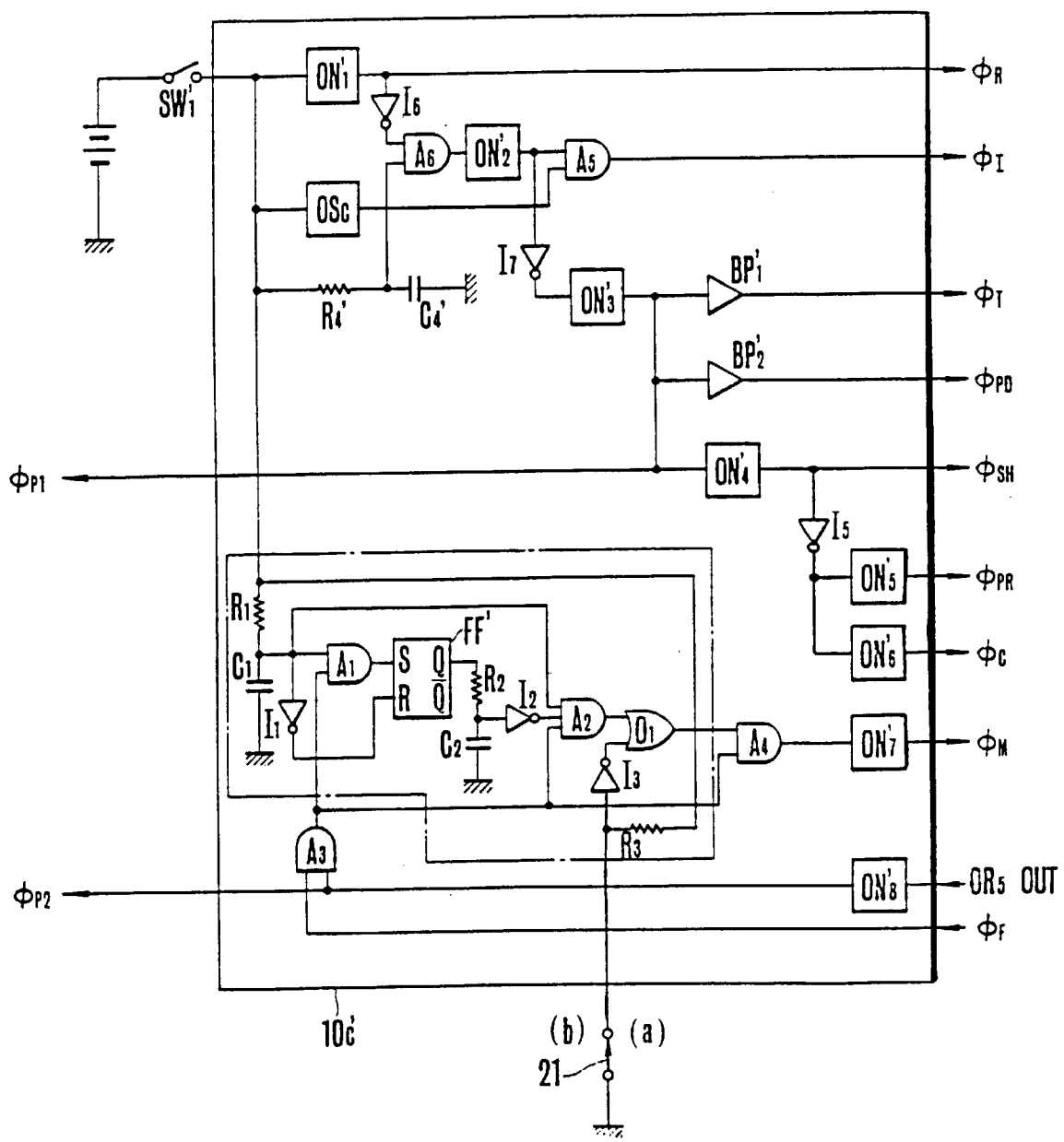
FIG. 7(f) is a circuit diagram showing the details of the circuit 10c' of FIG. 7(d).

FIG. 7(d) is a block diagram showing an example of the synchronizing signal generating circuit 10 of FIG. 7(b). In the diagram, 10a' denotes the solid state image transducer drive circuit shown in FIG. 7(e). This circuit is similar in construction to that shown in FIG. 1(c). Though a detailed explanation is omitted, the input of the inverter IN1 is connected to the output of the OR gate OR6 of FIG. 7(b). And 106' denotes a similar signal transmitting circuit to that shown in FIG. 1(e). 10c' denotes a signal forming circuit shown in FIG. 7(f). In FIG. 7(f), SW1' is a switch arranged to be closed when a release button (not shown) is depressed; ON1' is a one-shot circuit for producing a pulse $\theta_R'$ of FIG. 7(c); R4' and C4' are a resistor and a condenser constituting a timer circuit, the time constant of said circuit is set to be shorter than the time of the width of the pulse $\theta_R'$; I6 is an inverter; A6 is an AND gate, said gate A6 being opened when the pulse $\theta_R'$ from the one-shot ON1' is quenched, thereby a high level is produced; ON2' is a one-shot circuit which is triggered by the output of the AND gate A6 to produce a pulse of a predetermined time width; A5 is an AND gate having one input connected to the one-shot circuit ON2' and another input connected to an oscillator OSC, causing pulses $\theta_I'$ of FIG. 7(c) to be passed during the time equal to the pulse width of the above described one-shot circuit ON2'; I7' is an inverter; ON3' is an inverter which is triggered after the pulse of the one-shot circuit ON2' has vanished, thereby a pulse $\theta_{P1}'$ of FIG. 7(c) is produced; $B_P'$, $B_{P2}'$ are buffer amplifiers for converting the pulse $\theta_{P1}'$ to a pulse $\theta_T'$, $\theta_{PD}'$ of FIG. 7(c); ON4' is a one-shot circuit which is triggered by the pulse of the one-shot circuit ON3' to produce a pulse $\theta_{SH}'$ of FIG. 7(c); I5 is an inverter; ON5' and ON6' are one-shot circuits for producing pulses $\theta_{PR}'$ and $\theta_C'$ of FIG. 7(c) respectively when the pulse $\theta_{SH}'$ has vanished. And, a circuit portion enclosed by a dashed line in FIG. 7(f) is similar in construction to that shown in FIG. 1(h) and functions to produce a high level signal from an OR gate O1 always when in continuous exposure mode, and to produce only one pulse from the above mentioned AND gate A3 through the OR gate O1 when in single frame exposure mode. ON8' is a one-shot circuit, said circuit being triggered by the output of the OR gate OR5 of FIG. 7(b) to produce a pulse $\theta_{P2}'$ of FIG. 7(c); A3 is an AND gate having one input connected to the one-shot circuit ON8' and another input connected to the inverter IN2 of FIG. 7(b); ON7' is a one-shot circuit which is triggered by the output of the AND gate A4 to produce a pulse of a width corresponding to the reading time of the image signals for a one-frame picture.

The operation of the circuit of FIGS. 7(a) and 7(b) will next be described with reference to FIG. 7(c). When a shutter button of a camera, the synchronizing signal generating circuit 10 is rendered operative in a similar manner to that shown in connection with the preceding embodiment to produce the individual signals in time sequence as shown in FIG. 7(c) with the start of control operation. In other words, when a release is actuated first of all, the switch SW1' of FIG. 7(f) is closed in response to the release button, causing the one-shot circuit ON1' to produce the pulse $\theta_R'$ which is fed to the J-K flip-flops FF1–FF3, thereby an up-and-down counter comprising said flip-flops FF1–FF3, exclusive OR gates EX2 and EX3 and inverter IN1' is reset. Again, the pulse $\theta_R'$ is inverted by the inverter of FIG. 7(f), and then applied to the AND gate A6, and then the AND gate A6 produces a high level signal which triggers the one-shot circuit ON2'. Therefore, from the one-shot circuit ON2' there is produced a pulse which is applied to the AND gate A5. Since the other input of said AND gate A5 is connected to the oscillator OSC, the AND gate A5 is opened to pass a clock pulse train $\theta_I'$ from the oscillator OSC therethrough during only the time interval equal to the width of the pulse produced from the one-shot circuit ON2'. Said clock pulses are fed to the clock terminal C of the flip-flop through the OR gates OR2–OR4. Thus, a digital value corresponding to an initial storage time is set in the up-down counter comprising the flip-flops FF1–FF3. After the pulses $\theta_I'$ are produced in such manner during the time equal to the width of the pulse from the one-shot circuit ON2' of FIG. 7(f), the one-shot circuit ON3' of FIG. 7(f) is triggered at a time point $t_2$ in FIG. 7(c) to produce an output pulse which serves directly and after passage through the buffer amplifiers $B_{P1}'$ and $B_{P2}'$ as the pulses $\theta_T'$, $\theta_{PD}'$ shown in FIG. 7(c). Also the one-shot circuit ON4' is triggered by the pulse of the one-shot circuit ON3' to produce a pulse serving as the pulse $\theta_{SH}'$ shown in FIG. 7(c). Said pulse $\theta_{P1}'$ is applied through the OR gate OR6 to the inverter IN1 of FIG. 7(e) and therefrom produced as the pulse $V_{\varphi P}$, which is applied to the transfer gate of the solid state image transducer 2, thereby the image signal stored on the solid state image transducer 2 before the actuation of release is transferred to and memorized in the vertical shift registers in a similar manner to that described in connection with the above mentioned preceding embodiment. Again, in a similar manner to that in the preceding embodiment, pulses $V_{\varphi 1}$, $V_{\varphi 2}$, $V_{\varphi H1}$, $V_{\varphi H2}$ and $V_{\varphi S}$ are produced to start an operation of reading an image signal from the solid state image transducer 2. Again, by the pulse $\theta_T'$, the transistors Tr5–Tr7 of FIG. 7(b) are instantaneously turned on to reset the condensers C3–C5 constituting a time constant circuit for controlling the storage time. Again, by the pulse $\theta_{PD}'$, the transistor Tr1 is instantaneously turned on so that the comparator circuit CP1 is rendered inoperative until the transistor Tr1 is turned off. Again, by the pulse $\theta_{SH}'$, the analogue switch FT1 is instantaneously turned on, thereby the image signal of maximum level among the image signals stored on the first condenser for holding the peak value during the time of preceding reading operation is transferred through the buffer amplifier BP2 to the second holding condenser C2. Next, at a time point $t_3$, the synchronizing signal generating circuit 10 produces the pulses $\theta_{PR}'$ and $\theta_C'$ from the output terminals $\theta_{PR}$ and $\theta_C$ thereof respectively. By the $\theta_{PR}'$, the transistor Tr4 is instantaneously turned on to reset the image signal of maximum level which was held in the condenser C1 during the preceding image signal reading operation. In other words, when the pulse $\theta_{SH}'$ from the one-shot circuit ON4 of FIG. 7(f) has vanished, the output of the inverter I5 changes to the high level signal at which the one-shot circuits ON5' and ON6' are triggered to produce the pulses $\theta_{PR}'$ and $\theta_C'$. Thus, the maximum brightness level signal among the image signals held in the condenser C1 of FIG. 7(b) is reset. Again, at this time, by the pulse $\theta_C'$, a discriminating operation is performed of whether or not the storage time information set in the UP-DOWN counter in the above described manner is revised. If the image signal in the preceding operation is of proper exposure level, the storing operation of the solid state image transducer 2 is controlled in accordance with the initially set storage time. In other words, transferred to the condenser C2 of FIG. 7(h) at the time point $t_2$ is the one of the image signals in the preceding operation which has the maximum level. Therefore, the level of the said image signal is compared by the comparator circuits CP2, CP3. If said level is not within the reference level from the reference voltage source RQ, either one of the comparator circuits CP2 and CP3 produces "1" signal. If within said reference level, the both comparator circuits produce "0" signals, the outputs of said circuits being applied through the OR gate OR1 to the inputs of the AND gate AN1. For this reason, when the pulse $\theta_C'$ is produced, the output state of the AND gate AN1 is determined by the outputs of the above described comparator circuits CP2 and CP3. If the exposure level of the preceding image signal is proper, the AND gate AN1 continues to produce "0" output, and, if improper, said pulse $\theta_C'$ is applied through the AND gate AN1 and the OR gate to the above described UP-DOWN counter with the result that the preset storage time is revised one step.

Now, as has been mentioned above, the one of the image signals which occurs just after the release is detected. As the charges on the photosensitive elements of the solid state image transducer 2 usually amount up to an unnecessarily excessive, or saturated level before the release, the image signal read out just after the release and stored on the holding condenser C1 has an extremely high level, and, therefore, the output of the comparator circuit CP2 serves as "1" signal. Thus, at the time point $t_3$ in FIG. 7(c), the content of the UP-DOWN counter advances one count. By this, the decoder DCD is caused to select a time constant circuit corresponding to the new content of the UP-DOWN counter. Said time constant circuit controls the storage time. After the storage time determined by said time constant circuit, at a time point $t_4$, the pulse $\theta_{P2}'$ is produced through the OR gate OR5, and after having passed through OR gate OR6 serves as the above described transfer pulse $V_{\varphi P}$ to be applied to the solid state image transducer 2, thereby the image signal stored during the aforesaid storage time, that is, during the first storing operation after the release is transferred to the vertical shift registers. Again, on the other hand, from the time point $t_3$ onward, the image signals transferred at the time point $t_2$ are read out in time sequence in a similar manner to that described in connection with the first embodiment. Of said sequentially readout image signals, the signal of maximum level is held by the condenser C1 in the constant current type peak detecting circuit which comprises the comparator circuit CP1, transistor Tr2, resistor R2, diode D1, transistor Tr3 and condenser C1. For this reason, when the image signal is transferred to the vertical shift registers at the time point $t_4$ as has been mentioned above, the one of the preceding image signals transferred to the condenser C1 which is of maximum level is again transferred to the condenser C2 for performing comparing operation by the comparator circuits CP2 and CP3. If the level of said image signal is not a proper exposure level, the content of the UP-DOWN counter is renewed so that the storing operation is performed for said renewed storage time. Therefore, until the level of the image signal becomes the proper level, the storage time is gradually increased or decreased step by step. Such storage time setting operation for the proper exposure proceeds until both of the comparator circuits CP1 and CP2 produce first "0" signals simultaneously. After that, the AND gate AN1 continues to produce "0" signal, and therefore the renewing operation of the UP-DOWN counter occurs no longer. By that time constant circuit which forms a certain storage time for assurance of the proper exposure, the following operation for control of the storage time is performed. Again, on the other hand, since the output of the OR gate OR1 after having passed through the inverter IN2 is applied to the input of the AND gate AN2, the AND gate AN2 produces. "0" signal which lasts until the comparator circuits CP2 and CP3 both produce "0" signals, that is, until an image signal of proper exposure level for the set value of storage time can be obtained. When both of the comparator circuits CP2 and CP3 produce "0" signals, that is, when the storage time is set to a value for the proper exposure level in producing image signals, the AND gate AN2 produces for the first place "1" signal. Therefore, only after the set value of storage time is found to be proper for obtaining an image signal of correct exposure level, the analogue switch FT2 is actuated to permit application of the video signals from the image signal processing circuit 11 and video recording signal generating circuit 12 to the head 13 with the start of image signal recording on the recording medium 14. Thus, the recording operation of the image signals on the recording medium 14 is not performed until the image signal takes the proper exposure level to insure that the image signals recorded are all of the correct exposure level.

When the storage time is set to the proper value, as has been mentioned above, the OR gate OR1 of FIG. 7(b) produces the low level signal, and the inverter IN2 produces the high level signal. Said signal is applied to the input terminal $\theta_F$ of the circuit 10. Therefore, the high level signal is applied to one of the inputs of AND gate A3 of FIG. 7(f). Therefore, as has been mentioned above, at the time point at which the storage time control starts, by the high level signal produced from the OR gate OR5 of FIG. 7(b), the one-shot circuit of FIG. 7(f) is triggered to produce the pulse $\theta_{P2}'$. Then, the pulse is applied from the AND gate A3 to the AND gate A4, and, when in the continuous exposure mode, therefrom through said AND gate A4 to the one-shot circuit ON7'. Therefore, the one-shot circuit ON7' produces a pulse which is maintained at a high level during the time when image signals for a one-frame image are read out, and which is then applied to the AND gate of FIG. 7(b) to open the gate FT2 for that time. Again, on the other hand, the above described pulse $\theta_{P2}'$ is applied through the OR gate OR6 of FIG. 7(b) to the inverter IN1 in FIG. 7(e), and therefrom applied as the transfer pulse $V_{\varphi P}$ to the image transducer 2, thereby the reading operation of image signals is performed as has been mentioned above, as they are converted to the NTSC signals by the image signal processing circuit 11 and to the video signals by the video recording signal generating circuit 12. The video signals are applied through the gate FT2 to the head 13 by which they are recorded on the recording medium 14. After the signals of one-frame image have been recorded in such manner, the above mentioned procedure is repeated again with the signal from the OR gate OR5 in FIG. 7(b). Thus, a continuous succession of one-frame video signals are recorded.

When a single frame exposure mode is selected, since the switch 2 is connected to the contact (b) in FIG. 7(f), and AND gate A4 is made responsive to the only one pulse applied through the AND gate A3 in a similar manner to that shown in the above mentioned FIG. 1(h) case. Thus, the one-shot circuit ON7' is only one triggered. Therefore, the gate FT2 of FIG. 7(b) allows only one frame video signals to be applied to the head 13 to carry out a single frame image recording.

It is noted that TR3 of FIG. 7(b) is a transistor; LED1 is a light-emitting diode serving as an action lamp arranged to be energized when the output of the AND gate AN2 changes to "1" level at which the recording operation of image signals on the recording medium starts. Again, the output of said AND gate AN2 is fed to a terminal TDP upon connection to a warning means such as buzzer, informing the operator of the fact that a recording operation is under progress. Again, the exclusive OR gate EX1 is arranged to produce "0" signal when the content of the UP-DOWN counter reaches the upper or lower limit value so that the following renewing operation of the counter is inhibited, that is, the storage time remains unchanged thereafter, or otherwise when the counter advances one count from the upper limit content, the lower limit content is resulted. Likewise, the lower limit content of the counter is renewed in the next one step to the upper limit one. Thus, the storage time is prevented from changing from the longest to shortest value, or from the shortest to longest value for more one count of the counter. Again, the output terminal $\theta_S$ of the synchronizing signal generating circuit 10 of FIG. 7(b) is coincident with that of the circuit 10C' of FIG. 7(d) which circuit is similar in construction to that of FIG. 1(e). Through this output terminal, the above mentioned synchronizing signals are applied to the image signal processing circuit of FIG. 7(b).

FIG. 8(a) is a block diagram showing still another embodiment of the present invention, where the same reference characters have been employed to denote the similar parts to those shown in FIGS. 1 to 7. In FIG. 8(a), 300 is a diaphragm which is normally closed to shield the solid state image transducer 2 from light entering through the optics 1 except for the exposure time, thereby the solid state image transducer is protected from accidental damage by burning; 303 is a switching means, said means functioning to transmit a diaphragm signal from an exposure control computing circuit 305 through a switching means 302 to a meter 301; 306 is a switching means, said switching means having a contacts (a) and (b) arranged so that a connection to the contact (a) is effected by a signal from a switch 310 which is closed when a release of first stroke is made to transmit a release button signal to the switching means 302, thereby the switching means 302 is connected to the contact (a) to apply a voltage Vcc to the meter 301, and therefore, the diaphragm 300 is fully opened; 311 is a switch arranged to be closed when a release button 312 is depressed to the second stroke, the ON signal of said switch being applied to one input of an AND gate 309; 307 is an exposure time control timer circuit, said timer circuit responsive to a pulse from a differentiation circuit 308 changing its output from "1" to "0" level, and holding said "0" signal until one cycle of recording operation of image signals on a recording medium 14 is completed. After the image signals have been recorded, the "1" signal is recovered. Again, the exposure control computer circuit 305 responsive to the output of the AND gate 309 memorizes the output of the photoelectric element 6 and computes a diaphragm value and a value of storage time; 304 is a storage time control circuit which gives a storage time completion signal based on the storage time computed by the exposure computation control circuit 305, or pre-selected, to the synchronizing signal generating circuit 10, the synchronizing signal generating circuit 10 producing the above mentioned transfer pulse $V_{\varphi P}$ which causes the image signals stored on the solid state image transducer 2 to be memorized in the vertical shift registers as has been mentioned before. Again, the said synchronizing signal generating circuit 10 responsive to the output of the AND gate 309 is rendered operative to produce the above described transfer pulse $V_{\varphi P}$, and to perform transfer of the image signals before the release. Again, the synchronizing signal generating circuit 10 produces a signal which sets the gate circuit to the open state when the control of the storage time by the storage time control circuit has been completed, causing the image signal exposed during the controlled time by the storage time control circuit to be fed to the head 13 as the video signals.

Figure 8B:
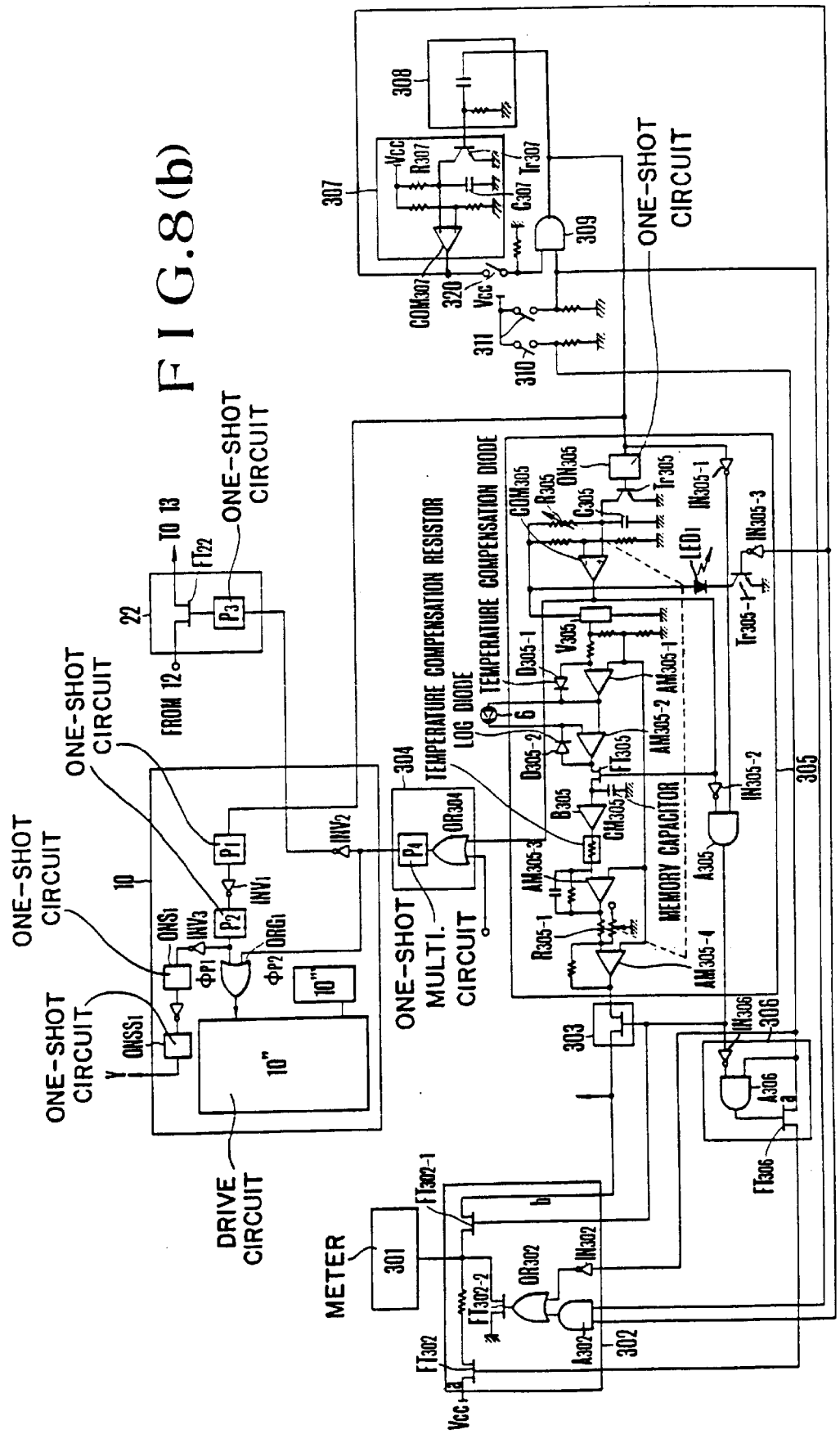
FIG. 8(b) shows the details of the circuits of FIG. 8(a).

FIG. 8(b) shows the details of the essential parts of FIG. 8(a). In said FIG. 8(a), as the exposure control computer circuit 305, a storage time preset type exposure control computer circuit is applied. In FIG. 8(b), a timer circuit indicated at 307 is formed from a time constant circuit comprising a resistor R307 and a condenser C307, a comparator COM307 and a transistor Tr307. Again in the circuit 305, ON305 is a one-shot circuit; Tr305 is a transistor; R305 is a variable resistor having a resistance value varied in cooperation with a time setting dial (not shown); C305 is a condenser forming a timer for regulating the storage time together with the above described resistor R305; COM 305 is a comparator; V305 is a constant voltage circuit; AM305-1 is an amplifier; D305-1 is a diode forming a temperature compensation amplifier together with the above described amplifier AM305-1; AM305-2 is a light measuring amplifier having an input and output across which a diode D305-2 is connected; FT30 is a gate connected to the output of the above described comparator COM305 and functioning as a memory switch; CM305 is a memory condenser; B305 is a buffer amplifier; AM305-3 is an amplifier; AM305-4 is a computation amplifier for computing storage time information set in a resistor R305-1 cooperative with the above described resistor R305 and brightness information memorized on the above described condenser CM305 to compute a diaphragm value which provides a proper exposure level; IN305-1 and IN305-2 are inverters; A305 is an AND gate; again IN3053 is an inverter, said inverter being connected to the output of the timer circuit 307; Tr305-1 is a transistor, said transistor being turned on by the output of the inverter IN3053 to energize LED, LED1 for display; again a switch means of 306 is formed from an inverter IN306, AND gate A306 and analogue gate FT306, and the opening and closing operation of said switch means 306 is controlled by the output of the above described AND gate A305; a switching means of 302 is formed from analogue gates FT302, FT302-1 and FT302-2, an inverter IN302, and AND gate A302, and an OR gate OR302; again a storage time control circuit of 304 if formed from a one-shot circuit P4 and an OR gate OR304; a synchronizing signal generating circuit 10 is formed from inverters INV1 to INV3, one-shot circuits P1, P2, ONS1 and ONSS1, and OR gate ORG1, a drive circuit 10", a signal transmitting circuit 10'''. The drive circuit 10" is the same as that shown in the above mentioned FIG. 7(e), so its explanation is omitted, and said signal transmitting circuit 10''' is substantially the same as that shown in the above mentioned FIG. 1(e), so its explanation is omitted; again a gate circuit 20 is formed from a one-shot circuit P3 for producing a pulse whose width is equal to the time of reading out a one-frame image, and an analogue gate FT22.

The operation of the embodiment of FIG. 8 is as follows: When the release button 312 is depressed to the first stroke, the switch 310 is closed. Responsive to this, the switch means 306 connects the contact (a) to produce the ON signal which is applied to the switch means 302, thereby said means 302 is connected to the contact (a) and the voltage Vcc is applied to the meter 301. In other words, as shown in FIG. 8(b), the AND gate of the switch means 306 is opened by the opening of the switch 310, and the gate FT306 is opened to apply the high level signal through the switch 310 and gate FT306 to the gate FT302 of the switch means, thereby the gate FT302 is turned on. Therefore, the voltage Vcc is applied through the FT302 to the meter 301. For this reason, the pointer of the meter 301 is deflected to the maximum value, and the diaphragm cooperative with the meter pointer is fully opened so that light from the object being photographed is incident upon the photoelectric element 6 for light metering operation at the full open aperture, and said photoelectric element produces a brightness signal which is applied to the exposure computation control circuit 305.

Figure 8C:
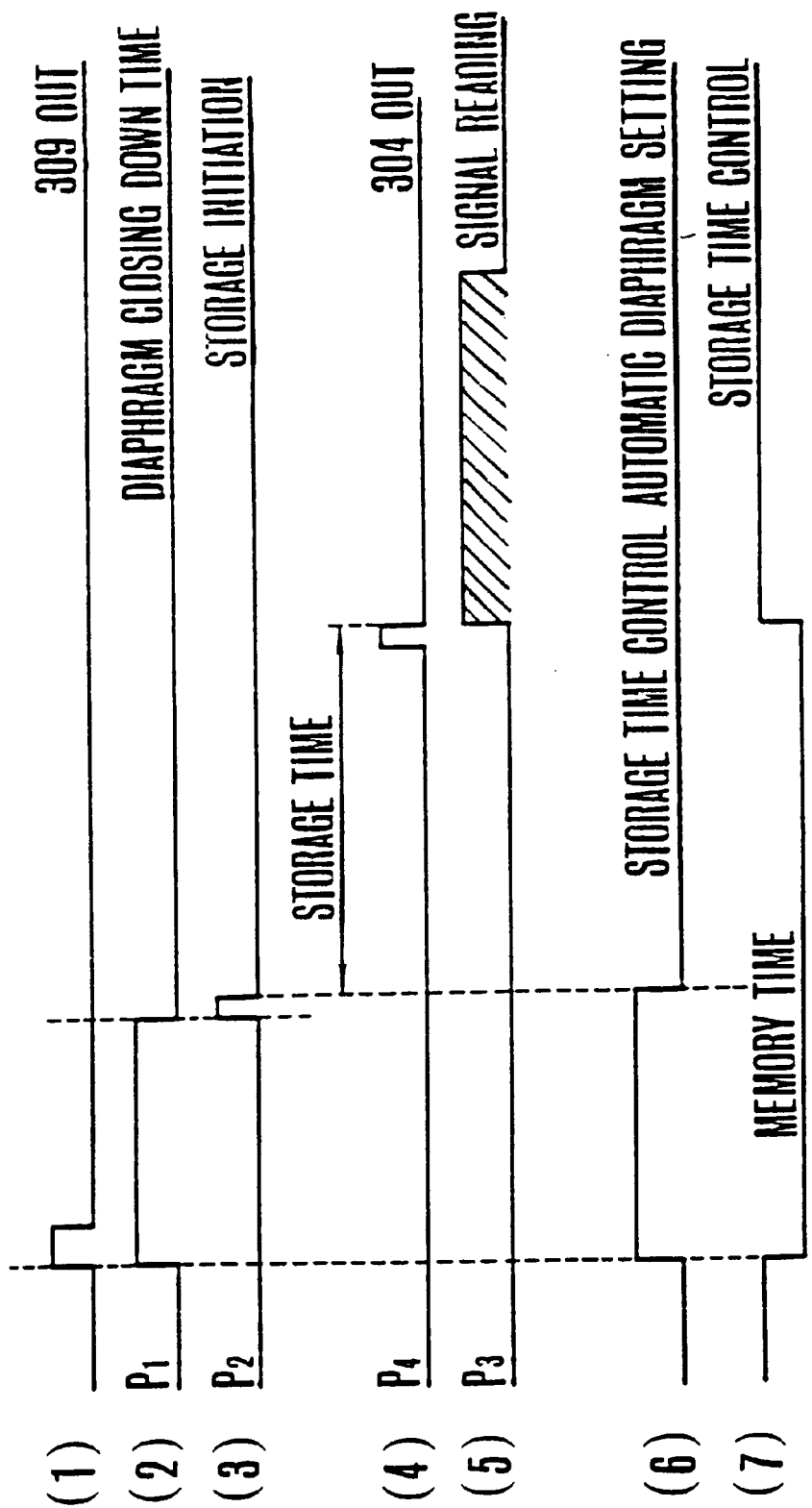
FIG. 8(c) is the waveforms showing a manner in which the circuit of FIG. 8(b) may operate.

After that, when the release button 312 is further depressed, the switch 311 is turned on causing the AND gate 309 to produce "1" signal which is applied to the exposure computation control circuit 305, and said circuit 305 memorizes the above described brightness signal. In other words, since the condenser C307 of the timer circuit 307 in FIG. 8(b) is charged in the initial state, and the comparator COM307 produces the high level signal which is applied through the switch 320 to the AND gate 309 at one input thereof, the ON operation of the switch 311 causes the AND gate 309 to produce the high level signal. By said high level signal, the differentiation circuit 308 produces a differentiation pulse, causing the transistor Tr307 of the timer circuit to be instantaneously turned on to discharge the charge stored on the condenser C307. Therefore, the comparator COM307 produces a low level signal which closes the AND gate 309. Therefore, when the switch 311 is turned on, the AND gate 309 produces a pulse as shown in FIG. 8(c) at (1), and the pulse of said AND gate 309 is fed to the one-shot circuit ON305, thereby said circuit is triggered to produce a pulse shown in FIG. 8(c) at (6). Therefore, the transistor Tr305 is turned on for a predetermined time, and short-circuits the condenser C305 for the predetermined time, causing the comparator COM305 to produce a low level signal, and therefore causing the gate FT305 to be turned off. Thus, the brightness information light-received by the photoelectric element 6 is memorized on the condenser CM305. Again, the signal from said AND gate 309 is fed to the switch means 303, 306, thereby the switch means 303 is turned on, and the switch means 306 is connected to the contact (b), so that the computed diaphragm value is fed through the switch means 303 to the switch means 302. Said diaphragm value signal is applied to the meter 301 through the contact (b) of the switch means 302, and the diaphragm 300 is closed down to the computed diaphragm value. That is, when the pulse from the AND gate 309 has vanished, the inverter IN3051 produces a high level signal, and, as has been mentioned above, since the comparator COM305 produces a low level signal and the output of the inverter IN3052 is of high level, the AND gate A305 produces a high level signal, thus the switch means 303 being turned on. Again, since the gate FT302-1 of the switching means 302 is turned on by the output of the AND gate A305, the computed diaphragm value is applied through the switch means 303, and gate FT302-1 to the meter 301. Thus, the diaphragm 300 is closed down to the computed diaphragm setting. It is noted that at this time the output of the inverter IN306 is changed to the low level by the output of the AND gate A305 to close the AND gate A306, and to turn off the FT306. Therefore, the FT302 is turned off to remove the influence of the voltage Vcc which was applied to the meter 301 through the FT302.

Again, the above described "1" signal from the AND gate 309 is applied as a start signal to the synchronizing signal generating circuit 10, thereby said circuit 10 is rendered operative, and the transfer pulse $V_{\phi P}$ is fed to the solid state image transducer 2. The image signal stored before the release is transferred to the vertical shift register, and is converted to the video signals by the above mentioned operation which are then applied to the head 13. At this time, however, the gate circuit 22 remains not open yet as will be described later, the recording of the image signal before the release is not performed. Again, in synchronism with the above described transfer pulse $V_{\phi P}$, the time control of the set storage time is initiated by the storage time control circuit 304. After the time based on the said set storage time, the next transfer pulse $V_{\phi P}$ is produced to terminate the storing operation of the image signal on the solid state image transducer. Thus, the image signal stored on the solid state image transducer 2 during the said storage time is transferred to the vertical shift registers. Again, at this time, the signal from the synchronizing signal generating circuit 10 is fed to the gate circuit 22, and the gate circuit is opened to feed the head 13 with the video signals corresponding to the image signal controlled for the storage time. Thus, a one-frame image is recorded on the recording medium 14. Again, when the recording of the image signal has been completed, the output of the timer circuit 307 is inverted from "0" to "1" signal. For this reason, if the release button 312 continues to be depressed, the AND gate 309 produces a second "1" signal. Thus, the above described operation is repeated to perform a continuous succession of one-frame exposure. That is, since the output of the AND gate 309 is fed to the one-shot circuit P1 in FIG. 8(b), said one-shot circuit P1 produces a pulse shown in FIG. 8(c) at (2). Therefore, when said pulse has vanished, the high level signal is fed through the inverter INV1 to the one-shot circuit P2 so that said circuit produces an output pulse shown in FIG. 8(c) at (3). Therefore, said pulse is fed through the OR gate ORG1 to the drive circuit 10". Since said circuit 10" has the same construction as that of the circuit shown in FIG. 7(e), the above mentioned pulses $V_{\phi P}$, $V_{\phi V1}$, $V_{\phi V2}$, $V_{\phi H1}$, $V_{\phi H2}$ and $V_{\phi S}$ are produced in response to the pulse from the ORG1 to perform reading operation of the image signal and to initiate storing operation of the image signal. Therefore, the image signal is converted to the NTSC signal and video signals by the image signal processing circuit 11 and video recording signal generating circuit 12 respectively, and is then applied to the gate circuit 22. It is noted that at this time the gate circuit 22 is off, so that no image signal recording is performed. Again, since the pulse width time produced from the one-shot circuit ON305 is made equal to the sum of the pulse width times of the pulses from the one-shot circuits P1, P2, the pulse of the one-shot circuit ON305 vanishes at a time point at which the pulse from the one-shot circuit P2 has banished, that is, in synchronism with the time point at which the storing operation of the image signal is initiated by the pulse $V_{\phi P}$, as shown in FIG. 8(c). Therefore, the transistor Tr305 is turned off at that time point. Thus, the timer circuit of the resistor R305 and condenser C305 starts to operate. Since said resistor R305 is adjusted to the value set by the storage time setting dial (not shown) (exposure time setting dial), the output of the timer circuit reaches a predetermined level after the set time. At this time point, therefore, the comparator COM305 is inverted to produce a high level signal which triggers the one-shot circuit P4 of the storage time control circuit 304. From the P4 there is produced a pulse shown in FIG. 8(c) at (4). Said pulse is fed through the OR gate ORG1 to the circuit 10". Thus, the reading operation of the image signal exposed during the above described set value of storage time is performed. Again, since the pulse from the one-shot circuit P4 is applied through the inverter INV2 to the one-shot circuit P3 which produces a pulse of a width equal to the time during which the image signal for the one-frame image can be read out as shown in FIG. 8(c) at (5). Therefore, the gate FT22 allows the image signal for one-frame image to be fed to the head 13 therethrough, and the video signal corresponding to the image signal whose exposure level is controlled so as to become proper. When the one-frame image recording is completed in such manner, the output of the timer circuit consisting of the resistor R307 and the condenser C307 has reached the predetermined level, and the comparator COM307 is inverted. From the AND gate 309, therefore, there is again produced a pulse to repeat the above described operation. Thus, a continuous succession of exposures are performed.

Such succession of exposures continue to perform until the depression of the release button 312 is released. When the depression of the release button is released, the exposure is terminated. By the release of the release button, the switch means 302 is connected to the contact (c) so that the diaphragm is entirely closed to terminate the duration of all the exposures. That is, when the depression of the release button is released, the switches 310 and 311 are turned off, and the AND gate 309 is also closed, thereby the exposure operation that follows is terminated. And, by turning off of the switch 310, the high level signal is produced from the inverter IN302, and the gate FT302-2 is turned on through the OR gate OR302. Thus, applied to the meter 301 is an almost earth potential, thereby the diaphragm is entirely closed.

Whilst the continuous succession of exposures are performed in such manner, the single frame exposure is performed in such a manner as follows. The normally closed switch 320 is turned off when the release button is depressed further deeply from the second stroke, so that after a one-frame image has been recorded, no more "1" signal is produced from the AND gate 309. Thus, the single frame exposure has been completed, all the exposure operation is terminated. Again, when in the single frame exposure mode, the inversion of the output of the timer circuit 307 from the "0" to "1" signal after the completion of recording of the single frame image results in the connection of the switch means 302 to the contact (c). Thus, as soon as the exposure is completed, the diaphragm is entirely closed. That is, when the image recording has been completed, the timer 307 produces the high level signal and therefore the AND gate A302 produces the high level signal which is applied through the OR gate OR302 to the gate FT302-2. Therefore, the gate FT302-2 is turned on to close the diaphragm as has been mentioned above. Again, the above described control procedure, the output of the timer circuit 307 is applied to the exposure computation control circuit 305. Therefore, during the time when the output of the timer circuit is "0" signal, that is, during the time betweeen the moment at which the release is actuated and the moment at which the image recording is completed, the warning circuit is rendered operative by said "0" signal to indicate that the exposure operation is under progress by a lamp and the like. That is, the output of the timer circuit 307 is applied through the inverter IN3053 of FIG. 8(b) to the transistor Tr305-1, thereby the transistor Tr305-1 is turned on and maintained in this state during the time when the output of the timer circuit is "0". Thus the LED, LED1 are energized to inform the operator of the fact that the exposure operation is under progress.

Figure 8D:
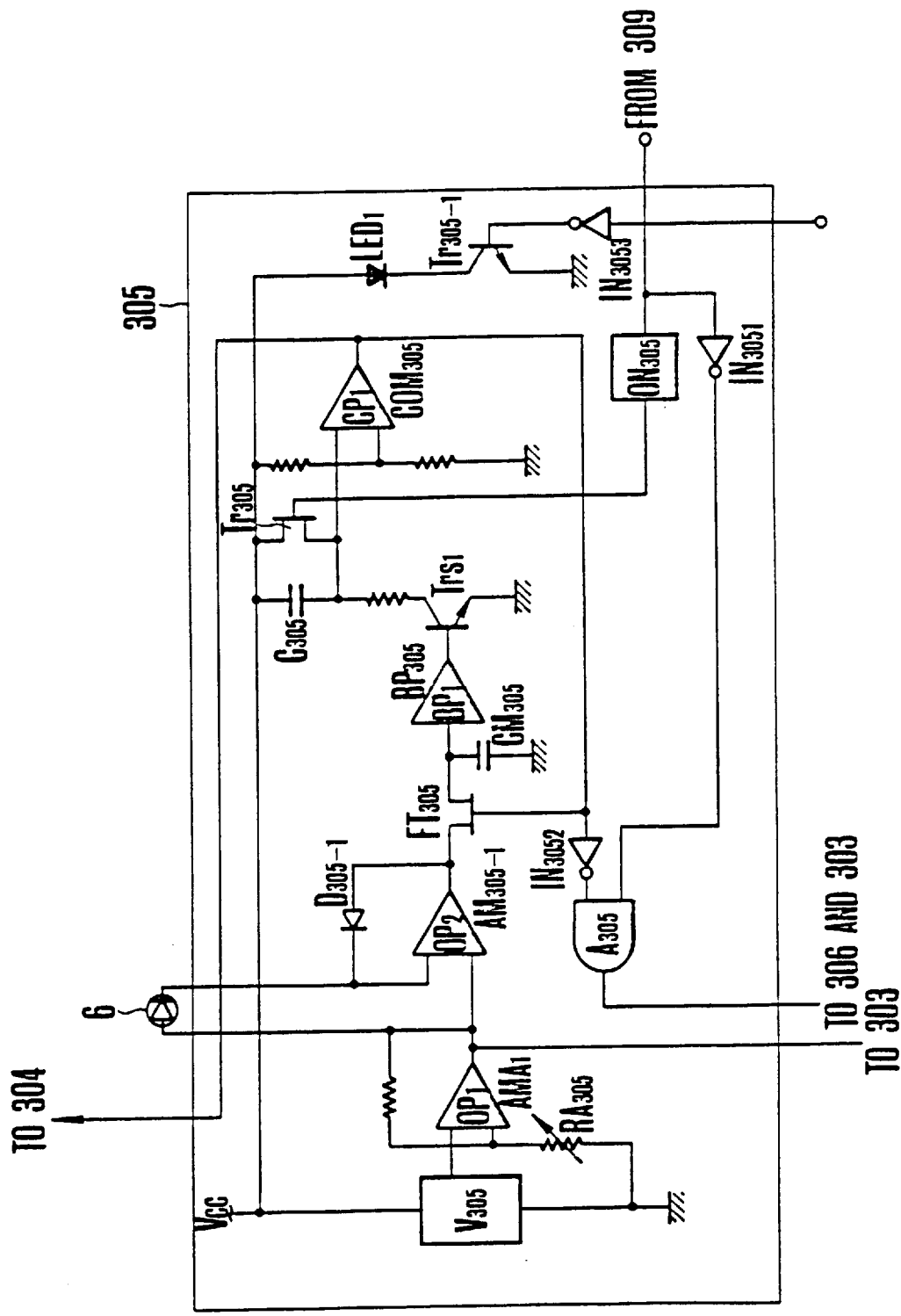
FIG. 8(d) is a circuit diagram showing another practical example of the circuit 305 of FIG. 8(a).

Whilst the above described operation is exemplified for the storage time preselected, the diaphragm value may be preselected in such a manner as in the diaphragm preselection automatic exposure mode. Thus, the storage time is determined based on the brightness signal and the preselected diaphragm value by the exposure computation control circuit 305, thereby the period of storing operation of an image signal on the solid state image transducer 2 is limited by the computed storage time, and the diaphragm 300 is controlled by the set diaphragm value. That is, for the diaphragm preselection exposure, as the exposure computation control circuit 305, instead of the circuit shown in FIG. 8(b), a circuit adapted for the diaphragm priority shown in FIG. 8(d) may be used in connection with the other circuit portions of FIG. 8(a)(b). In FIG. 8(d), since the same constituent elements as those shown in FIG. 8(b) are appended with the same reference characters, its different points only are explained below. In the figure, RA305 is a variable resistor cooperative with a diaphragm setting means (not shown), and a voltage corresponding to the resistance value of said resistor RA305 is produced from an amplifier AMA1. Since the output of said amplifier AMA1 is fed to the switch means 303 of FIG. 8(b), the meter 301 shown in FIG. 8(a)(b) is determined in deflection angle based on the preset diaphragm value, and the diaphragm is controlled during exposure. Again, the output of the amplifier AMA1 is applied to an amplifier AM305-1, so that the preset diaphragm value and brightness information are computed to derive a storage time which makes the exposure level of image signal proper, and which is memorized in the condenser CM305. TrS1 is a transistor for elongating the memorized storage time information of said condenser CM305, the condenser C305 being charged by the output current of said transistor. The output of said condenser C305 is connected to the comparator COM305 so that when the output of the condenser C305 has reached a predetermined level, the comparator is inverted to trigger the one-shot circuit of the circuit 304. Therefore, in the case of the diaphragm priority exposure, the diaphragm is controlled based on the preset value of diaphragm aperture, and the storing operation of the image signal is performed with the computed storage time.

For photography in the so-called magic exposure mode, the exposure computation control circuit 305 may be modified so that when the computed diaphragm value or storage time exceeds the limit of diaphragm value, or storage time available, the preset value of diaphragm aperture or storage time is altered based on said limit of diaphragm value of storage time to effect a proper exposure.

For photography in the program mode, the exposure computation circuit may be modified so that the diaphragm value and storage time are controlled in accordance with the brightness signal from the photoelectric element 6 to effect an exposure control with the computed values of diaphragm aperture and storage time.

Since the exposure control operation in such mode is quite the same as that described in connection with the storage time setting mode, the detailed explanation therefor is omitted.

Nest, the flash exposure will be explained. Before the explanation of the operation of the flash exposure mode, two flash devices which are used when in the flash exposure mode will be explained below.

Figure 8E:
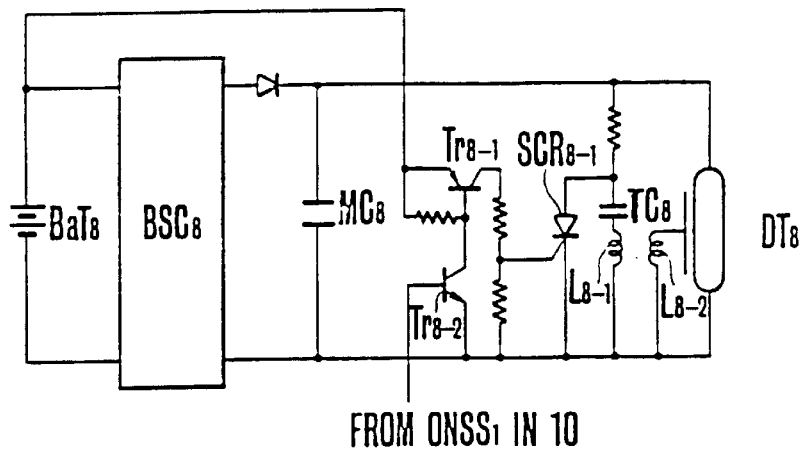
FIGS. 8(e) and 8(f) are circuit diagrams showing two different examples of flash tube firing circuits adapted for use with the camera of FIGS. 8(a) to 8(d).
Figure 8F:
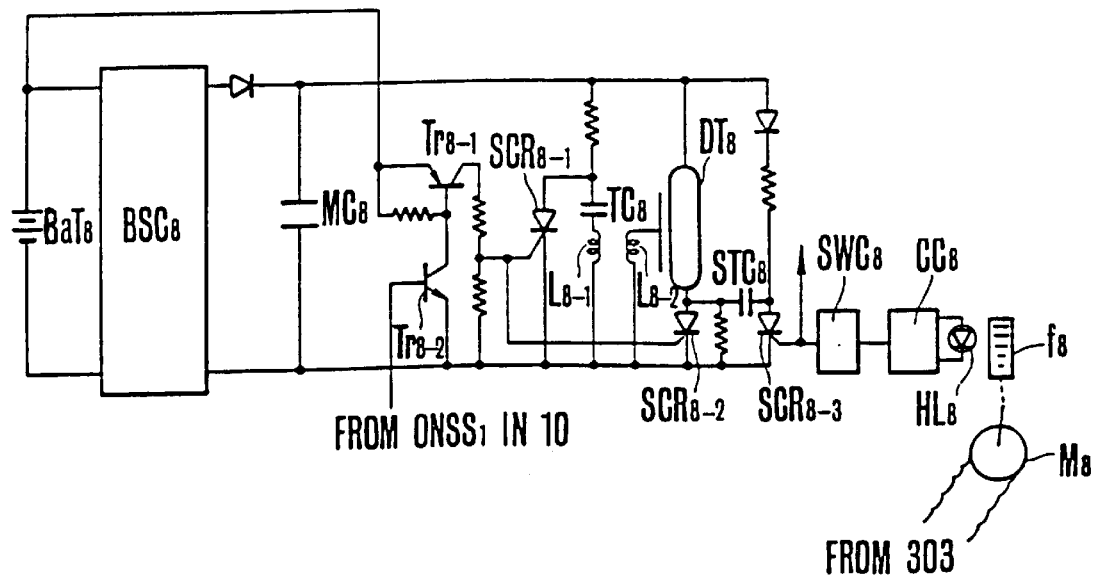

FIGS. 8(e) and 8(f) show an example of embodiment of an ordinary flash device and so-called computer strobe which are used when in the flash exposure mode. Said circuits are both known in the art, and their detailed explanation is omitted. In FIG. 8(e)(f), BaT8 is an electrical power source; BSC3 is a booster circuit; MC8 is a main condenser; Tr8-1 and Tr8-2 are switching transistors, the base of the transistor Tr8-2 being connected to the output of one-shot circuit ONSS1 of FIG. 8(b); SCR8-1 is a thyristor; TC8 is a trigger condenser; L8-1 and L8-2 are trigger coils; DT8 is a discharge tube. With such circuit elements, the ordinary flash device of FIG. 8(e) is constructed, but the computer strobe of FIG. 8(f) further includes thyristors SCR8-2 and SCR8-3, a commutation condenser STC8, a light-receiving element HL8, an integrating circuit CC8 for integrating the amount of light received by the light-receiving element HL8, and a switching circuit SWC3 responsive to the output of the integrating circuit for producing a high level signal. The output of said switching circuit SWC8 is connected to the OR gate OR304 of FIG. 8(b) at one input thereof. Again, M8 is a meter to which is applied a voltage corresponding to the diaphragm value in the form of a voltage from the switching means 303; f8 is a filter positioned in front of the light-receiving element HL8 to control the amount of light incident upon the light-receiving element HL8 in accordance with the angle of deflection of the meter M8.

At first, explanation is given to the case where exposure is made by use of the flash device of FIG 8(e). In this case, the flash device of FIG. 8(e) is attached to the camera of FIG. 8(a)(b) with the output of the one-shot circuit ONSS1 of the synchronizing signal generating circuit 10 of FIG. 8(a)(b) connected to the base of the transistor Tr8-2 of FIG. 8(e). In this state, when the release button is depressed to initiate an exposure operation as has been mentioned before, the one-shot circuit P2 of FIG. 8(b) produces a pulse which is applied through the OR gate ORG1 to the circuit 10". Then, the image storing operation of the image transducer is initiated. Again this pulse is applied through the inverter INV3 to the one-shot circuit ONS1, thereby said one-shot circuit ONS1 is triggered. Since the pulse width produced from said one-shot circuit ONS1 corresponds to the period of reading operation for every one frame image signal, after the initiation of image storing operation, when the image signal for one-frame image has been read out, the one-shot circuit ONSS1 is triggered through the inverter. The pulse from said one-shot circuit ONSS1 is applied to the transistor Tr8-2 in FIG. 8(e), thereby the transistors Tr8-1 and Tr8-2 are turned on. Then, the thyristor SCR8-1 also is turned on to discharge the charge on the trigger condenser TC8, and the flash discharge tube DT8 is triggered to emit flash light. After the flash light is produced in such manner, as has been mentioned before, the elapse of the preset storage time is followed by the initiation of reading the image signal. Thus, the flash exposure is completed.

Next, explanation is given to the case where flash exposure is made by use of the computer strobe of FIG. 8(f). In this case, at first, the output terminal of the one-shot circuit ONSS1 of FIG. 8(b) must be connected to the base of the transistor Tr8-2 of FIG. 8(f), and then the output terminal of 303 and one of the inputs of the OR gate OR304 of the circuit 304 of FIG. 8(b) are connected to the output terminals of the meter M8 and switching circuit SWC8 of FIG. 8(f). In this state, when the release operation is performed, as has been mentioned before, the image storing operation is initiated, then the reading operation of signals for one-frame image is completed, then the one-shot circuit ONSS1 produces a pulse, then flash light is produced, then the light of said flash device after reflection enters through the filter f8 to the light-receiving element HL8, and then the integrating operation of said light amount is performed by the integrating circuit CC3. As a result, when the amount of flash light has reached a predetermined level, the switching circuit SWC8 is actuated to turn on the thyristor SCR8-3. Thus, the flash light is stopped in a manner know in the art. On the other hand, the output of the switching circuit is applied through the OR gate OR304 to trigger the one-shot circuit P4. After that, as has been mentioned before, the storing operation of the image signal is completed, then the image signal exposed to the flash light is read out, and then the flash exposure is terminated. It is to be understood that in the case of exposure by the computer strobe, the storage time is controlled by the flash light stopping signal from the computer strobe. Thus, when the proper exposure level is attained, the storing operation is terminated. It is noted that at this time, the angle of deflection of the meter M8 corresponds to the computed value of diaphragm aperture, and such diaphragm information is introduced into the flash device by the filter f8. Therefore, an accurate exposure control can be performed. Again, the time point at which the flash tube is fired occurs after the storing operation is initiated and after the reading operation of signals for the one-frame image is terminated. Therefore, the image signal readout is always regulated to a value corresponding to the flash light amount.

FIG. 10 is a block diagram showing another embodiment of the exposure computation control circuit 305 of FIG. 8(a), said circuit being adapted to perform exposure in the various modes. The details of this circuit are described in Japanese Patent Application Sho 53-36379. Accordingly, the detailed description thereof is omitted, but its outline will be sketched below. In FIG. 10, block A is a control circuit for daylight photography; block B is a control circuit for flash photography; SW201 in block A is a mode changeover switch for selecting one of the modes; SW202 is a shift switch for changing over the set value of storage time for the image transducer 2, or of diaphragm aperture, the pole of said switch SW202 being switchable to any one of three positions (a), (b) and (c); SW203 is a frame number setting switch, the number of frames depending upon the capacity of a recording medium loaded in the camera; SW204 is a frame counter switch which is closed each time a one-frame exposure is completed; SW205 is a switch for starting an oscillator circuit arranged to be closed in cooperation with the switches SW201 and SW203. Again, said switch 205 is automatically closed when the switch SW202 is connected to either one of the contacts (a) and (c); block 201 is a control gate; block 202 is an oscillator circuit; block 203 is a counter group for memorizing set information; block 204 is a circuit for comparing the set frame number with the number of frames exposed and increased one frame each time the switch SW204 is closed for every one frame exposure; block 205 is a warning circuit responsive to the output of the comparing circuit 204 for producing a warning signal in the form of sound or light when the number of frames exposed coincides with the set frame number available; block 206 is a decoder driver cooperative with a block 207 for displaying the information stored in the counter group as can be viewed from the outside of the camera; block 208 is an A-D converter circuit for converting the analogue output of the photoelectric element 6 to a digital output which is memorized in response to the output of an AND gate 309; block 209 is an adder circuit; a switch group SW206 is code switches in which the full open diaphragm value of the lens is set; block 210 includes a register for memorizing the exposure mode and a register for memorizing the set exposure information, that is, storage time for the image transducer, or diaphragm value; block 211 is a subtractor circuit for subtracting the set exposure information value from the output of the adder circuit 209; block 212 is a multiplexer receptive of the set exposure information and the computed expsoure information from the blocks 210 and 211 respectively and responsive to the exposure mode for producing an output representative of the storage time or diaphragm value; block 213 is a comparator circuit for comparing the storage time and diaphragm value with their respective limit values; block 214 is a decoder driver receptive of informations representative of the storage time, diaphragm value and the comparison result from the block 213 for driving a display device 215 positioned in the finder to display the various informations; SW207 is a changeover switch for changing the path of the signal from the photoelectric element 6 when the daylight photography is changed to the flash photography, or vice versa; block 216 is to control the storage time of the solid state image transducer in accordance with the output signal from the light-receiving element when in the flash photography and is constructed in the form of an integrating circuit; block 217 is a circuit for producing a sound or light at the start of an exposure so that the operator is aware of that fact; and block 218 is a time elongating circuit for the production of an actual time. In said embodiment, this circuit is actuated by the transfer pulse $V_{OP}$ from the synchronizing signal generating circuit 10 (FIG. 8(a)). 219 is a D/A converter.

The operation of the exposure control blocks of such construction will next be described. Before the actuation of release, either one of the daylight flash exposure modes is first selected. When the daylight exposure mode is selected, the changeover switch SW207 is connected to the contact (a) manually or automatically in response to the removal of the flash device from the camera. Next, selection of a desired control mode is performed. When the mode switch SW201 is turned on, and when the oscillator start switch SW205 is closed, a pulse train from the oscillator circuit 202 is passed to the control gate 201 where they appear at a selected one of the output terminals thereof. The selected output terminal is connected to the mode setting counter in the counter group 203. In other words, so long as the mode switch SW201 and oscillation switch SW205 are simultaneously depressed, the number of pulses counted by that counter is being varied, for example, from a binary coded number [0000] through [0001], [0010], [0011], [0100], and so on for the exposure control modes such as the storage time priority mode, diaphragm priority mode, storage time priority magic mode, diaphragm priority magic mode, program mode and so on. Setting of a desired value of storage time, or diaphragm aperture, and of the maximum number of frames available in the recording medium loaded in the camera is performed in a similar manner to the above. That is, when the shift switch SW202 is operated to effect connection with the contact (a), as the oscillation start switch SW205 cooperative with the shift switch SW202 is closed, the pulses from the oscillator 202 are immediately applied through the control gate 201 to the exposure information value setting counter in the counter group 203. Thus, the counter counts up the pulses during the operation of the shift switch SW202. On the other hand, when the shift switch SW202 is connected to the contact (b), the counter continues to count down. At this time, if the selected mode is the storage time priority mode, the value set in the exposure information value setting counter stands for the storage time. If it is the diaphragm priority mode, the value stands for the diaphragm value. Again, when the maximum possible number of frames are set, the oscillation switch SW205 and frame number setting switch SW203 are simultaneously ON to select the one of the counters in the group 203 which is adapted for setting the frame number. The pulse from the switch SW204 which is closed each time an exposure is completed is directly applied to the one of the counters in the group 203 which is adapted to count the number of frame exposed, independently of the oscillation circuit. The number of frames exposed is compared with the number of frames set before the initiation of camera operation and representative of the recording capacity of the recording medium by the frame comparing circuit 204 upon occurrence of a small number of frames left unexposed, or upon occurrence of the coincidence therebetween to actuate the warning circuit 205 for producing a warning signal in the form of sound or light. The exposure control mode, exposure information value, and maximum possible and exposed frame numbers set in the respective counters in the group 203 are displayed through the decoder driver 206 by the display device 207 arranged to be visible from the outside of the camera body. The exposure mode and exposure information value set in the counter group 203 are once set in the register group 210. Of these exposure modes set in such manner, there are the storage time priority mode, diaphragm priority mode, storage time priority magic mode, diaphragm priority magic mode and program mode. Further explanation is first given to the storage time priority mode. An input signal introduced from the photoelectric element 6 is memorized in the A/D converter 208, and then combined with the full open diaphragm value of the lens in the addition circuit 209. Then, the storage time value memorized in the register 210 is subtracted in the subtraction circuit 211. Then, the diaphragm value is introduced through the multiplexer 212 to the decoder driver 214, and is displayed by the display device 215 within the field of view of the finder. At the same time, the storage time value is also displayed after having passed through the multiplexer 212 and the decoder driver 214 to the internal display device 215. The diaphragm value computed here is fed to the comparison circuit 213. When this diaphragm value exceeds the limit of a range of diaphragm control, however, a warning signal is displayed through the decoder driver 214 by the internal display device. Again, though the diaphragm value is produced without further treatment, the storage time value is subjected to an actual time extension by the actual time extending circuit 218 in synchronism with the transfer pulse from the synchronizing signal generating circuit, and then produced as a signal for terminating the storing operation of the image transducer.

In the case of the diaphragm priority mode, since the value set in the register 210 stands for the diaphragm value, the brightness signal produced from the addition circuit 209 is subtracted by the diaphragm value in the subtraction circuit 211 to derive the storage time which is applied to the multiplexer 212. In the multiplexer 212, the preset and computed values are distributed to the diaphragm value and storage time value, and then after passing through the decoder driver are displayed by the internal display device 215 in a similar manner to that described in connection with the above described storage time priority mode. Again, the computed value of storage time is compared with the limit value of storage time by the comparison circuit 213 whose output is displayed by the internal display device through the decoder driver.

Next, the storage time priority magic mode will be described. The computation by the addition and subtraction circuits 209 and 210 and the selection of the data by the multiplexer 212 are similar to those in the storage time priority mode. But, when the output of the comparison circuit 213 indicates excess beyond the limit of diaphragm control, the preset value of storage time in the register 210 is automatically altered by the output of the comparison circuit 213 to effect a proper exposure. In the case of the diaphragm priority magic mode, such procedure is similar to the above. Thus, when the computed value of storage time exceeds the limit of a control range, the preset value of diaphragm aperture is automatically altered by the output of the comparison circuit 213 to effect a proper exposure.

Next, the program mode will be described. The brightness signal produced from the addition circuit 209 is applied directly to the multiplexer 212 without the recourse to the subtraction circuit, and is then divided to a diaphragm value and a storage time value in accordance with the predetermined program. These values are fed through the decoder driver 214 to the internal display device 215.

Next, the flash photography is described. By attaching the flash device or when the main condenser is fully charged, the changeover switch 207 is changed over from the contact (a) to the contact (b) manually, or automatically. Then, the output of the photoelectric element is fed to the flash control circuit 216. In synchronism with the transfer pulse from the synchronizing signal generating circuit, the strobe is triggered to emit flash light. The reflected light from the object is integrated by the circuit 216. When said integrated value has reached a predetermined level, a storage termination signal for the image transducer is produced. Regardless of whether the daylight or flash photography is selected, the warning circuit 217 is operated each time a one-frame exposure is made, informing the operator of the concurrent state of operation for recognition in the form of a warning sound, or by light from a light-emitting element. Then, when the recording of the video signals has been completed, the output of the timer circuit 307 is applied to the decoder driver 206, and a mark "OK" is displayed by the external display device 207.

Figure 9:
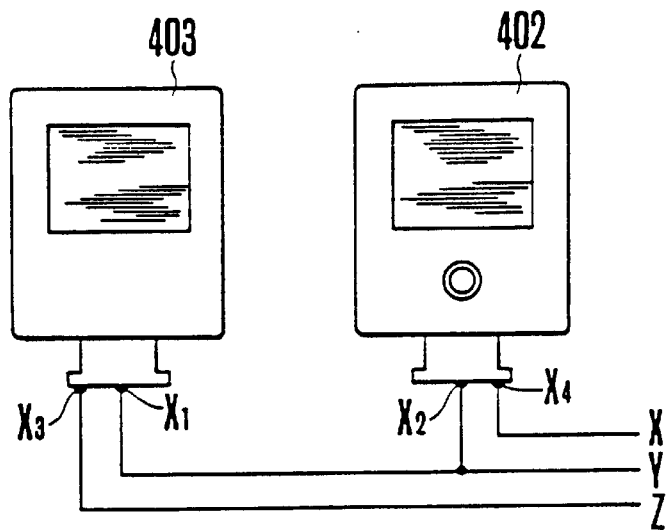
FIG. 9 is plan views looking from the front and rear of a flash device for use with a circuit of FIG. 10.

FIG. 9 shows two practical examples of flash devices for use with the embodiment of FIG. 8. In FIG. 9, 403 is an ordinary flash device or strobe having a connection terminal X1 arranged to be connected to the synchronizing signal generating circuit 10 of FIG. (a), so that the above mentioned transfer pulse is fed through the said terminal X1 to the inside of the strobe 403, and a trigger circuit of the strobe is actuated in synchronism with the transfer pulse. Another connection terminal X3 produces a strobe attach signal, for example, a charge completion signal for changing over the switch SW207 of FIG. 10 in connection with the contact (b). On the other hand, 402 is a so-called computer strobe having a light-receiving element for light value computation. A connection terminal X2 of the strobe 402 is one that triggers the strobe 402 by the transfer pulse in a similar manner to that as in the case of the strobe 403. Another terminal X4 is a terminal through which the diaphragm value from the exposure computation control circuit 305 is introduced to control, for example, the size of aperture in front of the light-receiving element, or the amount of light produced from the strobe.

The operation of the flash device 403 is first described below. In this case, the operator must first operate the diaphragm setting means to the manual mode, and then attach the strobe to the camera body, thereby the strobe attach signal is applied through the terminal X3 to the exposure computation control circuit to connect the switch SW207 of FIG. 10 with the contact (b). After that, when a shutter button is depressed, the above described operation proceeds with the production of the transfer pulse from the synchronizing signal generating circuit 10 to initiate an image signal storing operation of the solid state image transducer. At the same time, the transfer pulse is fed through the terminal X1 to the strobe to trigger the strobe, thereby flash light is produced. Since the object being photographed is illuminated with flash light from the flash device, the reflected light enters through the lens 1, being incident upon the photoelectric element 6. When the amount of flash light integrated by the block 216 of FIG. 10 has reached a predetermined level, a storage time termination signal is fed through the OR gate 220 of FIG. 10 to the synchronizing signal generating circuit 10, thereby the transfer pulse $V_{\varphi P}$ is produced in a similar manner to that described above. Thus, the storing operation of the image signal is completed. For this reason, the proper exposure control equivalent to that with the use of the computer strobe can be performed by using the ordinary strobe which lacks the light value computing function that controls the storage time in accordance with the light amount from the strobe.

Next, the flash photography with the use of the computer strobe 402 is described. In this case, the strobe attach signal is not applied to the exposure computation control circuit 305, and therefore the above described daylight exposure mode remains unchanged. With this state, when the release button is depressed, the diaphragm signal is produced, as has been mentioned before, to set the diaphragm of the camera. Also, the size of diaphragm positioned in front of the light value computation light-receiving element, or the amount of light produced from the strobe is determined based on said diaphragm signal value. After that, the above mentioned operation proceeds to produce the transfer pulse $V_{\varphi P}$ by which the strobe 402 is triggered to produce flash light. By said light-receiving element of the strobe, the light adjusting operation is performed to control the amount of light produced from the strobe in accordance with the computed flash exposure value. On the other hand, the storage time of the solid state image transducer is controlled in a similar manner to that when in the daylight exposure mode. Therefore, even after the firing of the strobe is stopped, the image transducer is further exposed for a time controlled in accordance with the preset value or computed value of storage time likewise as in the daylight exposure mode. For this reason, in case the computer strobe is used, the so-called daylight synchro photography is performed.

Figure 11C:
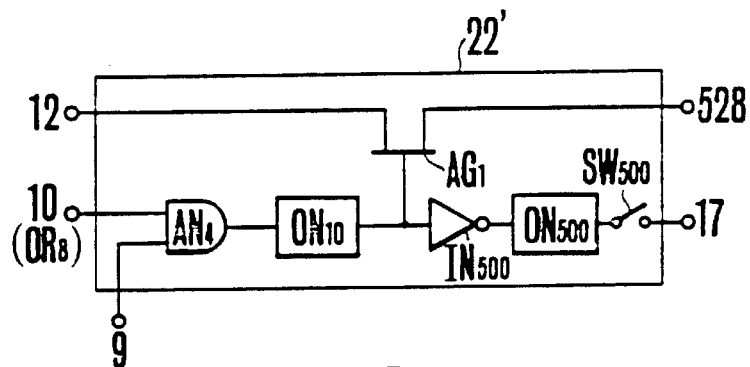
FIG. 11(c) shows the details of the circuit 22' of FIG. 11(a).
Figure 12:
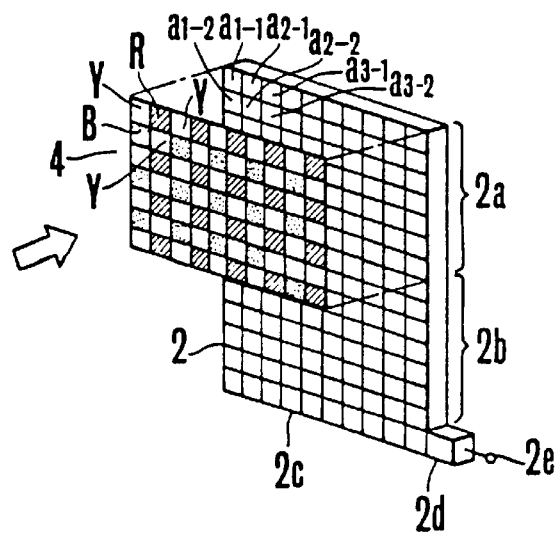
FIG. 12 is a schematic perspective view showing the construction and arrangement of the constituent elements of the image sensing device and color filter of FIG. 11.
Figure 11A:
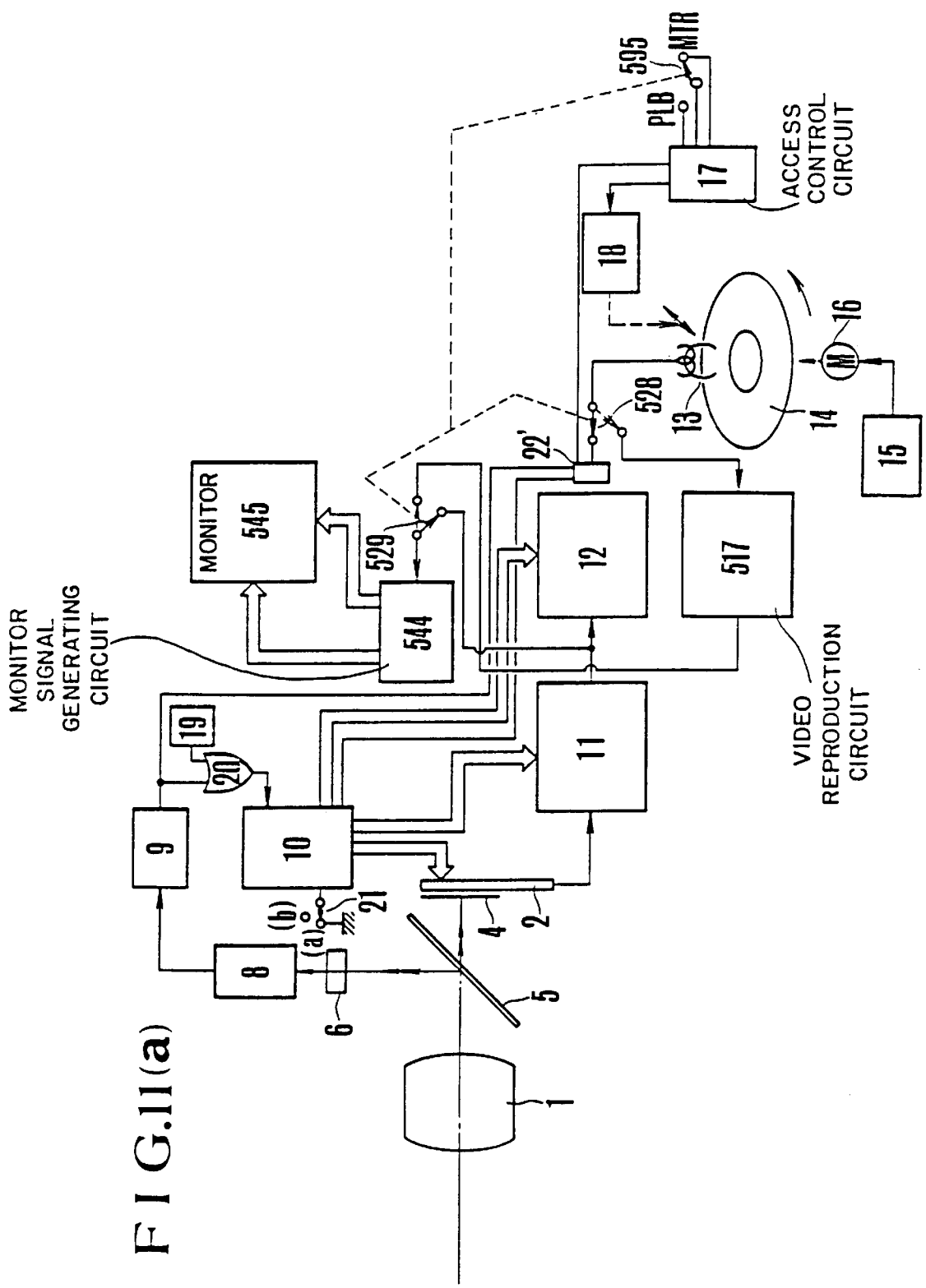
FIG. 11(a) is a block diagram showing a further embodiment of the present invention.

FIG. 11(a) is a schematic view showing another embodiment of an image recording system according to the present invention. In the figure, the same reference numerals have been employed to denote the similar parts to those shown in FIG. 1(a). Said embodiment is different from FIG. 1 embodiment in that there are provided a video reproducing circuit 517 for reading out the recorded image signals on the recording medium 14 through the head 13 and for reversely converting the image signals to NTSC signals, a monitor signal generating circuit 544 receptive of the NTSC signals for producing signals forming a visible image in a monitor 545, and recording-reproducing changeover switches 528 and 529 cooperative with each other to enable the reproduction of the recorded image. Again in said embodiment, the solid state image transducer 2 makes use of a so-called frame transfer type CCD consisting of an image sensing portion 2a and a storing portion 2b as shown in FIG. 12. In said solid state image transducer of FIG. 12, 2c is a horizontal shift register for transferring the image signal stored in the storing portion 2b through an output diode 2d to an output terminal 2e. The light receiving portion 2a is constructed from a great number of minute photosensitive segments. The image output from the solid state image transducer of such construction is once transferred from the image sensing portion 2a to the storing poriton 2b, while the arrangement relation being maintained unchanged, and then transferred by the horizontal shift register 2e line by line to the right as viewed in the figure. As a result, the component signals of the image output from the individual photosensitive elements are read out in sequence in a predetermined order.

The color filter 4 is divided into areas equal to those of the individual photosensitive elements, the areas Y being minute color filters whose transmissivity characteristic is selected so as to obtain the component Y serving as the brightness signal in the typical television standard, and the areas R and B being minute color filters whose transmissivity characteristics are so selected as to obtain respectively the component R (red) and B (blue) signals in the same television standard. Such areas are arranged Y-R-Y-R . . . in each odd-numbered line, and B-Y-B-Y . . . in each even-numbered line.

Figure 11B:
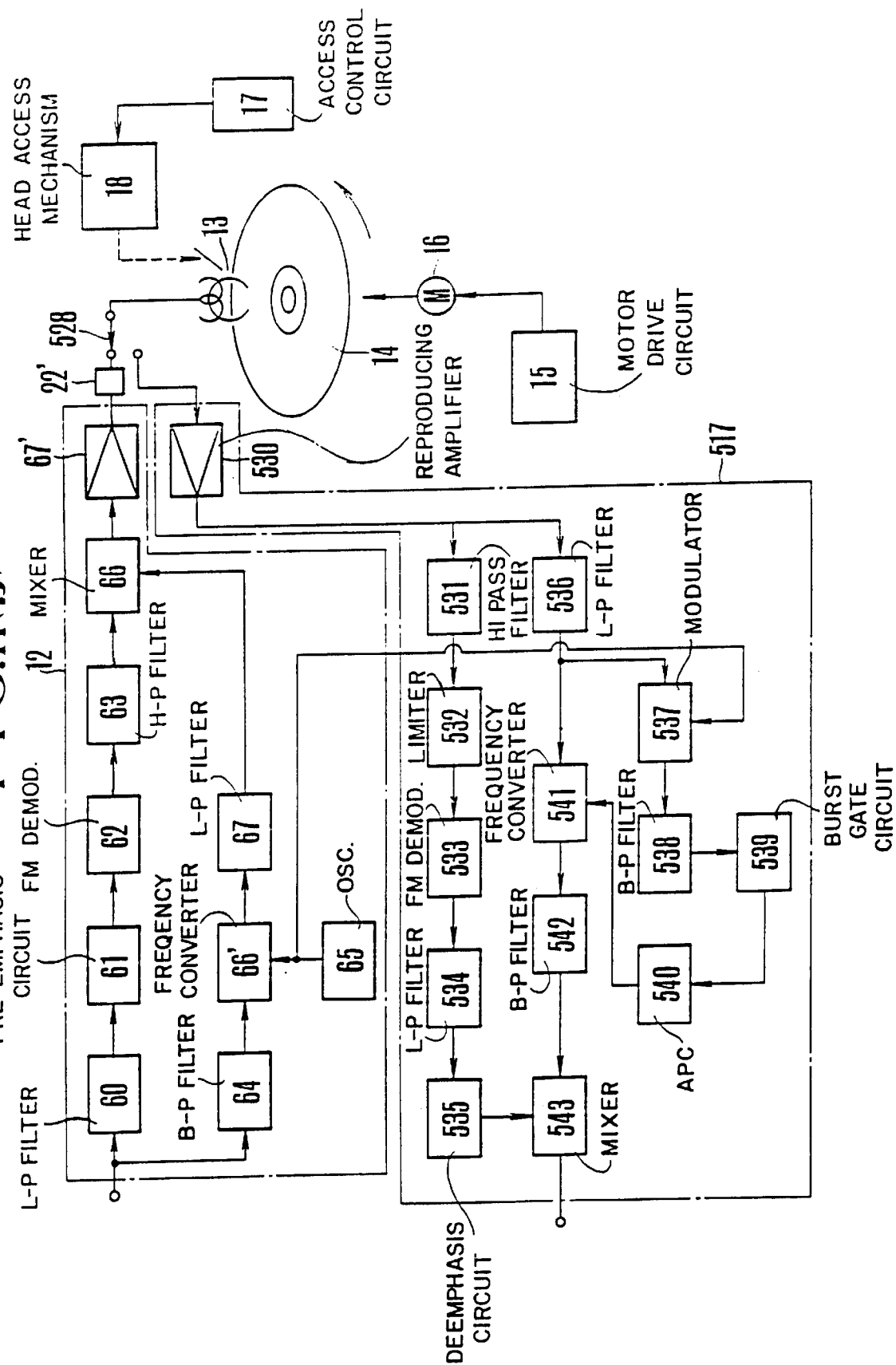
FIG. 11(b) is a block diagram showing the details of the video reproducing.
Figure 13A:
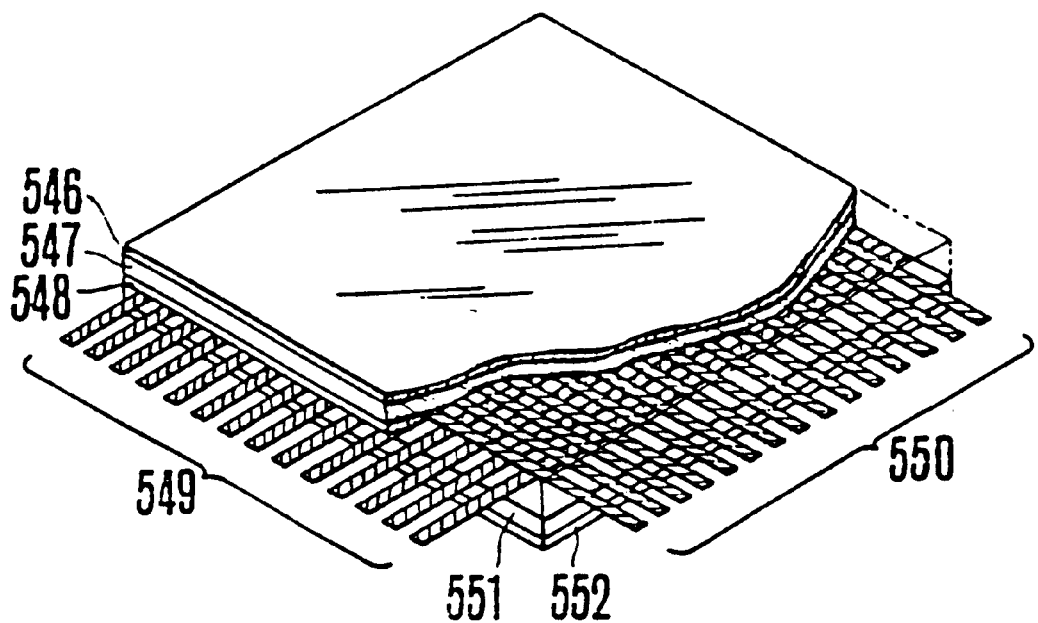
FIGS. 13(a) and 13(b) are perspective and sectional views respectively of the internal structure of a monitor with a portion broken away to illustrate the details thereof.
Figure 13B:
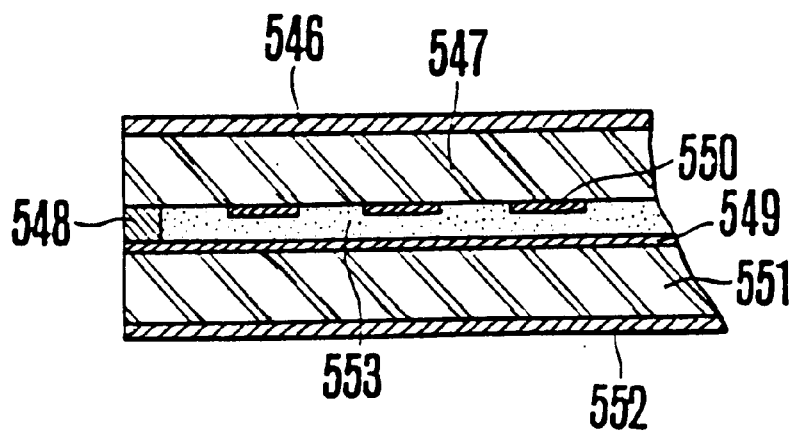

Said image transducer 2 is also driven by the various pulses from the synchronizing signal generating circuit in a similar manner to that described in connection with FIG. 2. The construction of the video reproduction circuit 517 is known in the art, and an example of it is shown in FIG. 11(b). In FIG. 11(b), 12 is a video recording signal generating circuit, said circuit being the same as that in the above described FIG. 5 embodiment. When a switch 528 is operated to perform reproduction, the magnetic head 13 is connected to a reproducing amplifier 530 in the video reproducing circuit 517 enclosed within a dashed line block. The video signals read out by the head after having been amplified by the amplifier 530 is fed through a high pass filter 531, a limiter 532, an FM demodulator 533, a low pass filter 534 and a de-emphasis circuit 535 to be converted to a reproduced brightness signal. On the other hand, the above mentioned video signals from the amplifier 530 are applied to a low pass filter 536 where a color signal frequency band is extracted, the converted to a reproduced color subcarrier, then balance-modulated by the above described oscillator 65 in block 12 and a modulator 537 with conversion to the sum of their frequencies, and then processed through a band pass filter 538, burst gate circuit 539 and an APC circuit 540 to obtain a series of signals in phase synchronization with the color burst signals. The output of the low pass filter 536 also is applied to a frequency converter 541 where it is balance-modulated with the output signal of the above-described APC circuit 540. Further, the difference between their frequencies is extracted by a band pass filter 542 to obtain the original color subcarrier. The thus-obtained brightness signal and color subcarrier are mixed by a mixer 543 to obtain a reproduced NTSC signal. It is known in the art to provide the monitor 545 and the monitor signal generating circuit. Examples of these circuits are shown in FIGS. 13 and 14. These examples are shown as making use of a liquid crystal (hereinafter abbreviated as LC), a matrix display device and a signal generating circuit for driving said device. The monitor is, however, not confined thereto, and it is of course possible to use an ordinary display device such as CRT display, EL display, or plasma display. In FIG. 13, the internal structure of the LC matrix is shown at (a) with a portion broken away, and the cross-sectional view of the same matrix is shown at (b). In FIG. 13(a), 546 is a polarization plate A; 547 is a glass substrate A; 548 is a liquid crystal pack seal; 549 is vertical electrodes; 550 is horizontal electrodes; 551 is a glass substrate B; 552 is a polarization plate B. These parts are laminated in the above described order, and the liquid crystal is sealed between the vertical electrodes 549 and the horizontal electrodes 550 in a manner shown at 553 in FIG. 13(b). With such construction as described above, external light is assumed to enter the matrix from the polarization plate A 546 side, the light passing through the same polarization plate A becomes a linearly polarized light which then enters the liquid crystal 553. On the other hand, the two glass substrates A 547 and B 551 which sandwiches the liquid crystal are provided with respective orientation layers (not shown) at their internal surfaces in 90° apart relation. For this reason, the sealed liquid crystal molecules are arranged to be distorted by 90° between the substrates. The linearly polarized light emerging from the polarization plate A is rotated 90° for the polarization axis by this liquid crystal molecule arrangement, reaching the polarization plate B. Therefore, if the polarization axis of the polarization plate B is coincident with that of the polarization plate A, the light does not proceed beyond the polarization plate B. In other words, the liquid crystal cell looks dark. Now assuming that a specific pair of vertical and horizontal electrodes 549 and 550 is supplied with a voltage, then the liquid crystal in the cross area is orientated to a direction perpendicular to the both electrodes by the well known electrical field effect. As a result, the polarization axis in that area of the liquid crystal is no longer to rotate so that the linearly polarized light from the polarization plate A can be transmitted through the polarization plate B, and therefore, the liquid crystal cell looks bright. It is to be understood from the foregoing that the transmissivity of light, that is, brightness pattern can be varied by whether or not the voltage is applied between the selected pair of electrodes. By utilizing this principle, it is made possible to display a visible image based on the above described NTSC signals after having been converted to signals for the vertical and horizontal electrodes 549 and 550 by the monitor signal generating circuit 544.

FIG. 14 shows the details of the monitor signal generating circuit 544. In FIG. 14, 554 is a video amplifier for amplifying the NTSC signals up to a necessary level. By this amplifier, the video signals are separated from synchronizing signals for scanning, and these signals are applied to a series-parallel converting circuit 555 and a control circuit 558 respectively. In the series-parallel converting circuit 555, the time sequential video signals are converted for only one scanning line to parallel output signals which are then applied to the horizontal electrodes 556 of FIG. 13 in synchronism with the horizontal synchronizing signals of the control circuit 558. A pulse width converting circuit 556 functions to increase the pulse width to a value necessary to obtain the satisfactory operation of the liquid crystal, as the voltage is applied for this time value. A vertical electrode scanning circuit 559 and a vertical electrode drive circuit 560 responsive to a scanning command signal from the control circuit 558 form signals for performing electrode scanning in the vertical direction, which are applied to the vertical electrodes 549 of FIG. 13. The monitor signal generating circuit of such construction is disclosed, for example, in Nikkei Electronics p.55 published Aug. 11, 1975 from Nikkei-McGraw Hill Inc. Since the same parts in FIG. 11(a) as those in FIG. 1(a) are denoted by the same reference characters, their explanation is omitted. But, a gate circuit 22' is somewhat different from that in FIG. 1(i). Therefore, the gate circuit 22' will be described below. The construction of the gate circuit 22' is shown in FIG. 11(c), where the same parts as those of the gate circuit shown in FIG. 1(i) are appended with the same reference characters. In FIG. 11(c), difference resides in that there are provided an inverter IN500, a one-shot circuit ON500 and a switch SW500 arranged to be closed in cooperation with the switch 21 of FIG. 11(a) when in the continuous exposure mode. Since the gate circuit is constructed as the above, the single frame exposure mode operates in the same manner as that in which the circuit of FIG. 1(i) operates. In the case of the continuous succession of one-frame exposures, however, each time the video signals for a one-frame image have been recorded, the one-shot circuit ON500 produces one pulse which is applied through the switch SW500 to an access circuit 17, thereby the position of the head 13 is automatically displaced track by track.

The operation of the system of FIG. 11 will next be described. It is noted here that in the FIG. 11 embodiment, the switch SW1 and one-shot circuit 19 constituting part of the synchronizing signal generating circuit 10 are respectively turned on and triggered when one stroke of release is effected.

When a continuous succession of one frame images are to be recorded, the operator will first depress the release button to the first stroke at which the access circuit 17 is actuated to regulate the position of the head 13. After that, upon further depression of the release button to the second stroke, the one-shot circuit 19 produces a pulse which is applied through the OR gate 20 to the synchronizing signal generating circuit 10. Then, the synchronizing signal generating circuit 10 produces drive pulses $V_{\phi P}$, $V_{\phi V1}$, $V_{\phi V2}$, $V_{\phi H1}$, $V_{\phi H2}$ and so on likewise as in FIG. 1(a). Thus, an image signal stored on the image transducer 2 is read out, and another image signal after the release starts to be stored. After that, as has been described in connection with the circuit of FIG. 1(a), when the image signal reaches a proper exposure level, the circuit 9 produces a pulse by which a new image signal is initiated to be stored, while the image signal whose exposure level was regulated is initiated to be read out. Then, the pulse from the circuit 9 opens the gate circuit 22' for a time necessary to read out signals for the one-frame image, and the video signals are applied to the head 13, thereby a one frame image is recorded on the recording medium 14. Thus, the image signal is processed through the gate circuit 22' to be recorded by the head 13. When the recording operation of the one frame image has been completed, the output of the inverter IN500 in FIG. 11(c) changes to the high level at which the one-shot circuit ON500 is triggered, and a pulse is fed through the switch SW500 to the access circuit 17, thereby the head 13 is driven to advance one track. Thus, the head 13 is made ready for recording the next one-frame image. Such procedure repeats itself for every one pulse produced from the circuit 9. Therefore, a continuous succession of one-frame images are recorded on respective tracks on the recording medium 14. On the other hand, at the same time as that at which the image signal is recorded, the NTSC signal from the image signal processing circuit 11 is applied through the switch 529 to the monitor signal generating circuit 544, thereby the image can be monitored by the display device 545 while the same image being recorded simultaneously. In the case of the single frame exposure, each time one actuation of release is effected, the position of the head 13 is renewed to permit the signals for a one-frame image to be recorded in a respective track for one actuation of release likewise as in the above described FIG. 1(a) embodiment. Thus, the recording operation of image signals is performed as such.

The reproducing operation will next be explained. When in the reproducing mode, a dial for the access circuit 17 of FIG. 11(a) is positioned to connect with the playback side, thereby the switches 528 and 529 are changed over to their positions illustrated by dashed lines. Then, the one of the tracks which is desired to be reproduced is assigned by the access circuit 17 to determine the position of the head 13. As the motor 16 is rotated, the signals recorded on the recording medium 14 are detected by the head 13 and then fed through the switch 528 to the video reproducing circuit 517, where they are converted to NTSC signals. Said converted NTSC signals are applied through the switch 529 to the monitor signal generating circuit 544, thereby the recorded images are monitored by the monitor 545 in the above described manner.

Figure 15:
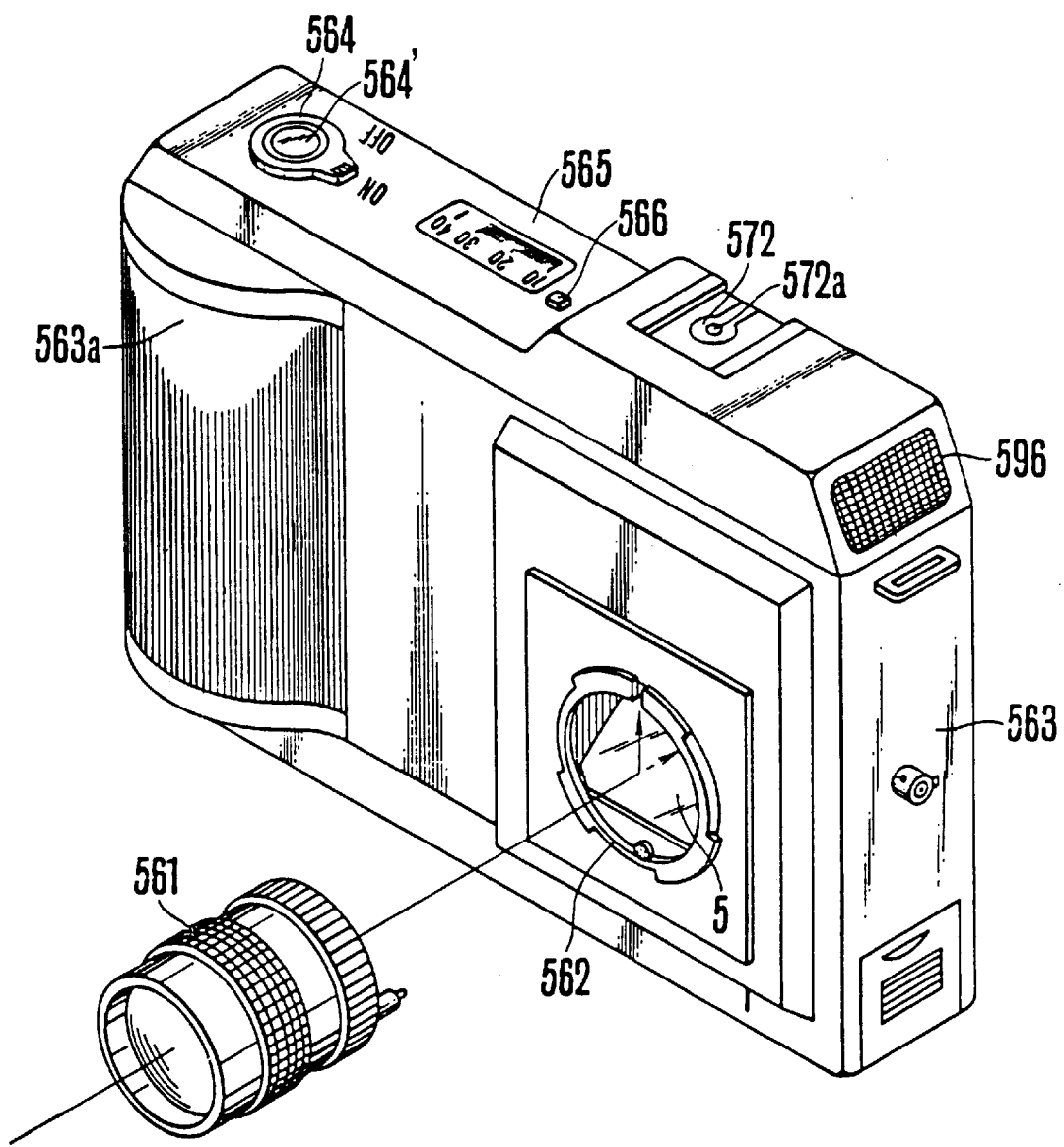
FIG. 15 is a perspective view looking from the front of the external appearance of an electrophotographic camera employing the system of the invention.
Figure 16:
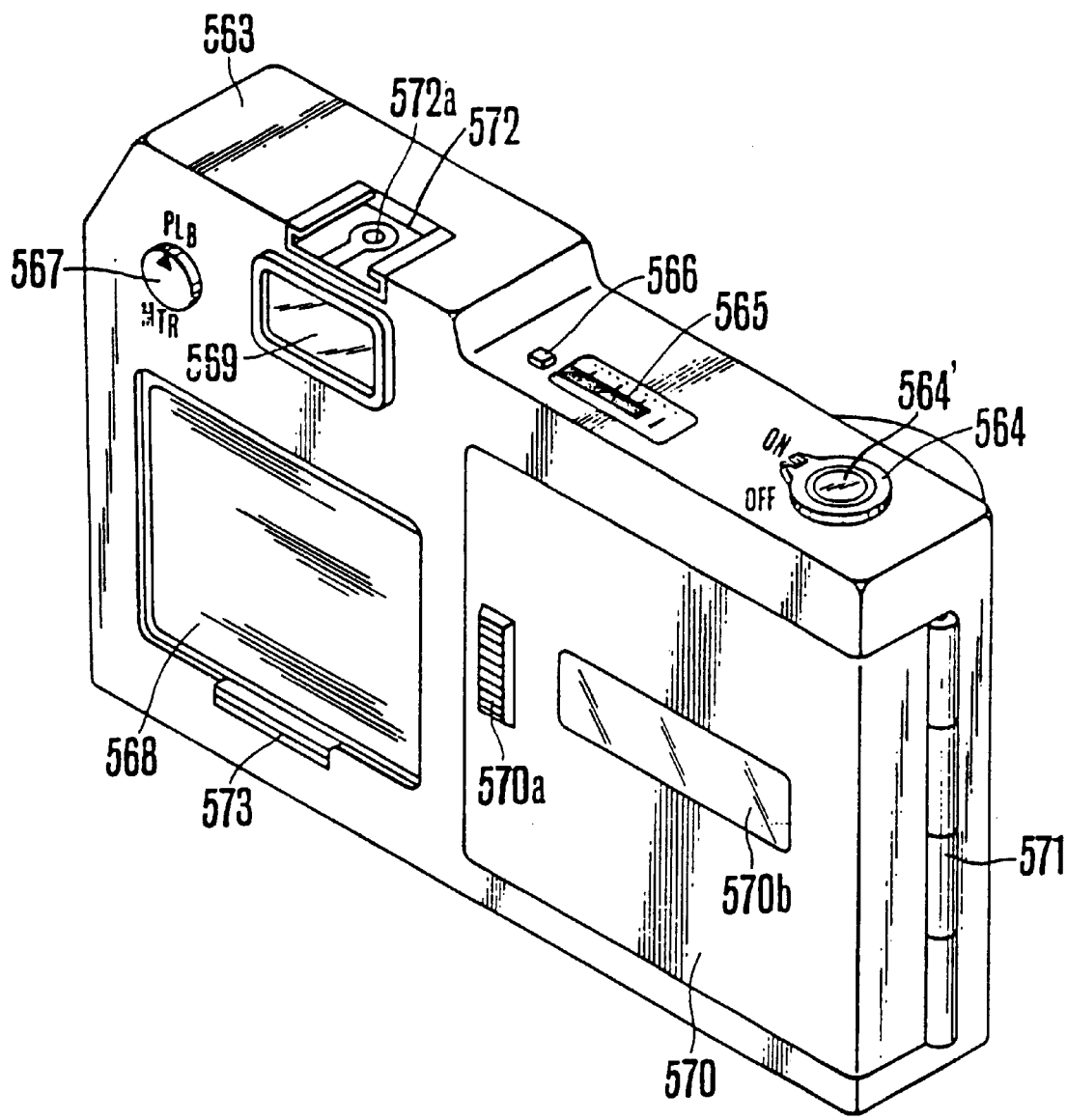
FIG. 16 is a similar view looking from the rear of the camera of FIG. 15.
Figure 17:
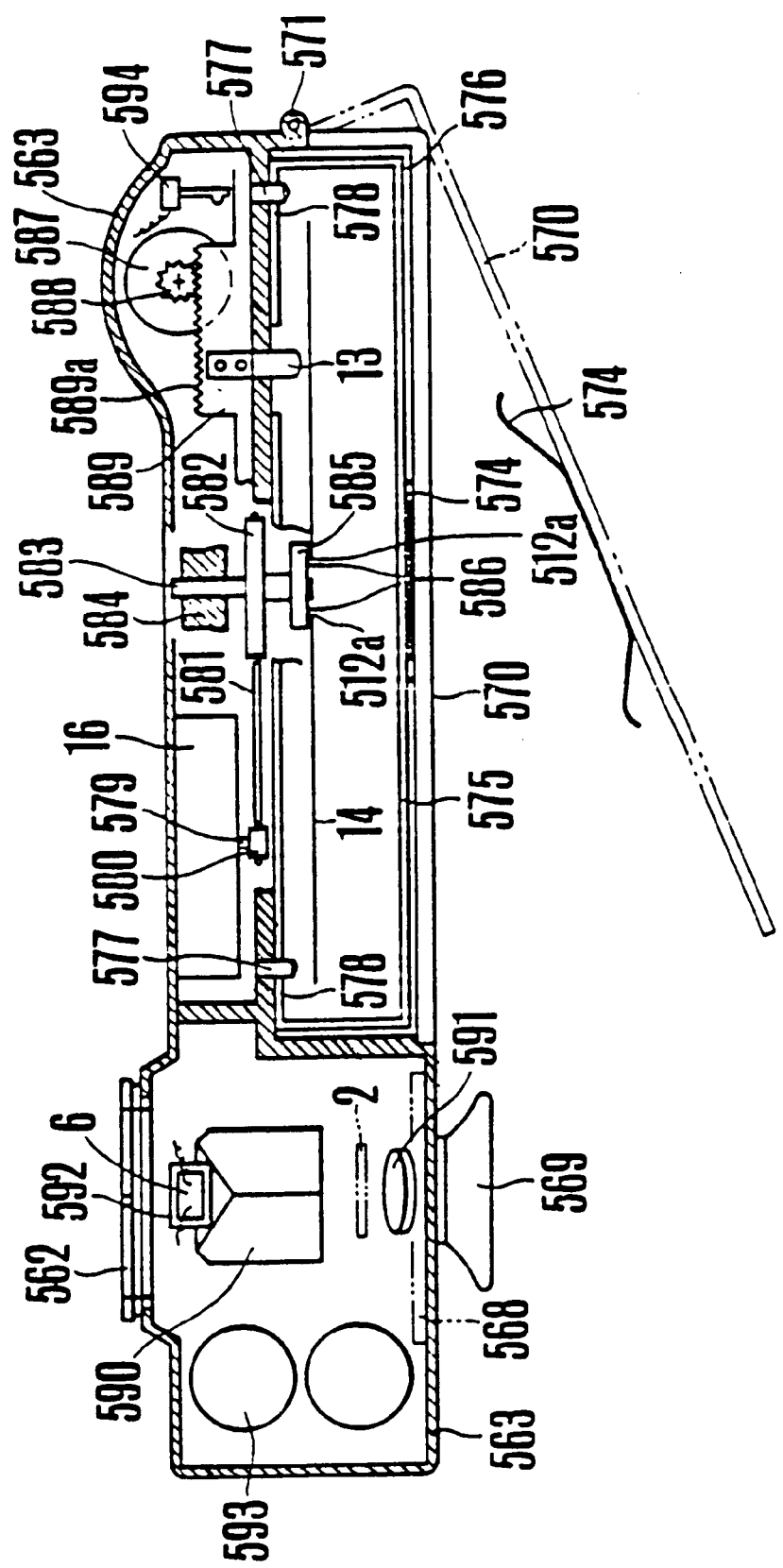
FIG. 17 is a partly top plan partly horizontal sectional view of the camera of FIGS. 15 and 16.

FIGS. 15, 16 and 17 shown an example of practical form of a camera having incorporated therein the image recording system of the present invention. FIG. 15 is a perspective view of the camera looking from the front. FIG. 16 is a perspective view of the same looking from the rear, and FIG. 17 is a horizontal cross-sectional view of the same. In FIG. 15, 561 is an ordinary interchangeable objective lens provided with various operating members necessary for ordinary photography such as a distance adjusting ring and diaphragm ring; 562 is amount formed in a portion of the camera body 563 and engageable with the rear wall of the interchangeable lens 561; 5 is a half-mirror shown in FIG. 11(a); 6563a is a grip formed in a portion of the camera body to facilitate the holding of the camera by hand; 564 is an electric power switch of the camera; 564' is a release switch arranged in coaxial relation to the rotary shaft of the power switch; 565 is a head access command device having a liquid crystal type analogue display arranged upon depression of a control button 566 to display the addresses of the recorded images in sequence beginning with No. 1. Upon presentation of a desired address, the operator removes his finger from the control button 566 so that the image recorded in that address can be reproduced and monitored, as the head 13 is accessed to the track for the image recorded therein; 567 is a recording-reproduction changeover dial for simultaneously changing over the switches 528 and 529 of FIG. 11. When the head access command device 565 is operated for reproduction, that is, when the dial is set in PLB position illustrated the above described function is effected. But when the camera is set in the image recording mode, that is, when the dial 567 is set in MTR position illustrated, the liquid crystal type analogue display serves as a frame counter. In this case, even when the button 566 is depressed, the display is not affected; 568 is an LC matrix display device described in connection with FIG. 13; 573 is a shutter for protecting the image display surface from contamination and mechanical shock when in no use. In the figure, the shutter is shown in the open position; 569 is an optical finder eye-piece which may be used for the purpose of saving the electrical energy of the battery, or because of the difficulty of utilizing the LC matrix display for some reason. This optical finder is known in the art. In connection with FIG. 11(a), the eye-piece may be positioned in the path of light reflected from the half-mirror 5 as can be seen in the single lens reflex camera. In this case, the photoelectric element 6 may be arranged along with a supplementary prism on a penta-dach prism at one surface thereof as shown in FIG. 17; 570 is a cover for a cartridge chamber into which a cartridge containing the above described image recording medium is inserted. The cover 570 is hinged to the camera body at 571, and has a lock member 570a and a window 570b with a transparent plastic plate for recognizing whether or not a cartridge is loaded in the chamber; 527 is a shoe for attachment of a flash device provided with electrical connection terminals 572a; 569 is a buzzer for informing the operator of the fact that the solid state image transducer is under operation for charge accumulation, thereby the camera operation is made very convenient as the camera shake is avoided during the exposure operation.

FIG. 17 is a sectional view of the above described camera. The cartridge chamber 576 is provided with a spring 574 for pressing the cartridge 575. When the cover 570 is closed, the cartridge is seated in an accurately regulated position. In the cartridge 575, the already mentioned image recording medium 14 such as a video disc is contained in contact with the magnetic head 13 when the cartridge is set in the illustrated position; 577 is a position adjusting pin fixedly mounted on the camera body at a portion thereof to adjust the position of the cartridge in engagement with a hole 578 formed in the casing thereof; 16 is a motor for rotating the above described image recording medium 14. In this example, from the camera construction standpoint, the motor is shown in the flat form. A small pulley 580 is fixed to an output shaft 579 of the motor; 583 is a rotary shaft rotatably mounted on a bearing 582, and having a large pulley 582 fixedly secured thereto. Further 585 is a rotary base formed in unison with the shaft 583 and having a pin 586 arranged to engage with a hole 512a for rotation of the image recording medium 14. With such mechanism, the motor 16 is supplied with an electrical power controlled by the above-described motor drive circuit 15 to rotate at a predetermined speed. Motion of the motor 16 is transmitted through the pulley 580, belt 581, and pulley 582 to the rotary base 585 which drives the image recording medium 14 to rotate at a constant speed, thereby recording or reproducing of images is performed. 587, 588 and 589 show an example of a head access mechanism 18 having a slide member 589 provided with a rack 581 engaging with a pinion 588 which is fixedly mounted on the shaft of the motor 587. Since the slide member 589 is formed in unison with the head 13 as the motor 587 is rotated in a forward or reversed direction, the head 13 is moved on the image recording medium 14. Therefore, the motor is rotated by the control signal from a head access circuit to be described later, and a random access operation of the head is performed. It is noted that the motor 587 is preferably a pulse motor for the purpose of facilitating the control operation. 590 is a penta-dach prism constituting part of the optical finder. A small prism 592 is affixed to a portion of the penta-dach prism 592. Positioned on the small prism 592 is the photoelectric element 6 to receive light entering through the penta-dach prism and the small prism. 2 and 568 are the already described solid state image transducer and LC matrix display device respectively; 593 is a battery.

Figure 18:
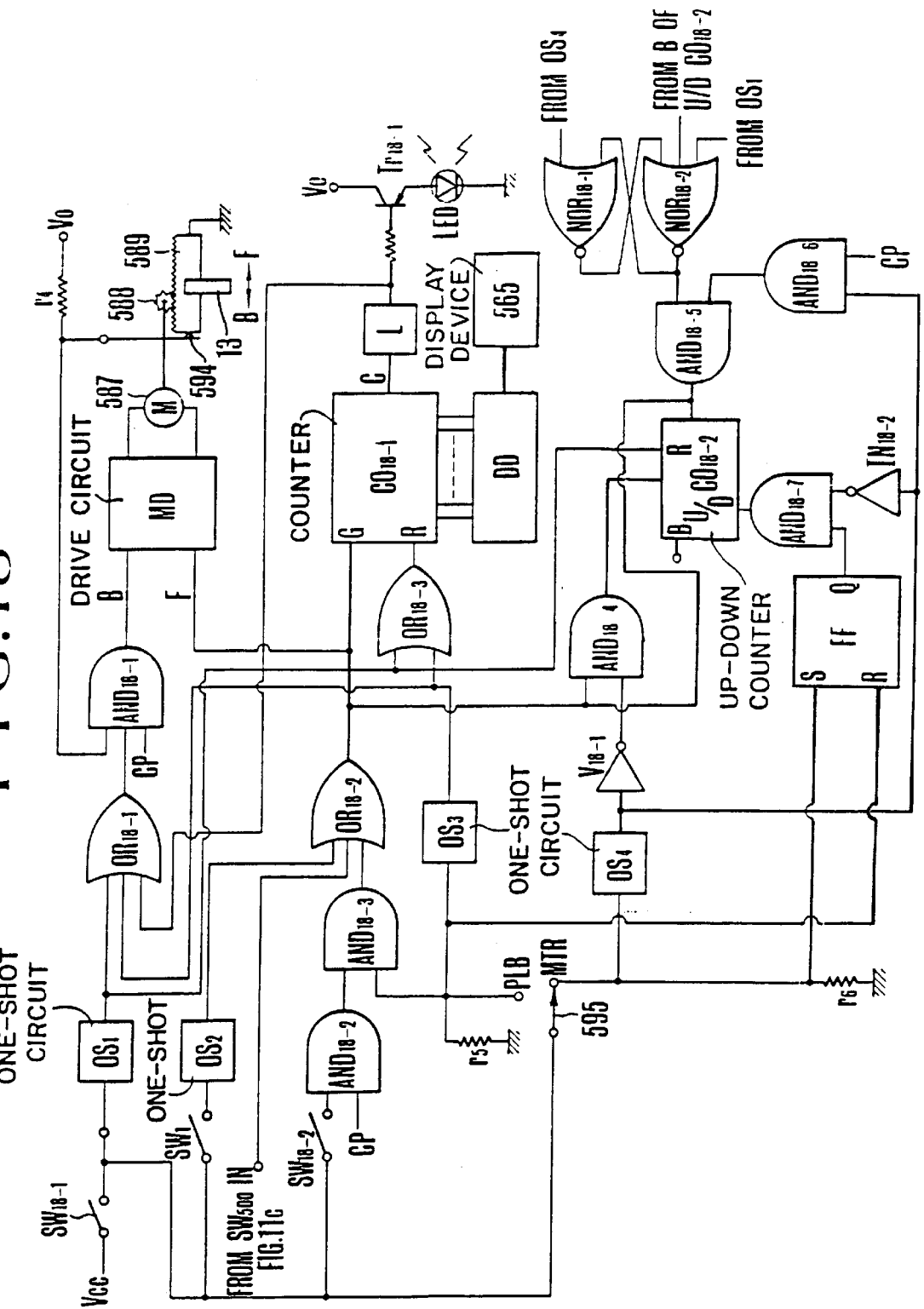
FIG. 18 is a circuit diagram showing the details of the head access circuit of FIG. 1.

FIG. 18 is a block diagram showing the construction of a head access circuit 17. OS1 is a one-shot multivibrator for producing a single pulse in response to the output $I_1$ of a switch SW18-1 which is arranged to produce a high level signal when the cartridge 575 is inserted into the camera 563; The output of the OS1 is supplied as an input of an OR gate OR 18-1. The output of the OR 18-1 is supplied as an input of an AND gate AND 18-1. The output of said gate AND 18-1 causes the motor 587 to be rotated in the reverse direction. 588 and 589 are the above described head access mechanism including the head 13; 594 is a switch which is grounded when the slide member 589 is moved in the direction indicated by an arrow B to a point just before the first recording track on the image recording medium 14.

The operation of the system of FIG. 18 is as follows: When the cartridge 575 is inserted into the camera 563, the switch SW18-1 is closed causing the OS1 to produce a pulse which is applied through the OR 18-1 to the AND 18-1. Since the switch 594 is OFF, a high level signal is applied through a resistor r4 to the AND gate AND 18-1 at one input thereof, thereby a clock pulse train is allowed to pass through the AND 18-1 to a drive circuit MD at a reverse rotation input B thereof. MD is a pulse motor rotation direction control circuit known in the art, for example, comprising four transistors. As the clock pulse enters the MD, the motor 587 is rotated in the reverse direction to drive the head access mechanism for movement toward the B direction in synchronism with the CP until the switch 594 is closed. When the AND 18-1 is gated off, the motor 587 is stopped from further rotation. The width of the pulse from the one-shot OS1 is pre-adjusted to a time slightly longer than that necessary to move the head access mechanism over the entire access range. On the other hand, the above mentioned pulse from the OS1 is also applied to a counter CO 18-1 at a reset terminal thereof through an OR gate OR 18-3, thereby the counter CO 18-1 is reset. Again, the pulse is also applied to a reset input terminal of an U/D counter CO 18-2, thereby the U/D counter CO 18-2 is reset. Again, since the switch SW 18-1 is closed to apply a voltage Vcc to the terminal of the switch 595, when the switch 595 cooperative with the recording-reproduction changeover dial 567 is set in the recording position MTR, a high level signal is applied to the one-shot circuit OS4 and the set terminal of a flip-flop FF, thereby the one-shot circuit OS4 is actuated to produce a pulse and the flip-flop FF is set. Then, the pulse from the one-shot circuit OS4 is applied to an AND gate AND 18-6, causing clock pulses to be applied through the AND gate AND 18-6 to an AND gate AND 18-5. Since one of the inputs of a NOR gate NOR 18-2 is connected to the output of the one-shot circuit OS1, and the output of the NOR gate NOR 18-2 is of low level, the AND gate AND 18-5 is gated off. Further, since the pulse width of the one-shot circuit OS1 is set to be longer than that of the OS4, the AND gate AND 18-5 is in the closed state during the time when the one-shot OS1 produces a high level output. Accordingly, the forward rotation input terminal F of the drive circuit MD receives no drive pulse. Thus, the MD drives the motor 587 to rotate in the reverse direction as has been mentioned above, and the head 13 is moved in the direction B only. After that, when the release button 564' is depressed, the switch SW1 is closed, causing the output of an I2 to change to the high level at which the OS2 produces a pulse. This pulse is fed through an OR gate OR 18-2 to the counter CO 18-1. The counter CO 18-1 advances one count, while the motor is driven to rotate in the forward direction F by a predetermined angular distance, as the pulse from the OS2 is applied to the forward rotation input terminal F of the control circuit MD. Thus, the head 13 is moved in the direction F to the first track. Then, as has been mentioned above, a first image signal is recorded in this first track. It is noted that the display device 565 represents "1". Again, at this time, since the pulse from the OS4 was vanished, the inverter V 18-1 produces an output signal of high level at which the AND gate AND 18-4 is open to permit the pulse from the one-shot circuit OS2 to be fed to the U/D counter CO 18-2. Since the AND gate AND 18-7 produces a high level signal, the U/D counter serves as the UP counter. Thus, each time the pulse from the one-shot circuit OS2 for every one actuation of release is produced, the position of the head 13 is shifted one track. At the same time, this pulse is counted by the counter CO 18-1 to display the number of frames exposed. In such a manner as described above, a series of images are recorded by the head on the respective tracks on the recording medium, while the number of frames recorded is displayed.

At a point in time during such recording operation, the operator desires to reproduce any one of the recorded images. Then, the dial 567 is moved to the PLB position where the switch 595 is connected to the contact PLB. In this state, a high level signal appears at the reset terminal R of the flip-flop FF. Thus, the flip-flop is reset. Since the AND gate AND 18-7 produces a low level signal, the U/D counter CO 18-2 serves as the DOWN counter, and the one-shot circuit OS3 is triggered to produce a pulse. During a time equal to the width of this pulse, the OR gates OR 18-1 is open, causing the head to be moved to a point just before the first track on the recording medium as has been mentioned above. Again, the output of the OS3 is applied to the reset input of the counter CO 18-1, thereby the counter is reset, and the display device 565 is also reset. I3 is an input terminal connected to the switch SW 18-2 which is arranged to be closed when the above described button 566 is depressed. So long as the button 566 is depressed, the AND gate AND 18-2 is opened in synchronism with the clock pulses CP, and at the same time, the AND gate AND 18-3 is opened, and the OR 18-2 is also opened. Therefore, the number of pulses occurring during the time when the button 566 is depressed is counted by the counter CO 18-1 to move the head access mechanism in the direction indicated by arrow F. When a desired image number is presented, the operator will immediately release the button 566 from the depression to stop the OR 18-2, so that the head 13 is registered with the corresponding recording track. Then, a reproducing operation is performed in such a manner as described above. In the image reproducing state, even when the release 564' is depressed, the OR gate OR 18-2 becomes open as has been mentioned above, so that the head is accessed for one-frame image. By this, the function corresponding to the one-frame advancement can be realized. On the other hand, in this state, as the AND 18-4 is open, the U/D counter CO 18-2 serves as the DOWN counter. Responsive to the access pulse, the counter CO 18-2 holds an umber of counts equal to that obtained by subtracting the address number from the maximum number of frames recorded.

Next, in order to record images again, the switch 595 is changed over to the MTR position again, thereby the AND 18-6 is actuated to pass clock pulses CP therethrough during the only time when the OS4 produces a pulse. On the other hand, the output of the one-shot circuit OS4 is fed to the NOR gate NOR 16-1 which produces a low level output. And, the NOR gate NOR 18-2 produces a high level output. Therefore, the AND gate AND 18-5 becomes open to pass the clock pulses from the AND gate AND 18-6 to the U/D counter CO 18-2. At this time, responsive to the pulse from the one-shot circuit OS4, the counter CO 18-2 serves as the DOWN counter. As a result, the counter CO 18-2 counts down the pulses until "0", that is, borrow output is produced. When the borrow output is produced in such a manner, the output of the NOR gate NOR 18-2 changes to the low level at which the AND gate AND 18-5 is closed. Again, since the output of the AND gate AND 18-5 is connected to the counter CO 18-1 and the input terminal F of the drive circuit MD, the head is returned by a distance corresponding to the number of pulses produced from the AND gate AND 18-5 in the direction F to the position which was occupied by the head before the reproduction. Now assuming that, for example, after ten frame images were recorded, the 6th image was reproduced, a recording operation for the 11th image will be succeeded as follows: Since the ten frame exposures were made, the counters CO 18-1 and U/D CO 18-2 both count ten, and the head 13 also assumes a position corresponding to that content of the counter CO 18-1. Then, when the switch 595 is set to the PLB position, the content of the counter CO 18-1 becomes "0", and the head is also returned to the initial position. Then, the switch SW 18-2 is closed until six pulses are fed to the counter CO 18-1. When the content of the counter CO 18-1 becomes 6, the head is moved 6 tracks. On the other hand, the above described 6 pulses are also applied to the U/D counter CO 18-2, thereby the content of the U/D counter CO 18-2 is changed from 10 to 4. Then, when the switch 595 is again set to the MTR position after the reproduction, the counter AND 18-5 produces pulses until the content of the U/D counter CO 18-2 becomes "0". Since the content of the U/D counter CO 18-2 was 4, the production of four pulses from the AND gate AND 18-5 occurs so that the content of the U/D counter CO 18-2 becomes "0". Therefore, the counter CO 18-1 advances 4 counts with the resulting content becoming 10, and the head is registered with the 10th track. Thus, the system is reset to the intermediate recording state. After that, each time one actuation of release is effected, the above described operation repeats itself.

When the counter CO 18-1 reaches the full count state, that is, when no more fresh tracks are available on the image recording medium 14, the counter CO 18-1 produces a carry C which is latched by a latch circuit L. By this latch signal, the gate OR 18-1 is opened to reset the head access mechanism to the initial position, and a warning circuit comprising a transistor Tr 18-1 and LED is actuated to inform the operator of the fact that all the tracks on the recording medium 14 are used up to record the images. In the figure, r4, r5 and r6 are resistors for insuring that upon reception of the battery voltage Vcc, the circuit can take either a high or a low level. If some of the recorded images are found to be unvalued as the images are reproduced by the monitor, the unvalued images may be erased in a manner known in the art, for example, by using an erasing head. It is noted that the continuous succession of exposures is performed by closing the switch SW500 of the gate circuit. Therefore, each time one-frame exposure is made, one pulse from the one-shot circuit ON500 is fed to the OR gate OR 16-2. Thus, the head is automatically advanced in position.

As has been described in detail, according to the present invention, the image recording system has many valuable advantages not only that as the storage time of the image signal on the solid state image transducer is controlled in accordance with the brightness, the image signals are always recorded in the proper exposure level to enable reproduction of images of optimum tone quality, but also that as the exposure is controlled by taking into account the storage time, it is very simply made possible to perform the various exposure modes such as the both priority mode, program mode and magic mode, and that by using the ordinary strobe, the daylight synchro photography with the so-called computer operation can be performed very easily. Again, according to the present invention, it is made possible not only that new functions such as the electronic monitor of images to be recorded, and the instant reproduction of the recorded images can be incorporated in a compact camera structure, but also that unlike the general VTR system of large bulk and size, for example, little unfamiliarity is given to the operator as compared with the ordinary camera from the standpoint of manageability. Again, according to the present invention, in addition to the essential feature that since the object image is detected by the solid state image transducer, the recording of the object images without the use of movable parts is realized, as the charge accumulation time of the same transducer can vary over a very wide range from about 1 $\mu$sec. to a few seconds, the accomplishment of an exposure control method that allows for giving full scope to this characteristic leads to realize an image recording system having an extremely wide dynamic range of exposure control, as the storage time corresponds to the shutter time in the ordinary camera.

Further, the solid state image transducer may be designed to have a desired area ratio of the photosensitive portion to the transfer registers for the purpose of controlling the sensitivity of the transducer. Speaking in terms of the conventional camera art, an effect equivalent to the use of different film sensitivities is produced. By employing a solid state image transducer designed to allow for about ASA800 in the system of the invention, in addition thereto, a wide range of shutter speeds from 1 $\mu$sec. to a few seconds is realized. According to the present invention, therefore, an extremely large performance that is essentially impossible in the conventional camera can be achieved.

What is claimed is:

1. An image pickup device, comprising:
   (a) image pickup means for picking up an image of an object and photoelectrically converting the image into an image signal;
   (b) photograph indicating means for indicating a photographing of the object;
   (c) exposure amount setting means for setting an amount of exposure for effecting photoelectric conversion by said image pickup means;
   (d) exposure amount control means controlling said exposure amount setting means;
   (e) recording means for recording the image signal outputted from said image pickup means;
   (f) reproducing means for reproducing the image signal recorded by said recording means;
   (g) a change-over operating member for selectively changing over a recording mode effected by said recording means or a reproducing mode effected by said reproducing means;
   (h) display means having a flat plate which is commonly used in both of the recording mode and the reproducing mode and is exposed to an outside of the device, the flat plate selectively displaying the image before recording or the reproduced image; and
   (i) control means for effecting control in response to the operation of said change-over operating member to change over the recording mode and the reproducing mode so that in the recording mode the moving image signal, before recording by said recording means which has been changed by driving of said exposure amount setting means, is displayed by the flat plate and a predetermined output of said image pickup means is recorded in response to the operation of said photograph indicating means, while in the reproducing mode the image signal reproduced by said reproducing means is displayed by the flat plate,
   wherein at least said image pickup means and said flat display means are arranged to form a substantially integral construction.

2. A device according to claim 1, wherein said flat display means has a shutter which can be opened and closed.

3. A device according to claim 1, wherein the image signal recorded by said recording means includes an image signal of a still picture.

4. A device according to claim 2, wherein said exposure amount setting means includes means for setting the amount of exposure on the basis of an output of said image pickup means.

5. A device according to claim 2, wherein said change-over operating member includes a single switch.

6. An image pickup apparatus, comprising:
   (a) an image pickup device for picking up an image of an object and photoelectrically converting the image into an image signal;
   (b) a trigger switch for manually indicating a start of photographing the object;
   (c) a head for recording the image signal outputted from said image pickup device on a recording medium and for reproducing the image signal from the recording medium;
   (d) a mode switch for manually setting the apparatus in a recording mode or a reproducing mode;
   (e) a flat display plate, which is commonly used in both of the recording mode and the reproducing mode and is exposed to an outside of the device, for selectively displaying the image before recording or the reproduced image; and
   (f) a control circuit for effecting control in response to the manual operation of said mode switch to set the apparatus in the recording mode and the reproducing mode so that in the recording mode the moving image signal outputted from said image pickup device is displayed by the flat display plate and a predetermined output of said image pickup means is recorded in response to the manual operation of said trigger switch, while in the reproducing mode the image signal reproduced by said reproducing means is displayed by the flat display plate.

* * * * *